United States Patent
Dye et al.

(10) Patent No.: US 10,097,496 B2
(45) Date of Patent: Oct. 9, 2018

(54) ELECTRONIC MAIL USER INTERFACE

(71) Applicant: Apple Inc., Cupertino, CA (US)

(72) Inventors: Alan C. Dye, San Francisco, CA (US);
Christopher Patrick Foss, San Francisco, CA (US); Imran Chaudhri, San Francisco, CA (US); Jonathan R. Dascola, San Francisco, CA (US); Jonathan P. Ive, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 508 days.

(21) Appl. No.: 14/829,573

(22) Filed: Aug. 18, 2015

(65) Prior Publication Data

US 2016/0065525 A1 Mar. 3, 2016

Related U.S. Application Data

(60) Provisional application No. 62/044,966, filed on Sep. 2, 2014, provisional application No. 62/129,764, filed on Mar. 7, 2015.

(51) Int. Cl.
*G06F 3/0488* (2013.01)
*H04L 12/58* (2006.01)
(Continued)

(52) U.S. Cl.
CPC ............. *H04L 51/22* (2013.01); *G06F 3/041* (2013.01); *G06F 3/0482* (2013.01);
(Continued)

(58) Field of Classification Search
CPC ... G06F 3/00; G06F 3/01; G06F 3/041; G06F 3/048; G06F 3/0481; G06F 3/0482;
(Continued)

(56) References Cited

U.S. PATENT DOCUMENTS 5,751,260 A    5/1998 Nappi et al.
6,266,098 B1 *  7/2001 Cove .................. H04N 5/44513
                                                348/563

(Continued)

FOREIGN PATENT DOCUMENTS

AU    2014100584 A4    7/2014
EP       1052566 A1   11/2000
(Continued)

OTHER PUBLICATIONS

Office Action received for Taiwanese Patent Application No. 104120843, dated Jan. 30, 2016, 5 pages (1 page of English Translation and 4 pages of Official Copy).
(Continued)

*Primary Examiner* — Xiomar L Bautista
(74) *Attorney, Agent, or Firm* — Dentons US LLP

(57) ABSTRACT

The present disclosure relates to electronic mail user interfaces. A device, including a display, a touch-sensitive surface, and a rotatable input mechanism, is described in relation to accessing, composing, and manipulating electronic mail. In some examples, a user can provide input through the rotatable input mechanism to access a landing screen of an electronic mail application. The landing screen concurrently displays an affordance for accessing an electronic mail inbox and an affordance for accessing an interface for composing electronic mail.

75 Claims, 38 Drawing Sheets

(51) Int. Cl.
*G06F 3/0484* (2013.01)
*G06F 3/16* (2006.01)
*G06F 3/041* (2006.01)
*G06F 3/0482* (2013.01)
*G06Q 10/10* (2012.01)
*G10L 15/26* (2006.01)

(52) U.S. Cl.
CPC ...... *G06F 3/04847* (2013.01); *G06F 3/04883* (2013.01); *G06F 3/16* (2013.01); *G06Q 10/107* (2013.01); *G06F 2203/04105* (2013.01); *G06F 2203/04803* (2013.01); *G10L 15/26* (2013.01)

(58) Field of Classification Search
CPC .......... G06F 3/0488; G06F 17/30; G06F 9/44; G06F 4/12; H04M 1/56; H04M 1/72552; H04N 5/445
See application file for complete search history.

(56) References Cited

U.S. PATENT DOCUMENTS

| | | |
|---|---|---|
| 6,323,846 B1 | 11/2001 | Westerman et al. |
| 6,477,117 B1 | 11/2002 | Narayanaswami et al. |
| 6,556,222 B1 | 4/2003 | Narayanaswami |
| 6,570,557 B1 | 5/2003 | Westerman et al. |
| 6,661,438 B1 | 12/2003 | Shiraishi et al. |
| 6,662,023 B1 | 12/2003 | Helle |
| 6,677,932 B1 | 1/2004 | Westerman |
| 6,809,724 B1 | 10/2004 | Shiraishi et al. |
| 7,081,905 B1 | 7/2006 | Raghunath |
| 7,091,964 B2 | 8/2006 | Wong et al. |
| 7,130,664 B1 | 10/2006 | Williams |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,050,997 B1 | 11/2011 | Nosek et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,543,081 B2 | 9/2013 | Scott et al. |
| 8,665,209 B2 * | 3/2014 | Rimas-Ribikauskas ..................... G06F 3/0488 178/18.01 |
| 8,666,361 B2 | 3/2014 | Chu et al. |
| 8,675,084 B2 | 3/2014 | Bolton et al. |
| 8,860,674 B2 | 10/2014 | Lee et al. |
| 8,954,887 B1 * | 2/2015 | Tseng .................. G06F 3/04812 715/808 |
| 9,195,219 B2 | 11/2015 | Hong et al. |
| 9,395,905 B2 | 7/2016 | Wherry |
| 2002/0015024 A1 | 2/2002 | Westerman et al. |
| 2003/0052901 A1 | 3/2003 | Fukuchi |
| 2004/0130581 A1 | 7/2004 | Howard et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0069604 A1 | 3/2006 | Leukart et al. |
| 2006/0085751 A1 | 4/2006 | O'Brien et al. |
| 2006/0197753 A1 | 9/2006 | Hotelling |
| 2006/0212905 A1 * | 9/2006 | Matsuda ................ H04H 20/28 725/51 |
| 2006/0294025 A1 | 12/2006 | Mengerink |
| 2007/0030256 A1 | 2/2007 | Akaike et al. |
| 2007/0135043 A1 | 6/2007 | Hayes et al. |
| 2007/0168369 A1 | 7/2007 | Bruns |
| 2008/0033779 A1 | 2/2008 | Coffman et al. |
| 2008/0052643 A1 | 2/2008 | Ike et al. |
| 2008/0062141 A1 | 3/2008 | Chandhri |
| 2008/0165153 A1 | 7/2008 | Platzer et al. |
| 2008/0174570 A1 | 7/2008 | Jobs et al. |
| 2008/0216001 A1 | 9/2008 | Ording et al. |
| 2008/0320391 A1 | 12/2008 | Lemay et al. |
| 2009/0036165 A1 | 2/2009 | Brede |
| 2009/0119678 A1 | 5/2009 | Shin et al. |
| 2009/0177538 A1 | 7/2009 | Brewer et al. |
| 2009/0199130 A1 | 8/2009 | Tsern et al. |
| 2009/0205041 A1 | 8/2009 | Michalske |
| 2010/0223055 A1 | 9/2010 | Mclean |
| 2010/0223145 A1 | 9/2010 | Dragt |
| 2010/0271312 A1 | 10/2010 | Alameh et al. |
| 2011/0022472 A1 | 1/2011 | Zon et al. |
| 2011/0078622 A1 | 3/2011 | Missig et al. |
| 2011/0086613 A1 * | 4/2011 | Doudkine ............ G06Q 10/107 455/410 |
| 2011/0088086 A1 | 4/2011 | Swink et al. |
| 2011/0167369 A1 | 7/2011 | Van Os |
| 2011/0202861 A1 | 8/2011 | Fritzley et al. |
| 2011/0234633 A1 | 9/2011 | Ogura et al. |
| 2011/0248948 A1 * | 10/2011 | Griffin .................... G06F 3/041 345/174 |
| 2011/0251892 A1 | 10/2011 | Laracey et al. |
| 2012/0016678 A1 | 1/2012 | Gruber et al. |
| 2012/0050185 A1 | 3/2012 | Davydov et al. |
| 2012/0083260 A1 * | 4/2012 | Arriola ............... G06F 3/04883 455/418 |
| 2012/0089507 A1 | 4/2012 | Zhang et al. |
| 2012/0089951 A1 | 4/2012 | Cassidy |
| 2012/0159380 A1 | 6/2012 | Kocienda et al. |
| 2012/0197743 A1 | 8/2012 | Grigg et al. |
| 2012/0204123 A1 | 8/2012 | Bauer et al. |
| 2012/0258684 A1 | 10/2012 | Franz et al. |
| 2012/0290449 A1 | 11/2012 | Mullen et al. |
| 2012/0310760 A1 | 12/2012 | Phillips et al. |
| 2012/0322370 A1 | 12/2012 | Lee |
| 2012/0322371 A1 | 12/2012 | Lee |
| 2012/0324390 A1 | 12/2012 | Tao |
| 2013/0024780 A1 | 1/2013 | Sutedja et al. |
| 2013/0097566 A1 | 4/2013 | Berglund |
| 2013/0103519 A1 | 4/2013 | Kountotsis et al. |
| 2013/0110719 A1 | 5/2013 | Carter et al. |
| 2013/0143512 A1 | 6/2013 | Hernandez et al. |
| 2013/0225118 A1 | 8/2013 | Jang et al. |
| 2013/0244615 A1 | 9/2013 | Miller et al. |
| 2013/0295872 A1 | 11/2013 | Guday et al. |
| 2013/0304651 A1 | 11/2013 | Smith et al. |
| 2013/0332364 A1 | 12/2013 | Templeton et al. |
| 2013/0339343 A1 | 12/2013 | Hierons et al. |
| 2014/0028735 A1 | 1/2014 | Williams et al. |
| 2014/0036639 A1 | 2/2014 | Boni et al. |
| 2014/0068751 A1 | 3/2014 | Last et al. |
| 2014/0074716 A1 | 3/2014 | Ni |
| 2014/0101056 A1 | 4/2014 | Wendling |
| 2014/0105278 A1 | 4/2014 | Bivolarsky |
| 2014/0129441 A1 | 5/2014 | Blanco et al. |
| 2014/0139637 A1 | 5/2014 | Mistry et al. |
| 2014/0155031 A1 | 6/2014 | Lee et al. |
| 2014/0279442 A1 | 9/2014 | Luoma et al. |
| 2014/0279556 A1 | 9/2014 | Priebatsch et al. |
| 2014/0333670 A1 | 11/2014 | Agnetta et al. |
| 2015/0077398 A1 * | 3/2015 | Yairi ..................... G06F 3/016 345/175 |
| 2015/0178041 A1 * | 6/2015 | Uskoreit ................ G06F 3/165 704/235 |
| 2015/0302301 A1 | 10/2015 | Petersen |
| 2015/0379476 A1 | 12/2015 | Chaudhri et al. |

(56) References Cited

U.S. PATENT DOCUMENTS

2016/0062567 A1 3/2016 Yang et al.
2016/0065509 A1 3/2016 Yang et al.

FOREIGN PATENT DOCUMENTS

| EP | 1679879 A2 | 7/2006 |
| --- | --- | --- |
| EP | 2547117 A1 | 1/2013 |
| EP | 2551784 A1 | 1/2013 |
| EP | 2693382 A2 | 2/2014 |
| EP | 2733579 A2 | 5/2014 |
| EP | 2733598 A2 | 5/2014 |
| JP | 55-80084 A | 6/1980 |
| TW | 201403363 A | 1/2014 |
| WO | 2006/037545 A2 | 4/2006 |
| WO | 2008/033853 A2 | 3/2008 |
| WO | 2008/085742 A2 | 7/2008 |
| WO | 2013/169842 A2 | 11/2013 |
| WO | 2013/169849 A2 | 11/2013 |
| WO | 2013/169875 A2 | 11/2013 |
| WO | 2014/078965 A1 | 5/2014 |
| WO | 2014/105276 A1 | 7/2014 |

OTHER PUBLICATIONS

Ellis Benus, "Put a Phone Number in Google Calender Where Line for One Click Calling", Oct. 31, 2012, 5 pages.
International Search Report and Written Opinion received for PCT Patent Application No. PCT/US2015/038173 dated Sep. 25, 2015, 13 pages.
International Search Report and Written Opinion received for PCT Application No. PCT/US2015/038174, dated Jan. 18, 2016, 38 pages.
Invitation to Pay Additional Fees Due and Communication Relating to the Results of the Partial International Search received for PCT Patent Application No. PCT/US2015/038174, dated Oct. 5, 2015, 5 pages.
International Search Report and Written Opinion received for PCT Application No. PCT/US2015/045936, dated Nov. 4, 2015, 12 pages.
International Search Report and Written Opinion received for PCT Patent Application No. PCT/US2015/045965, dated Feb. 1, 2016, 20 pages.
Tablet Talk, "Tablet Talk App: Frequently Asked Questions—Tablet Talk.", URL:https://web.archive.org/web/201406251 02903/http://1www.tablettalkapp.com/faq/, Jun. 25, 2014, 6 pages.
Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.
Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
Lemay et al., U.S. Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.

International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
Yang et al., U.S. Appl. No. 62/004,886, filed May 29, 2014, titled "User Interface for Payments", 198 pages.
International Search Report and Written Opinion received for PCT Patent Application No. PCT/US2015/019321, dated Jun. 3, 2015, 11 pages.
Apple, "iPhone User's Guide", 2007, 137 pages.
Headset Button Controller v7.3 APK Full APP Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., "U.S. Appl. No. 62/006,211, filed Jun. 1, 2014, titled Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/019298, dated Jul. 13, 2015, 17 pages.
FUJI FILM, "Taking Pictures Remotely : Free iPhone/Android App FUJI FILM Camera Remote", Available at <http://app.fujifilm-dsc.com/en/camera_remote/guide05.html>, Apr. 22, 2014, 3 pages.
Playmemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.
Techsmith, "Snag it 11—Snagit 11.4 Help", Available at <http://assets.techsmith.com/Downloads/ua-tutorials-snagit-11/Snagit_11.pdf>, Jan. 2014, 146 pages.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
International Preliminary Report on Patentability received for PCT Patent Application No. PCT/US2015/038173, dated Jan. 5, 2017, 10 pages.
International Preliminary Report on Patentability received for PCT Patent Application No. PCT/US2015/038174, dated Jan. 5, 2017, 27 pages.
International Preliminary Report on Patentability received for PCT Patent Application No. PCT/US2015/045965, dated Dec. 27, 2016, 10 pages.
Non-Final Office Action received for U.S. Appl. No. 14/830,629, dated Dec. 1, 2016, 20 pages.
Non-Final Office Action received for U.S. Appl. No. 14/641,308, dated Jun. 23, 2017, 53 pages.
Non-Final Office Action received for U.S. Appl. No. 14/830,629, dated Jun. 15, 2017, 24 pages.
Notice of Allowance and Search Report received for Taiwanese Patent Application No. 104128687.0, dated Jun. 7, 2016, 4 pages (3 pages of Official Copy and 1 page of Search Report Translation). (See Communication under 37 CFR § 1.98(a) (3)).
Office Action received for Australian Patent Application No. 2015279544, dated Apr. 18, 2017, 4 pages.
Office Action received for Australian Patent Application No. 2016231598, dated Apr. 7, 2017, 5 pages.
Office Action received for Australian Patent Application No. 2015279545, dated Apr. 13, 2017, 3 pages.

(56) References Cited

OTHER PUBLICATIONS

Extended European Search Report received for European Patent Application No. 16190252.3, dated Mar. 1, 2017, 10 pages.
International Preliminary Report on Patentability received for PCT Patent Application No. PCT/US2015/045330, dated Mar. 16, 2017, 9 pages.
International Preliminary Report on Patentability received for PCT Patent Application No. PCT/US2015/019321, dated Mar. 16, 2017, 8 pages.
"Accepted Outlook Meetings Move to Deleted Folder", Available online at:-https://social.technet.microsoft.com/Forums/office/en-US/f3301c9a-a93f-49f7-be13-c642e285f150/accepted-outlook-meetings-move-to-deleted-folder?forum=outlook, Jan. 13, 2011, 4 pages.
"Microsoft Outlook 2010™ A Beginners Guide", Available online at:-http://www.reading.ac.uk/web/files/its/outlook2010.pdf, Apr. 1, 2012, 24 pages.
Office Action Received for European Patent Application No. 15739109.5, dated Jan. 31, 2018, 7 pages.
Office Action Received for European Patent Application No. 15739110.3, dated Jan. 31, 2018, 8 pages.
"Responding to a meeting invitation", Available online at:-https://web.archive.org/web/20121128174157/https://www.zimbra.com/desktop7/help/en_US/Calendar/Responding_to_an_invitation.html, Nov. 28, 2012, 1 page.
Non-Final Office Action received for U.S. Appl. No. 14/752,776, dated Jan. 2, 2018, 30 pages.
Notice of Acceptance received for Australian Patent Application No. 2016231598, dated Mar. 1, 2018, 3 pages.
Notice of Acceptance received for Australian Patent Application No. 2015279545, dated Feb. 9, 2018, 3 pages.
Office Action received for Australian Patent Application No. 2015279544, dated Feb. 13, 2018, 5 pages.
Office Action received for European Patent Application No. 16190252.3, dated Feb. 19, 2018, 7 pages.
Studio 39,"Clock & Calendar for Smartwatch 2", Available online at:-https://www.youtube.com/watch?v=Uj-K2vMnrj8, Nov. 20, 2013, 2 pages.
Final Office Action received for U.S. Appl. No. 14/641,308, dated Mar. 14, 2018, 42 pages.
Notice of Acceptance received for Australian Patent Application No. 2015279544, dated Mar. 1, 2018, 3 pages.

* cited by examiner

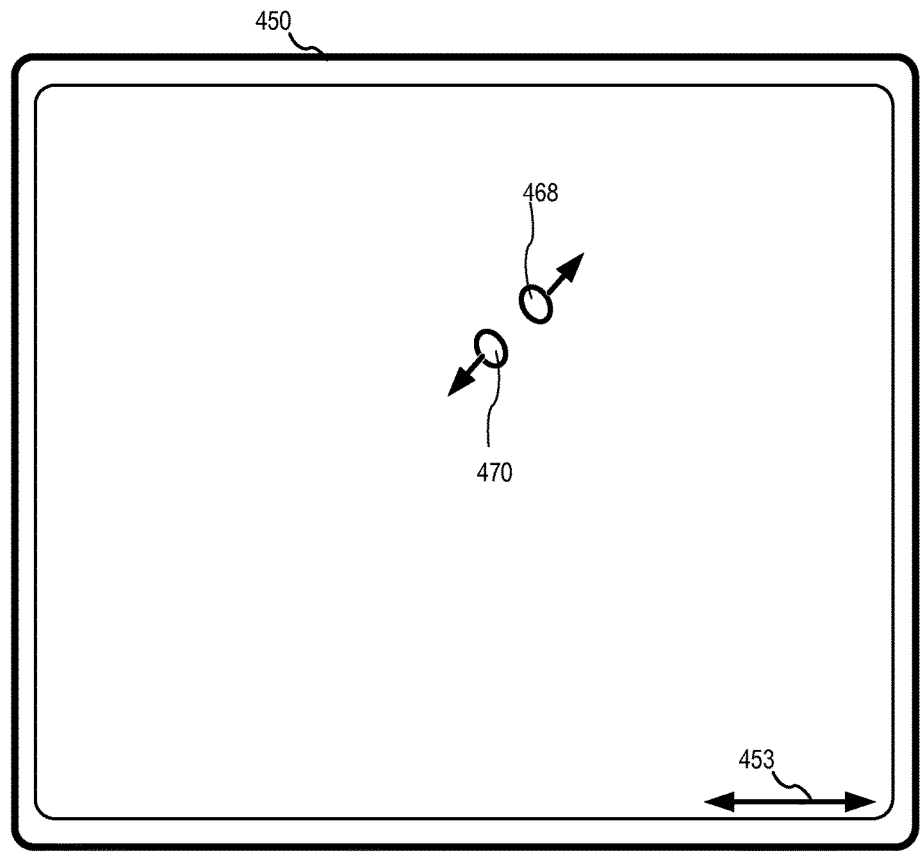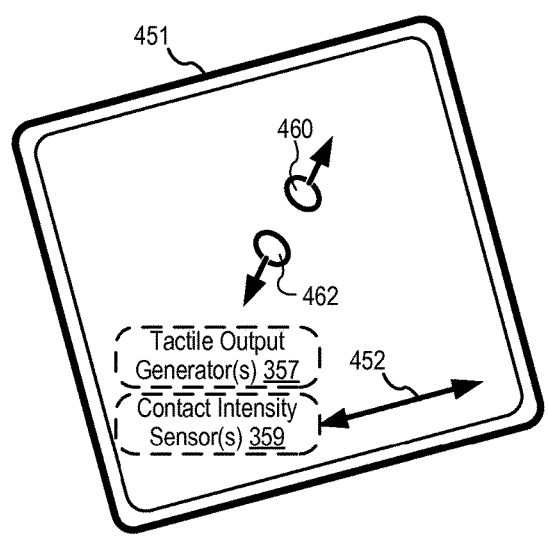
FIG. 4B

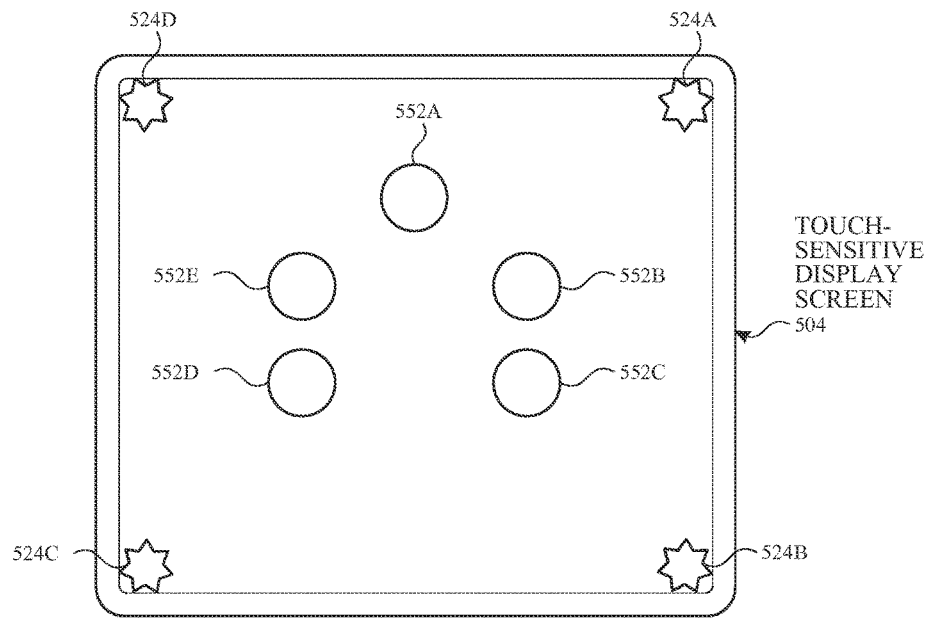
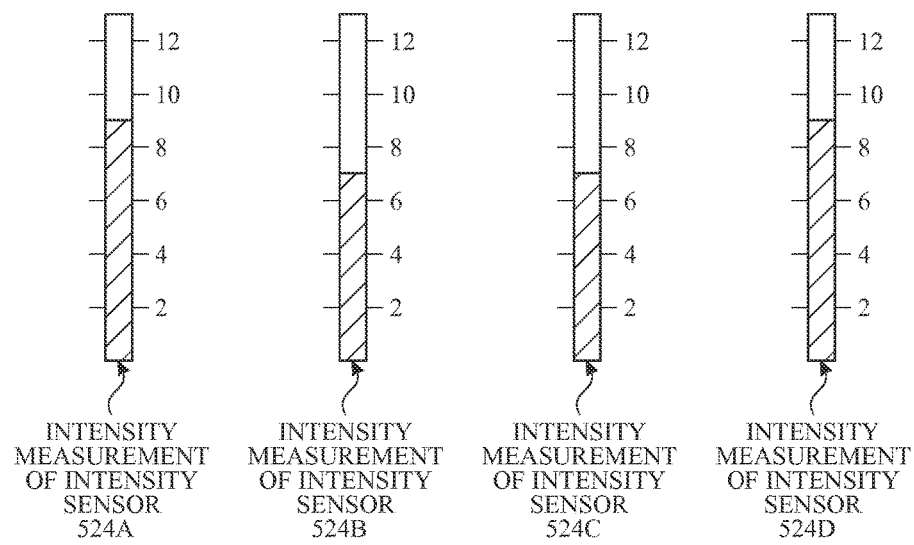
*FIG. 5C*

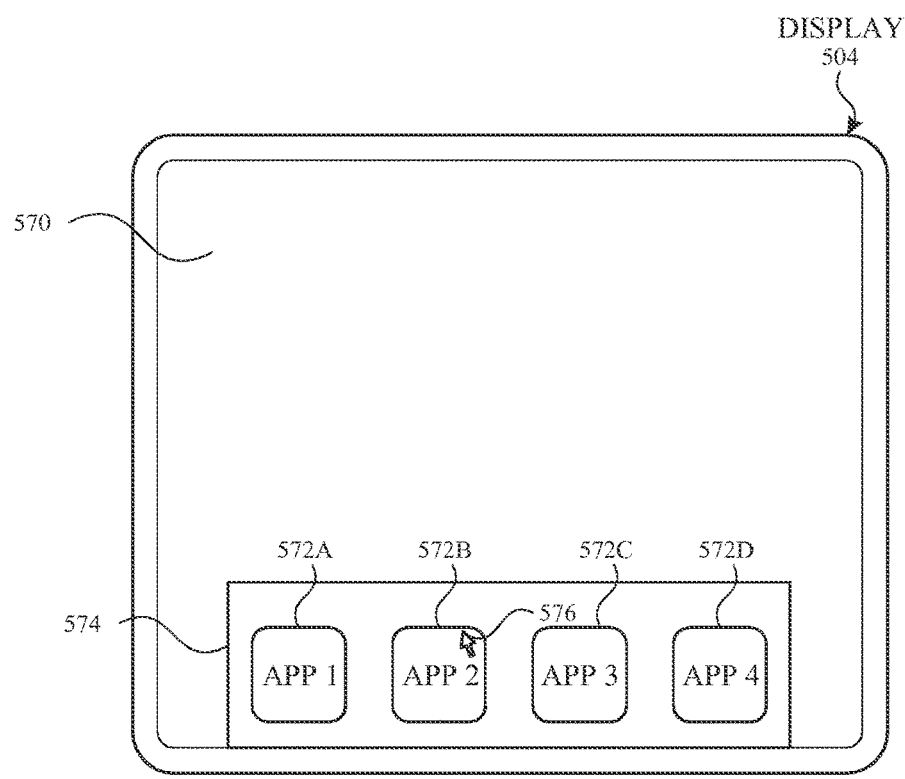
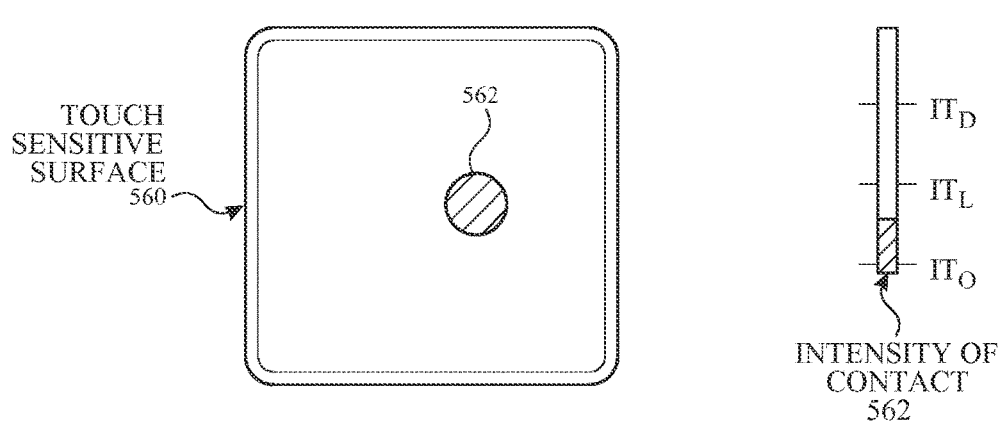
*FIG. 5E*

700

702
Displaying, on the display, an affordance representing an electronic mail application, wherein the affordance representing the electronic mail application includes an indication of a number of unread electronic mail messages of the electronic mail application.

↓

704
Receiving user input representing movement of the rotatable input mechanism.

↓

706
In response to receiving the user input representing the movement of the rotatable input mechanism, displaying a landing screen of the electronic mail application, wherein the landing screen includes display of an inbox affordance and a compose affordance.

↓

708
Receiving user input associated with the landing screen.

↓

710
Determining whether the user input associated with the landing screen represents a touch associated with the displayed inbox affordance or a touch associated with the displayed compose affordance.

↓

712
In response to receiving the user input associated with the landing screen and in accordance with a determination that the user input associated with the landing screen represents a touch associated with the displayed inbox affordance, displaying, on the display, a list of electronic mail thread objects.

↓

714
In response to receiving the user input associated with the landing screen and in accordance with a determination that the user input associated with the landing screen represents a touch associated the displayed compose affordance, displaying, on the display, an interface for composing a new electronic mail message.

*FIG. 7*

ELECTRONIC MAIL USER INTERFACE

CROSS-REFERENCE TO RELATED APPLICATIONS

This application claims priority to U.S. Provisional Patent Application No. 62/044,966, entitled "ELECTRONIC MAIL USER INTERFACE," filed Sep. 2, 2014; and U.S. Provisional Patent Application No. 62/129,764, entitled "ELECTRONIC MAIL USER INTERFACE," filed Mar. 7, 2015; each of which is hereby incorporated by reference in its entirety.

This application relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013 and published on Nov. 14, 2013 as Publication No. WO/2013/169849; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013 and published on Jul. 3, 2014 as Publication No. WO/2014/105276; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices." The content of these applications is hereby incorporated by reference in their entirety.

FIELD

The present disclosure relates generally to computer user interfaces, and more specifically to techniques for accessing, composing, and manipulating electronic mail.

BACKGROUND

The use of electronic devices for accessing, composing, and manipulating electronic mail (i.e., email) has significantly increased in recent years. Devices receive email and display the email for a user to view. The user can use the device to compose email to be transmitted to one or more recipients. For some user interfaces, the user responds to a received email using a reply feature. The user can also forward a received email to a recipient.

BRIEF SUMMARY

Some techniques for accessing, composing, and manipulating electronic mail using electronic devices, however, are generally cumbersome and inefficient. For example, accessing and responding to an electronic mail message requires navigating a complex and time-consuming user interface. For another example, some user interface techniques for forwarding electronic mail messages can be inefficient and cumbersome. In addition, existing techniques take longer than necessary, thereby wasting energy. This latter consideration is particularly important in battery-operated devices.

Accordingly, there is a need for electronic devices with faster, more efficient methods and interfaces for accessing, composing, and manipulating electronic mail. Such methods and interfaces optionally complement or replace conventional methods for accessing, composing, and manipulating electronic mail. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices for accessing, composing, and manipulating electronic mail are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device is user-wearable. In some embodiments, the device has a touch-sensitive display (also known as a "touch screen" or "touch screen display"). In some embodiments, the device has a display and a touch-sensitive surface. In some embodiments, the device has a short-range communication radio. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. Executable instructions for performing these functions may be included in a computer readable storage medium or other computer program product configured for execution by one or more processors.

In accordance with some embodiments, a method is performed at an electronic device with a display, a touch-sensitive surface, and a rotatable input mechanism. The method includes displaying, on the display, an affordance representing an electronic mail application, wherein the affordance representing the electronic mail application includes an indication of a number of unread electronic mail messages of the electronic mail application. The method includes receiving user input representing movement of the rotatable input mechanism. The method includes, in response to receiving the user input representing the movement of the rotatable input mechanism, displaying a landing screen of the electronic mail application, wherein the landing screen includes display of an inbox affordance and a compose affordance. The method includes receiving user input associated with the landing screen. The method includes determining whether the user input associated with the landing screen represents a touch associated with the displayed inbox affordance or a touch associated with the displayed compose affordance. The method includes, in response to receiving the user input associated with the landing screen and in accordance with a determination that the user input associated with the landing screen represents a touch associated with the displayed inbox affordance, displaying, on the display, a list of electronic mail thread objects. The method also includes, in response to receiving the user input associated with the landing screen and in accordance with a determination that the user input associated with the landing screen represents a touch associated the displayed compose affordance, displaying, on the display, an interface for composing a new electronic mail message.

In accordance with some embodiments, a method is performed at an electronic device with a display, a touch-sensitive surface, and a rotatable input mechanism. The method includes displaying, on the display, an affordance representing an electronic mail application, wherein the affordance representing the electronic mail application includes an indication of a number of unread electronic mail messages of the electronic mail application. The method includes receiving user input representing movement of the rotatable input mechanism. The method includes, in response to receiving the user input representing the movement of the rotatable input mechanism, displaying a list of electronic mail thread objects. The method includes receiving user input representing a swipe down gesture associated with the list of electronic mail thread objects. The method also includes, in response to receiving the user input representing the swipe down gesture associated with the list of electronic mail thread objects, displaying an affordance for composing a new electronic mail message.

In accordance with some embodiments, a system is described. The system includes: a display; a touch-sensitive surface; a rotatable input mechanism; means for displaying, on the display, an affordance representing an electronic mail application, wherein the affordance representing the electronic mail application includes an indication of a number of unread electronic mail messages of the electronic mail application; means for receiving user input representing movement of the rotatable input mechanism; means responsive to receiving the user input representing the movement of the rotatable input mechanism, for displaying a landing screen of the electronic mail application, wherein the landing screen includes display of an inbox affordance and a compose affordance; means for receiving user input associated with the landing screen; means for determining whether the user input associated with the landing screen represents a touch associated with the displayed inbox affordance or a touch associated with the displayed compose affordance; means responsive to receiving the user input associated with the landing screen and in accordance with a determination that the user input associated with the landing screen represents a touch associated with the displayed inbox affordance, for displaying, on the display, a list of electronic mail thread objects; and means response to receiving the user input associated with the landing screen and in accordance with a determination that the user input associated with the landing screen represents a touch associated the displayed compose affordance, for displaying, on the display, an interface for composing a new electronic mail message.

In accordance with some embodiments, a system is described. The system includes: a display; a touch-sensitive surface; a rotatable input mechanism; means for displaying, on the display, an affordance representing an electronic mail application, wherein the affordance representing the electronic mail application includes an indication of a number of unread electronic mail messages of the electronic mail application; means for receiving user input representing movement of the rotatable input mechanism; means responsive to receiving the user input representing the movement of the rotatable input mechanism, for displaying a list of electronic mail thread objects; means for receiving user input representing a swipe down gesture associated with the list of electronic mail thread objects; and means responsive to receiving the user input representing the swipe down gesture associated with the list of electronic mail thread objects, for displaying an affordance for composing a new electronic mail message.

In accordance with some embodiments, a non-transitory computer readable storage medium storing one or more programs is described. The one or more programs comprise instructions, which when executed by one or more processors of an electronic device with a display, a touch-sensitive surface, and a rotatable input mechanism, cause the device to: display, on the display, an affordance representing an electronic mail application, wherein the affordance representing the electronic mail application includes an indication of a number of unread electronic mail messages of the electronic mail application; receive user input representing movement of the rotatable input mechanism; in response to receiving the user input representing the movement of the rotatable input mechanism, display a landing screen of the electronic mail application, wherein the landing screen includes display of an inbox affordance and a compose affordance; receive user input associated with the landing screen; determine whether the user input associated with the landing screen represents a touch associated with the displayed inbox affordance or a touch associated with the displayed compose affordance; in response to receiving the user input associated with the landing screen and in accordance with a determination that the user input associated with the landing screen represents a touch associated with the displayed inbox affordance, display, on the display, a list of electronic mail thread objects; and in response to receiving the user input associated with the landing screen and in accordance with a determination that the user input associated with the landing screen represents a touch associated the displayed compose affordance, display, on the display, an interface for composing a new electronic mail message.

In accordance with some embodiments, a transitory computer readable storage medium storing one or more programs is described. The one or more programs comprise instructions, which when executed by one or more processors of an electronic device with a display, a touch-sensitive surface, and a rotatable input mechanism, cause the device to: display, on the display, an affordance representing an electronic mail application, wherein the affordance representing the electronic mail application includes an indication of a number of unread electronic mail messages of the electronic mail application; receive user input representing movement of the rotatable input mechanism; in response to receiving the user input representing the movement of the rotatable input mechanism, display a landing screen of the electronic mail application, wherein the landing screen includes display of an inbox affordance and a compose affordance; receive user input associated with the landing screen; determine whether the user input associated with the landing screen represents a touch associated with the displayed inbox affordance or a touch associated with the displayed compose affordance; in response to receiving the user input associated with the landing screen and in accordance with a determination that the user input associated with the landing screen represents a touch associated with the displayed inbox affordance, display, on the display, a list of electronic mail thread objects; and in response to receiving the user input associated with the landing screen and in accordance with a determination that the user input associated with the landing screen represents a touch associated the displayed compose affordance, display, on the display, an interface for composing a new electronic mail message.

In accordance with some embodiments, a non-transitory computer readable storage medium storing one or more programs is described. The one or more programs comprise instructions, which when executed by one or more processors of an electronic device with a display, a touch-sensitive surface, and a rotatable input mechanism, cause the device to: display, on the display, an affordance representing an electronic mail application, wherein the affordance representing the electronic mail application includes an indication of a number of unread electronic mail messages of the electronic mail application; receive user input representing movement of the rotatable input mechanism; in response to receiving the user input representing the movement of the rotatable input mechanism, display a list of electronic mail thread objects; receive user input representing a swipe down gesture associated with the list of electronic mail thread objects; and in response to receiving the user input representing the swipe down gesture associated with the list of electronic mail thread objects, display an affordance for composing a new electronic mail message.

In accordance with some embodiments, a transitory computer readable storage medium storing one or more programs is described. The one or more programs comprise instructions, which when executed by one or more processors of an electronic device with a display, a touch-sensitive surface, and a rotatable input mechanism, cause the device to: display, on the display, an affordance representing an electronic mail application, wherein the affordance representing the electronic mail application includes an indication of a number of unread electronic mail messages of the electronic mail application; receive user input representing movement of the rotatable input mechanism; in response to receiving the user input representing the movement of the rotatable input mechanism, display a list of electronic mail thread objects; receive user input representing a swipe down gesture associated with the list of electronic mail thread objects; and in response to receiving the user input representing the swipe down gesture associated with the list of electronic mail thread objects, display an affordance for composing a new electronic mail message.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for accessing, composing, and manipulating electronic mail, thereby increasing the effectiveness, efficiency, and user satisfaction with such devices. Such methods and interfaces may complement or replace conventional methods for accessing, composing, and manipulating electronic mail.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 7 is a flow diagram illustrating an exemplary process for accessing, composing, and manipulating electronic mail.

DESCRIPTION OF EMBODIMENTS

Figure 1A:
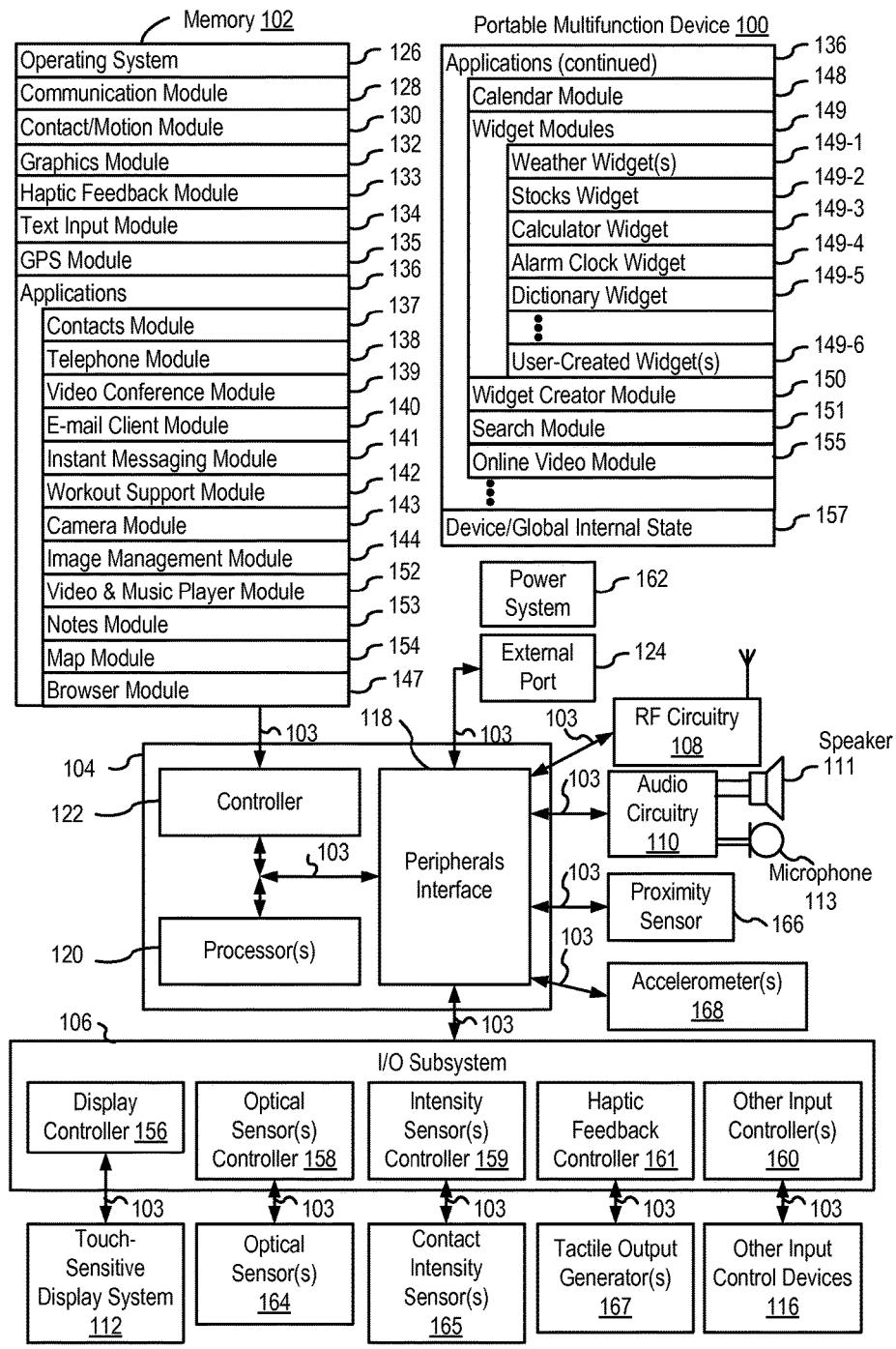
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for electronic devices that provide efficient email access to a user. For example, ease of use for viewing emails, replying to emails, forwarding emails, deleting emails, and composing emails contribute to the efficiency of email access. Such techniques can reduce the cognitive burden on a user who uses email, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for accessing, composing, and manipulating electronic mail messages. FIGS. 6A-6I and 9A-9I illustrate exemplary user interfaces for accessing, composing, and manipulating electronic mail messages. The user interfaces in the figures are also used to illustrate the processes described below, including the processes in FIGS. 7, 8, and 10.

Although the following description uses terms first, second, etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
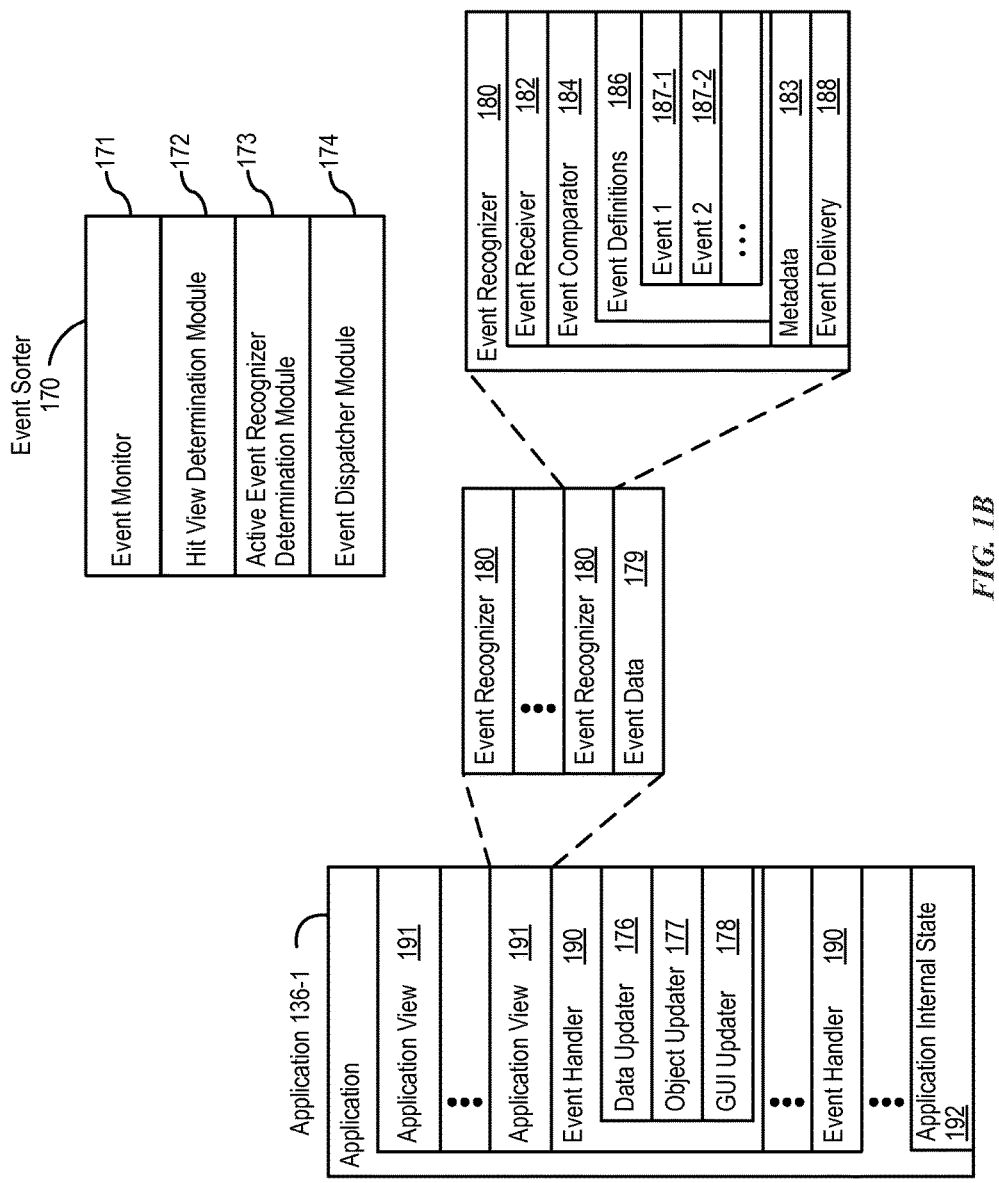
FIG. 1B is a block diagram illustrating exemplary components for event handling in accordance with some embodiments.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
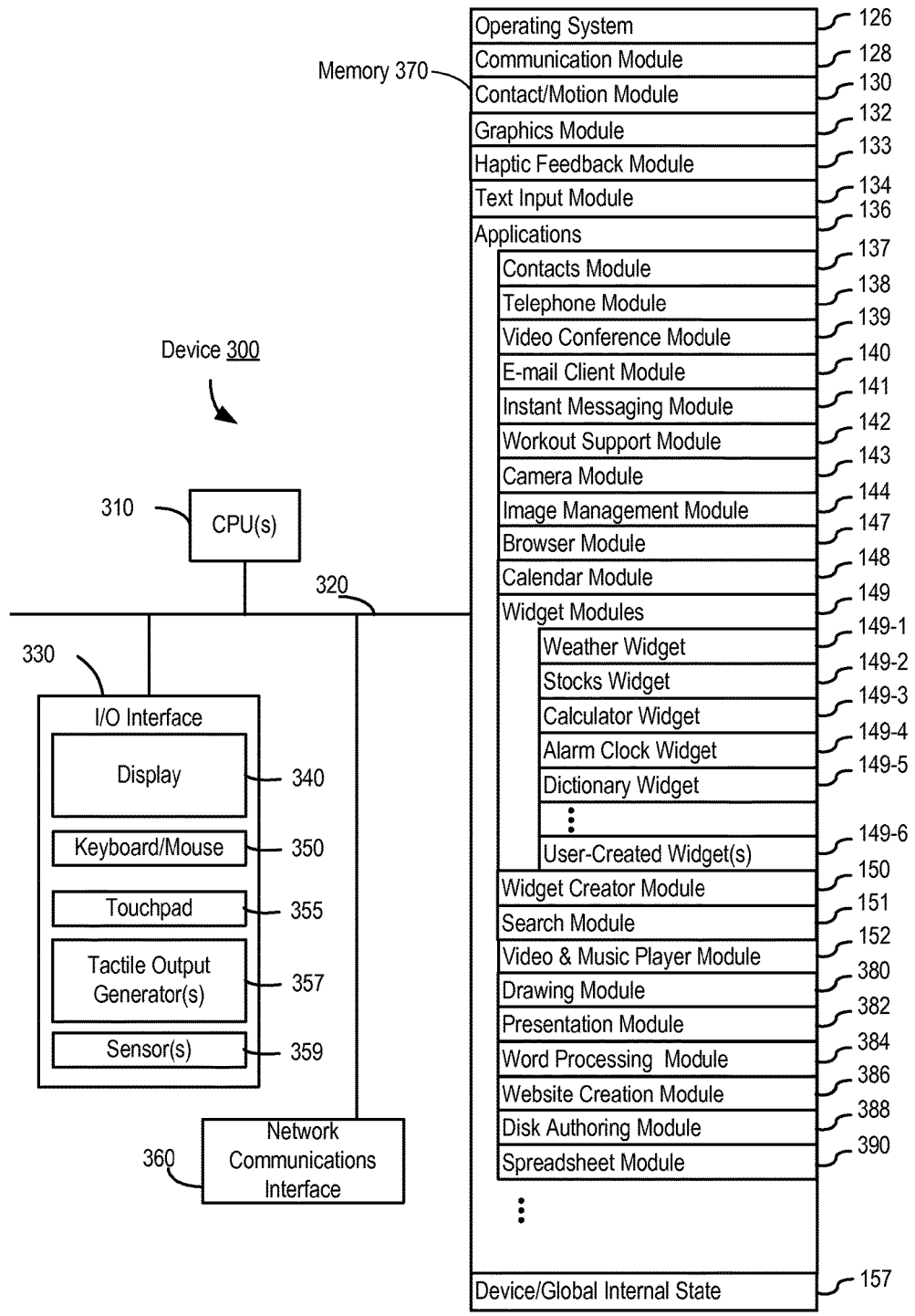
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts module 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web-page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
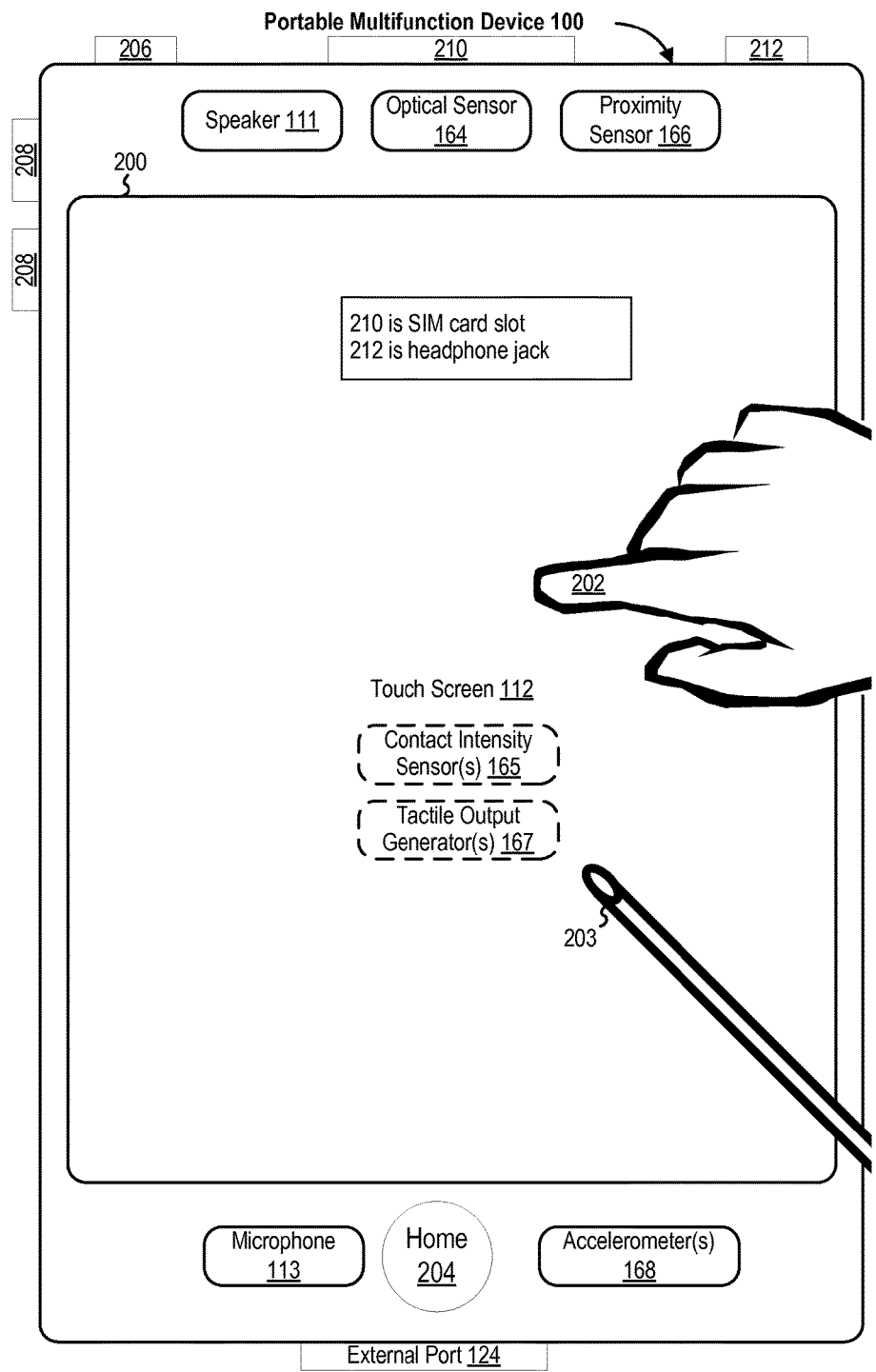
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
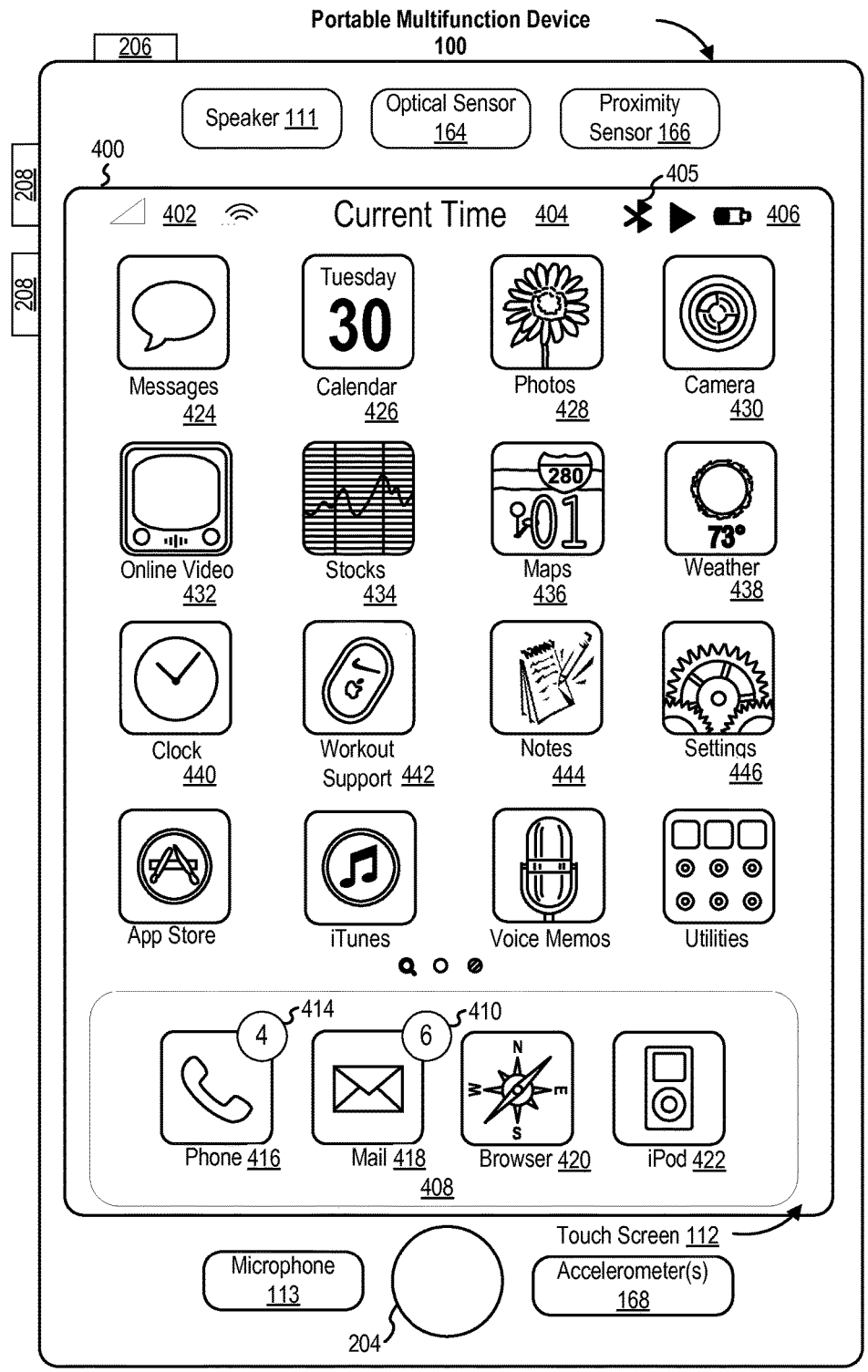
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icons 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
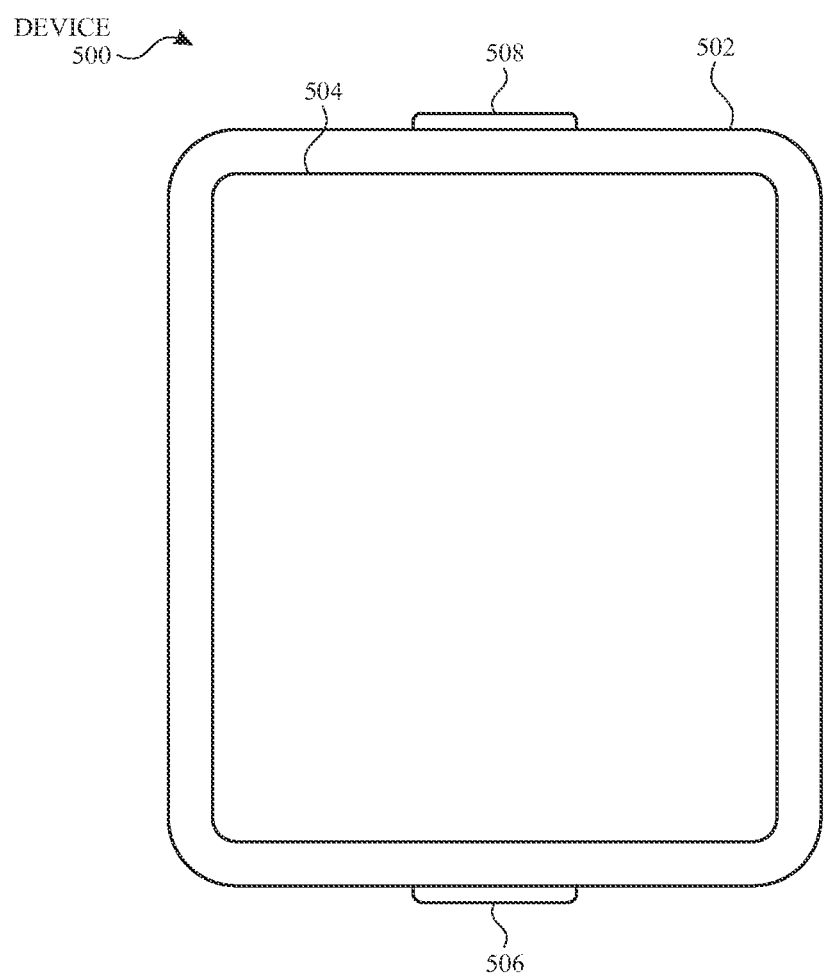
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touchscreen 504. Alternatively, or in addition to touchscreen 504, device 500 has a display and a touch-sensitive surface. As with devices 100 and 300, in some embodiments, touchscreen 504 (or the touch-sensitive surface) may have one or more intensity sensors for detecting intensity of contacts (e.g., touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
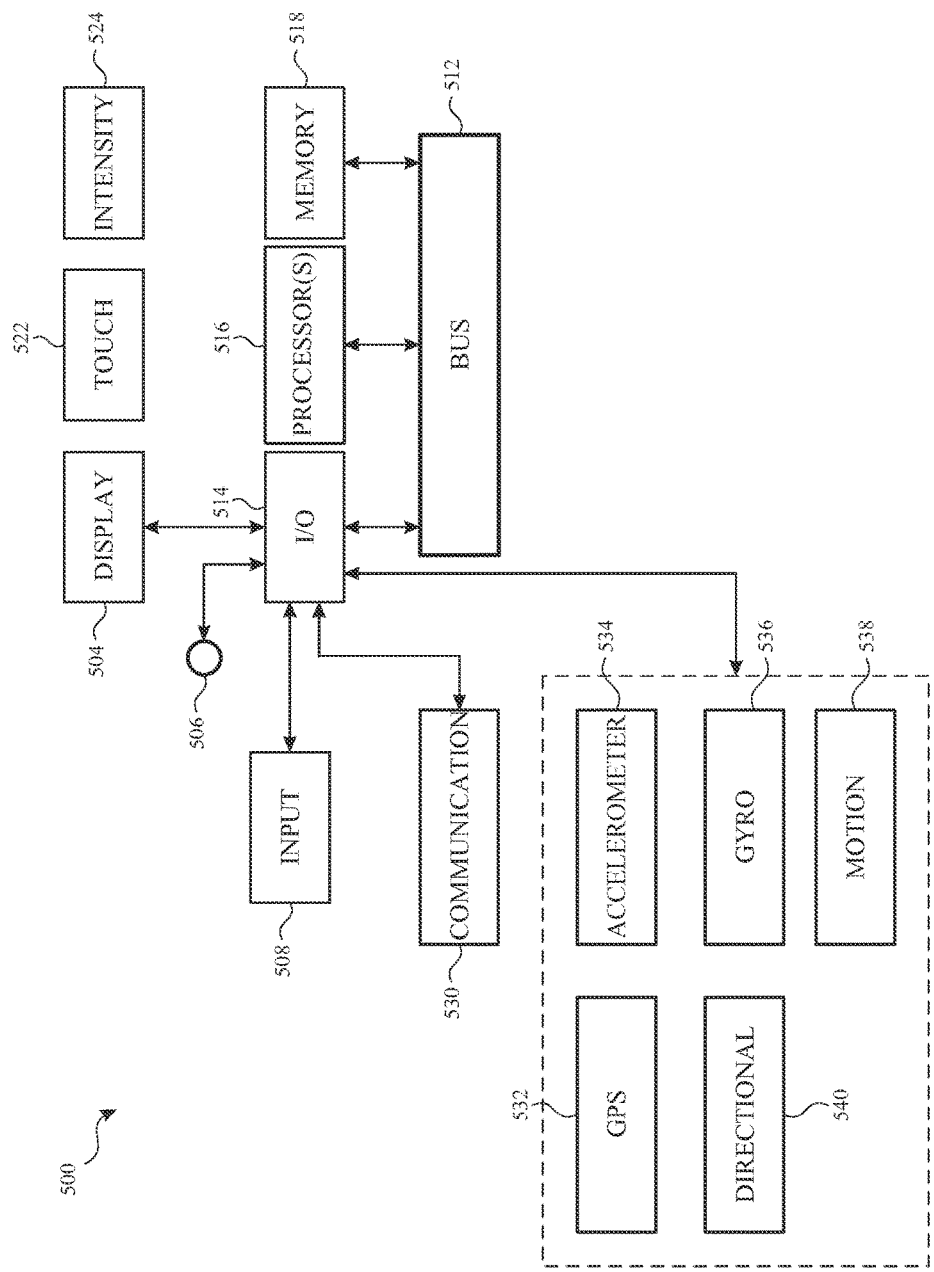
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication ("NFC"), cellular and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Computing device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Figure 10:
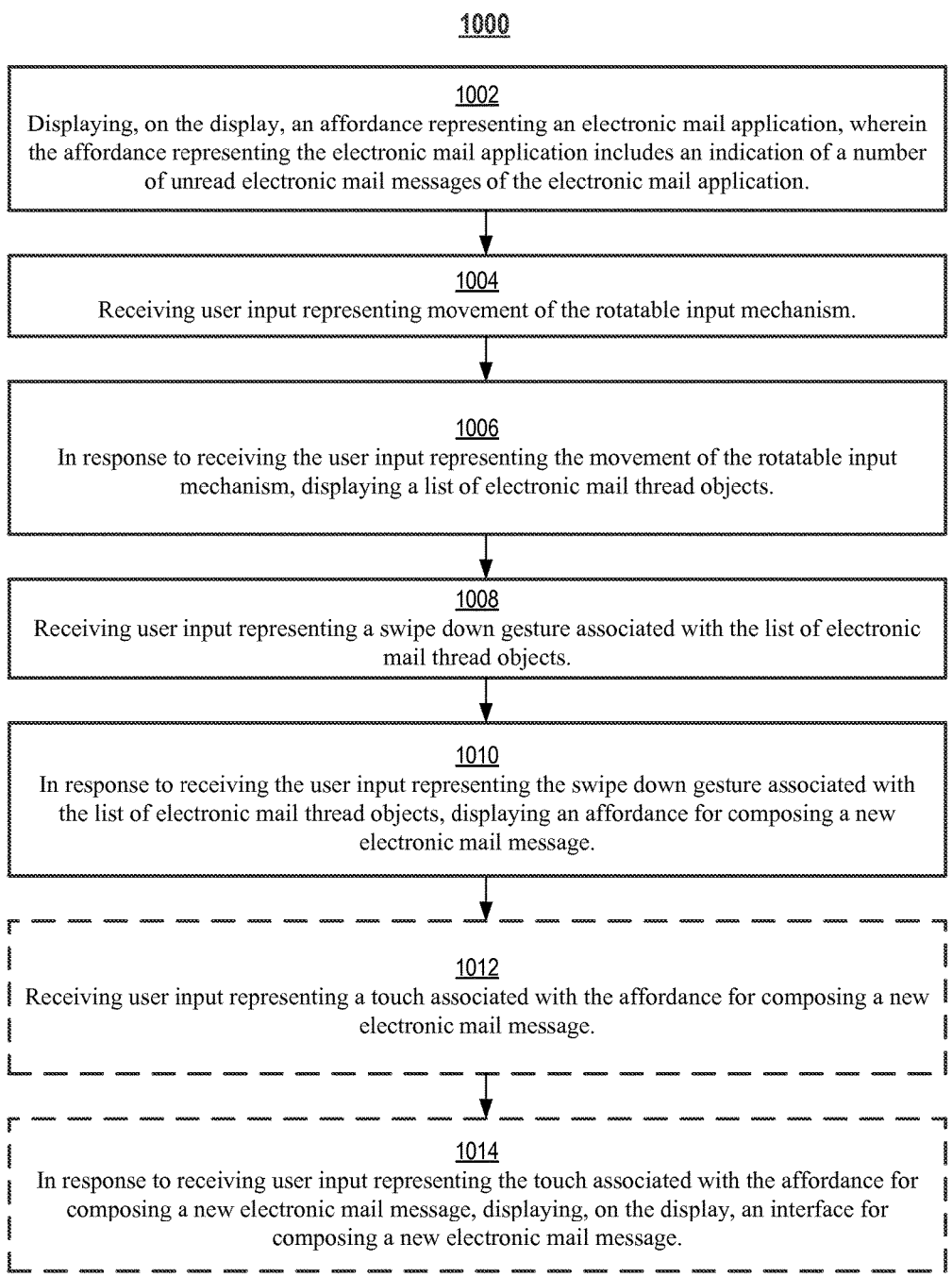
FIG. 10 is a flow diagram illustrating an exemplary process for accessing, composing, and manipulating electronic mail.

Memory 518 of personal electronic device 500 can be a non-transitory computer readable storage medium, for storing computer-executable instructions, which, when executed by one or more computer processors 516, for example, can cause the computer processors to perform the techniques described above, including processes 700 (FIG. 7), 800 (FIG. 8), and 1000 (FIG. 10). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Computing device 500 is not limited to the components and configuration of FIG. 5B, but can include other or additional components in multiple configurations.

As used here, the term "affordance" refers to a user-interactive graphical user interface object that may be displayed on the display screen of device 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5D:
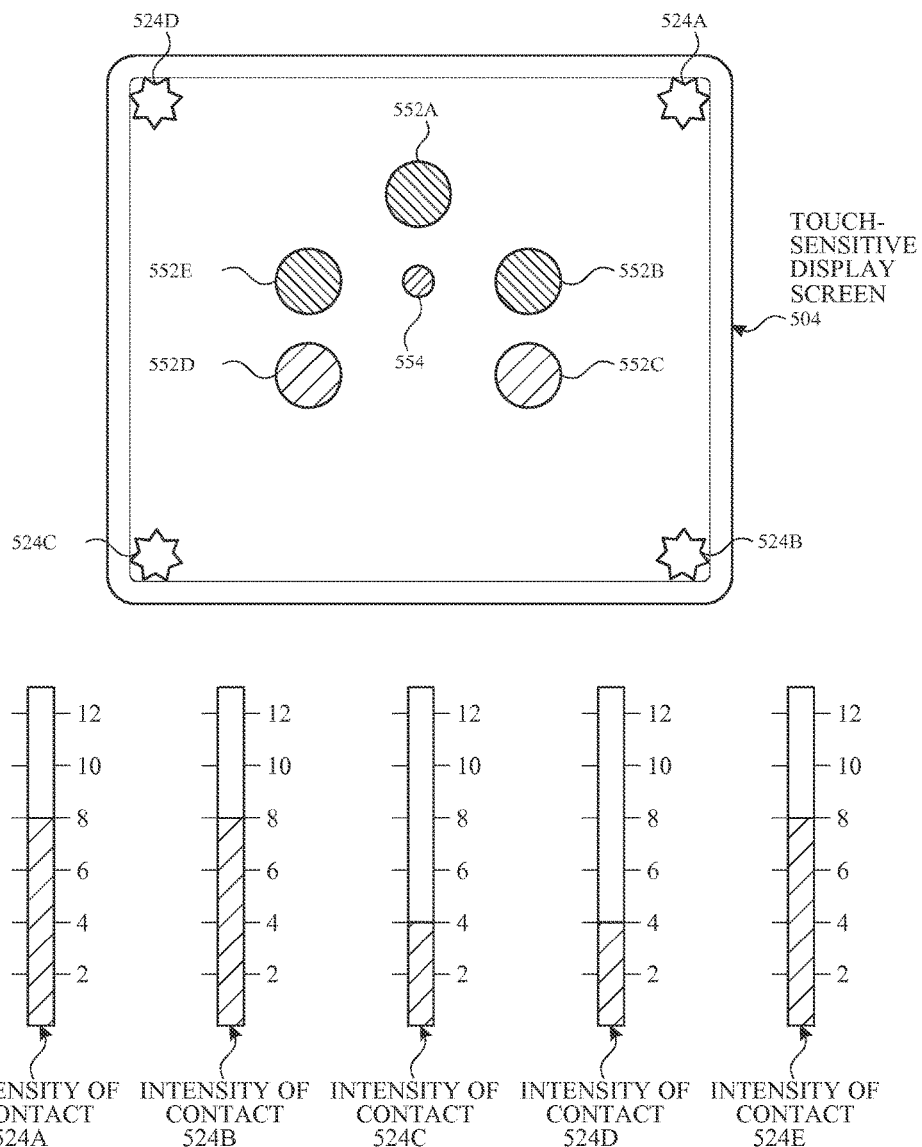

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
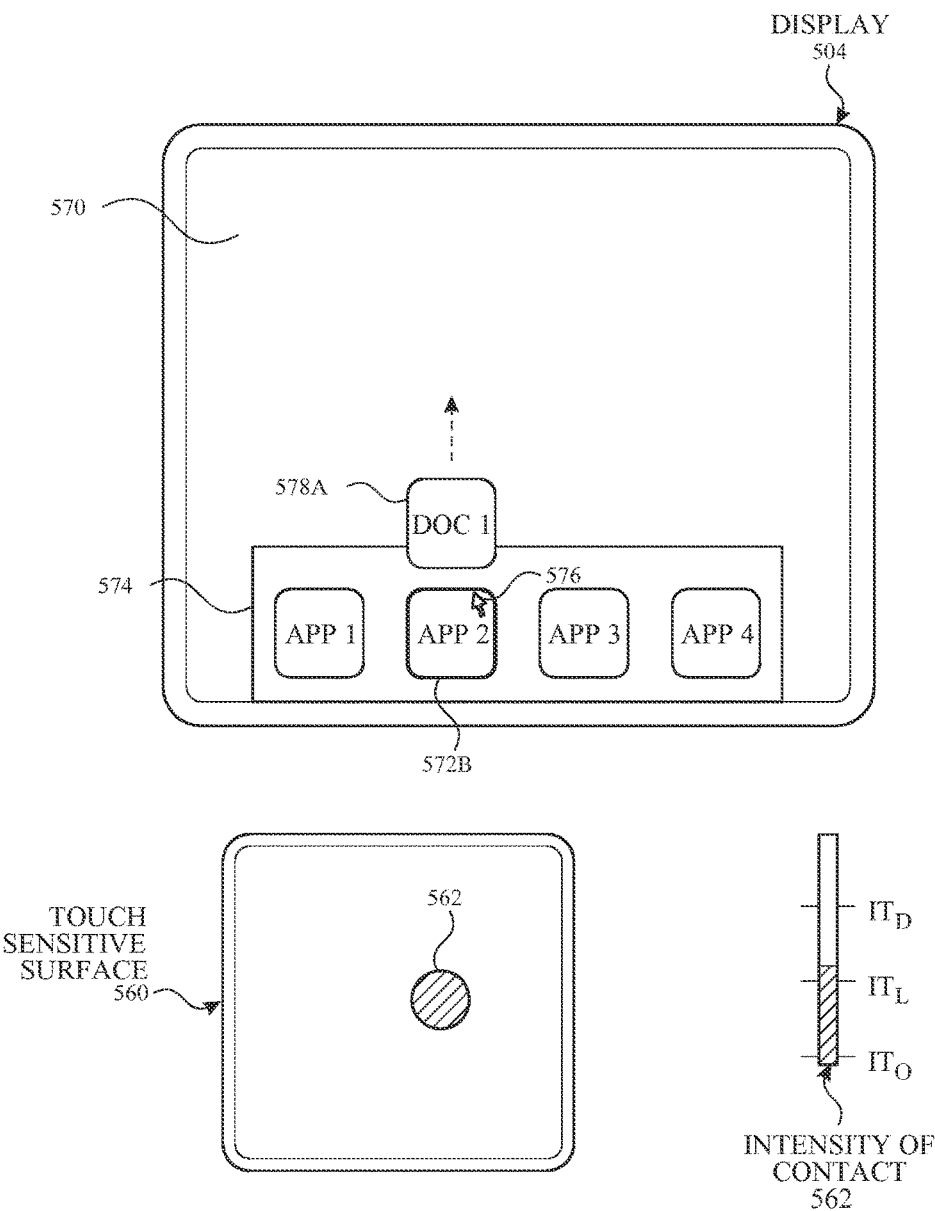
Figure 5G:
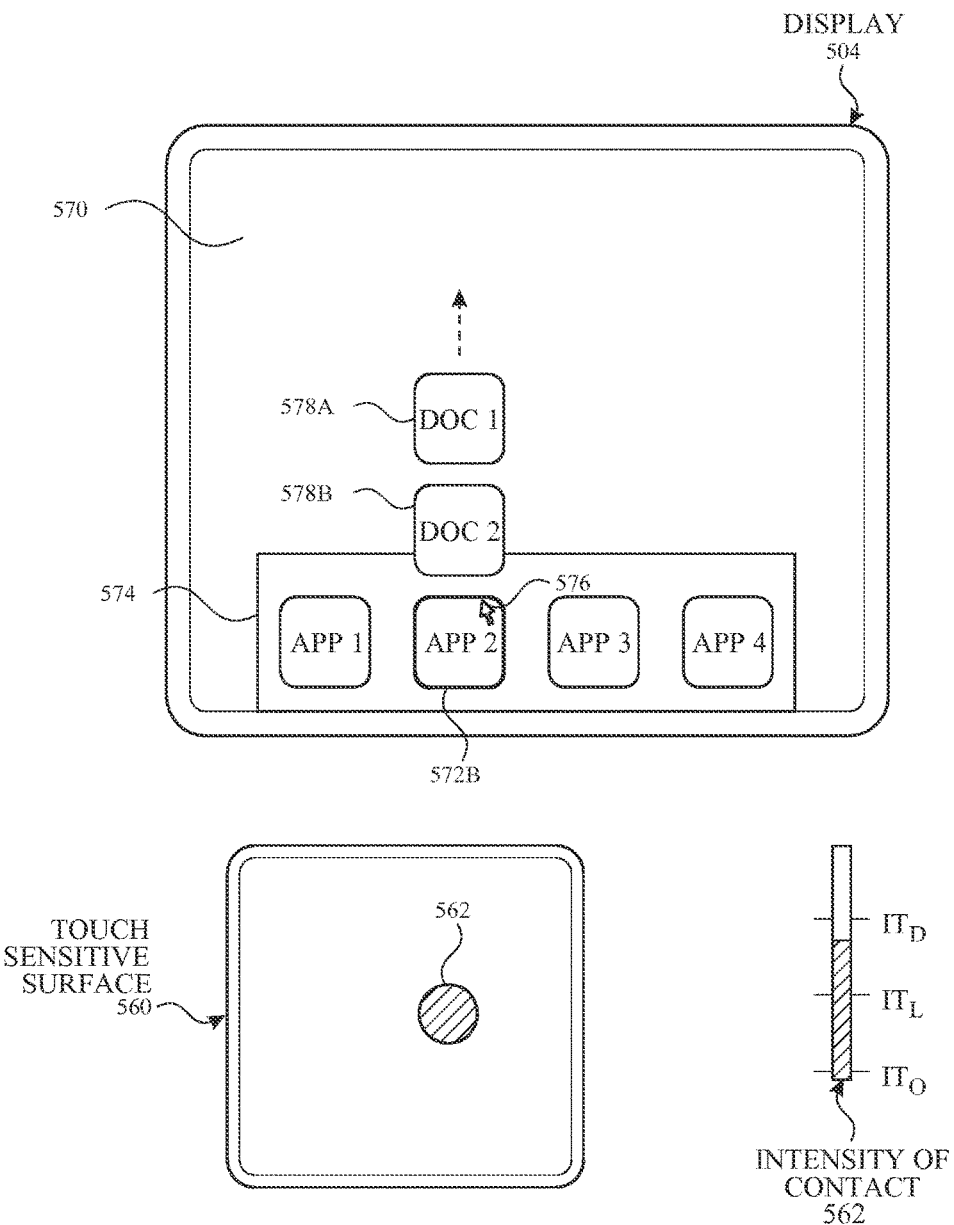
Figure 5H:
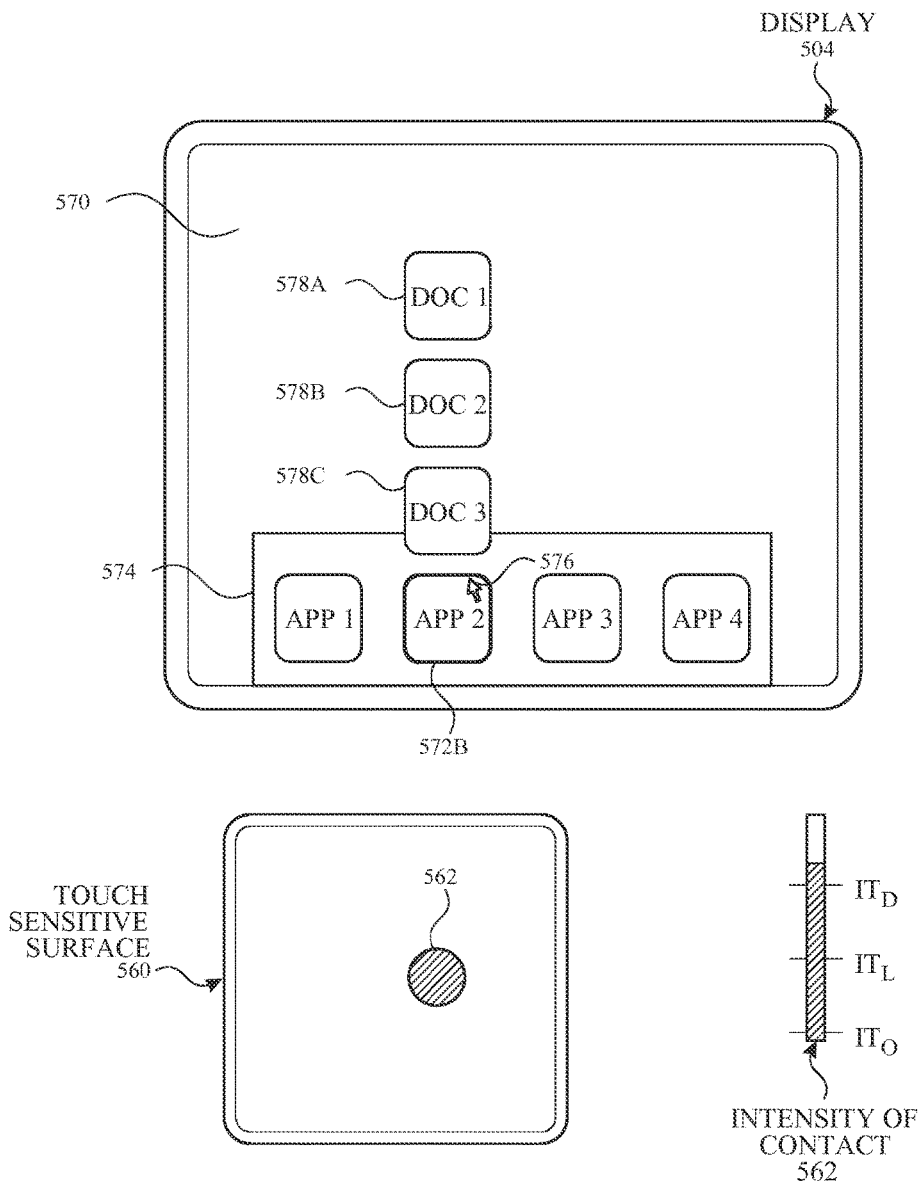

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on a multifunction device with a display and a touch-sensitive surface, such as devices 100, 300, and/or 500, to improve a user's experience in accessing, composing, and manipulating email.

Figure 6A:
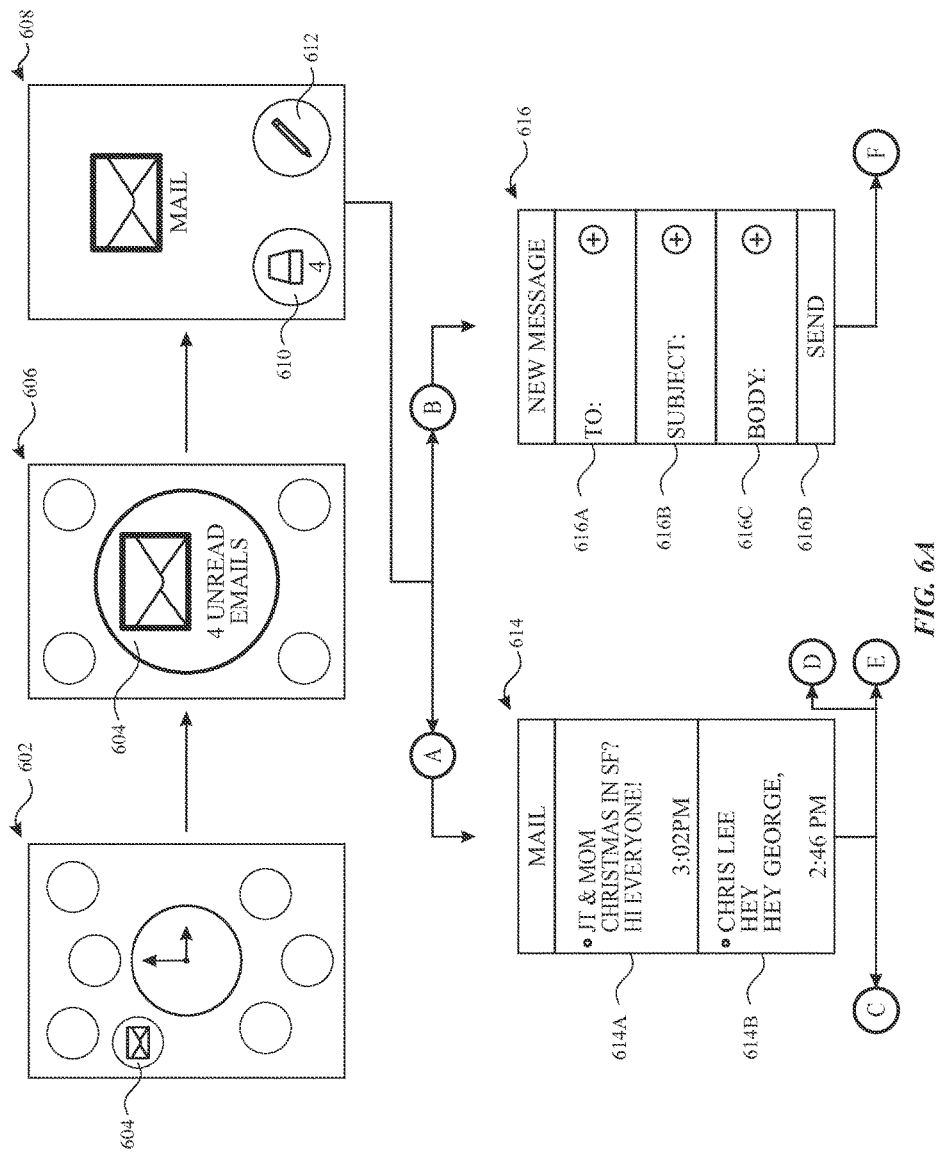
FIGS. 6A-6I illustrate exemplary user interfaces for accessing, composing, and manipulating electronic mail.

FIGS. 6A-6I illustrate exemplary user interfaces for accessing, composing, and manipulating electronic mail using an electronic device. In some embodiments, the electronic device is device 500. The electronic device has a display (e.g., 112, 340, 504), a touch-sensitive surface (e.g., 112, 355, 504), and a rotatable input mechanism (e.g., 506). In FIG. 6A, user interface screen 602 displays multiple affordances (e.g., a plurality of icons). Each affordance is associated with a software application such that when an affordance is activated by a user, the application associated with the activated affordance is displayed on the display of the electronic device. User interface screen 602 includes an affordance representing an electronic mail application 604 (e.g., an icon among the plurality of icons). The device receives user input representing movement of the rotatable input mechanism (e.g., the user rotates the rotatable input mechanism in a first direction). In response to receiving the user input representing movement of the rotatable input mechanism, the device displays user interface screen 606, which includes an enlarged view of the affordance representing the electronic mail application 604.

In FIG. 6A, the affordance representing the electronic mail application 604 on user interface screen 606 includes an indication of a number of unread electronic mail messages (e.g., the icon includes the number of unread emails) of the electronic mail application. In this example, the affordance representing the electronic mail application 604 indicates that the electronic mail application includes four unread electronic mail messages (e.g., "4 unread emails"). The device receives user input representing movement of the rotatable input mechanism (e.g., rotation of the rotatable input mechanism in the first direction while the affordance representing the electronic mail application 604 is substantially in the center of the display; the user activates the electronic mail application). In response to receiving the user input representing the movement of the rotatable input mechanism, the device displays a landing screen 608 (e.g., the screen displayed when the application starts or the screen displayed after the application initializes) of the electronic mail application. In some examples, if the user rotates the rotatable input mechanism in a second direction (e.g., opposite to the first direction) while at user interface screen 606, the device does not display the landing screen 608 in response to the rotation in the second direction.

Alternatively, rather than receiving user input representing movement of the rotatable input mechanism, the device receives user input associated with the affordance representing the electronic mail application 604 (e.g., the user activates the affordance 604 by touching the affordance 604). In response to receiving the user input associated with the affordance representing the electronic mail application 604, the device displays the landing screen 608 (e.g., the screen displayed when the application starts or the screen displayed after the application initializes) of the electronic mail application.

At FIG. 6A, the landing screen 608 includes at least two affordances: an inbox affordance 610 and a compose affordance 612. In this example, inbox affordance 610 also includes an indication of the number of unread email messages (e.g., "4"). In some embodiments, the inbox affordance 610 and the compose affordance 612 are displayed concurrently. Thus, the user can select between the inbox affordance 610 and the compose affordance 612 on the landing screen 608. The inbox affordance 610, when activated, enables display of an email inbox. The compose affordance 612, when activated, enables a user to compose a new electronic mail message. Generally, a user can activate an affordance or object by using a finger tap on the displayed affordance or object.

Reviewing emails stored in the inbox and composing emails are two frequently accessed functions. Accordingly, providing concurrent access to these two functions provides the user with efficient email access. The device receives user input associated with the landing screen 608 (e.g., the user activates the inbox affordance 610 or the compose affordance 612; generally, displayed items are associated with user inputs in a contextual manner, such as the user input being received at a location on the touch-sensitive surface that corresponds to the location of the displayed item on the display to activate the displayed item). Thus, an input associated with a particular displayed affordance or object may be, for example, a detected touch at the location of the displayed affordance or object.

The device determines whether the user input associated with the landing screen 608 represents a touch associated with the displayed inbox affordance 610 or a touch associated with the displayed compose affordance 612 (e.g., the devices determines whether the user activates the inbox affordance 610 or the compose affordance 612 by, for example, tapping on the affordance).

At FIG. 6A, in response to receiving the user input associated with the landing screen 608 and in accordance with a determination that the user input associated with the landing screen 608 represents a touch associated with the displayed inbox affordance 610 (e.g., the user tapped on the inbox affordance 610), the device displays, on the display, a list of electronic mail thread objects 614A-B, including electronic mail thread objects 614A and 614B (e.g., the device displays an email inbox that includes different email threads). Thus, the inbox affordance 610, when activated, causes display of the list of electronic mail thread objects 614A-B.

At FIG. 6A, at user interface screen 614, the list of electronic mail thread objects 614A-B includes electronic mail thread objects 614A and 614B. An electronic mail thread object (e.g., 614A and 614B) may include one or more of: all or a portion of the name of the individual who sent an email associated with the electronic mail thread object (e.g., "JT" and "Mom" in object 614A), all or a portion of the subject of an email associated with the electronic mail thread object (e.g., "Christmas in SF" in object 614A), all or a portion of the body of the email associated with the electronic mail thread object (e.g., "Hi everyone!" in object 614A), and the day and/or time stamp of an email associated with the electronic mail thread object (e.g., "3:02 PM" in object 614A). In some embodiments, the user can swipe up or down on the list of electronic mail thread objects 614A-B to scroll through the list of electronic mail thread objects 614A-B. In some embodiments, the user can rotate the rotatable input mechanism to scroll through the list of electronic mail thread objects 614A-B. Rotating the rotatable input mechanism in a first direction causes the list to scroll up. Rotating the rotatable input mechanism in a second direction causes the list to scroll down. The first direction is different than the second direction.

At FIG. 6A, in response to receiving the user input associated with the landing screen 608 and in accordance with a determination that the user input associated with the landing screen 608 represents a touch associated with the displayed compose affordance 612 (e.g., the user activates the compose affordance 612), the device displays an interface for composing a new electronic mail message 616 (e.g., a user interface for entering email recipient, subject, and body). Thus, the compose affordance 612, when activated, causes display of the interface for composing a new electronic mail message 616.

Affordance 616A, when activated, enables a user to add recipients to the new electronic mail message. Affordance 616B, when activated, enables a user to add a subject. Affordance 616C, when activated, enables a user to add text to the body. Affordance 616D, when enabled and activated, causes the new electronic mail message to be transmitted to recipients.

Returning to user interface screen 614, the user can access multiple features of the electronic mail application. In accordance with some embodiments, the device receives user input representing a touch associated with an electronic mail thread object 614A of the list of electronic mail thread objects 614A-B. In response to receiving user input representing the touch associated with an electronic mail thread object 614A of the list of electronic mail thread objects 614A-B, the device displays, on the display, a list of electronic mail message objects 618A-B associated with the electronic mail thread object 614A. Thus, object 614A, when activated, causes display of a list of electronic mail message objects 618A-B.

Figure 6B:
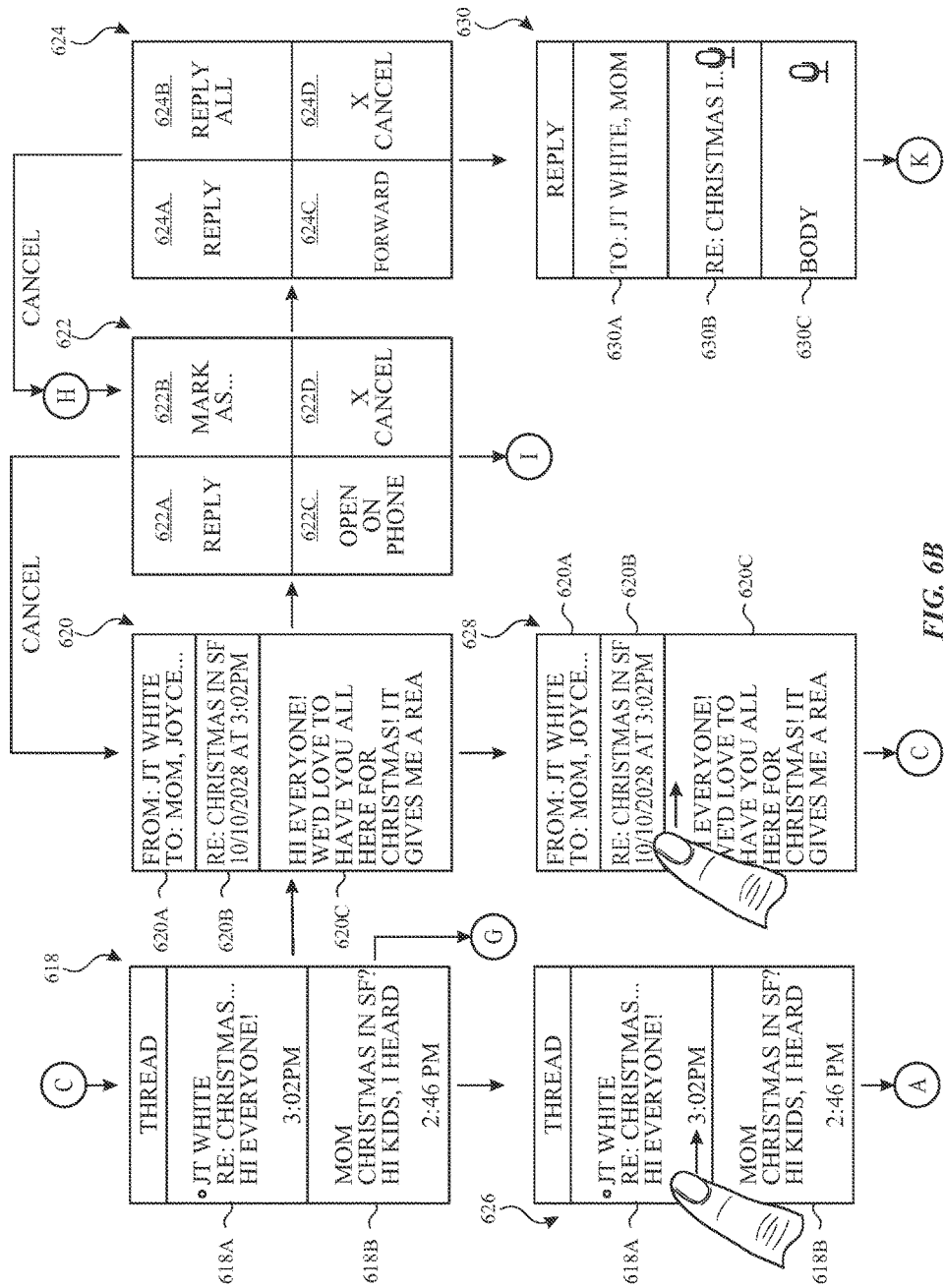

At FIG. 6B, the list of electronic mail message objects 618A-B includes electronic mail message objects 618A and 618B. An electronic mail message object (e.g., 618A and 618B) may include one or more of: all or a portion of the name of the individual who sent the email associated with the electronic mail message object (e.g., "JT White" in object 618A), all or a portion of the subject of the email associated with the electronic mail message object (e.g., "Re: Christmas . . . " in object 618A), all or a portion of the body of the email associated with the electronic mail message object (e.g., "Hi everyone!" in object 618A), and the day and/or time stamp of the email associated with the electronic mail message object (e.g., "3:02 PM" in object 618A). In some embodiments, the user can swipe up or down to scroll the list of electronic mail message objects 618A-B. In some embodiments, the user can rotate the rotatable input mechanism to scroll through the list of electronic mail thread objects 618A-B. Rotating the rotatable input mechanism in a first direction causes the list to scroll up. Rotating the rotatable input mechanism in a second direction causes the list to scroll down. The first direction is different than the second direction.

In accordance with some embodiments, while displaying user interface screen 618 the device receives user input representing a substantially horizontal swipe gesture from a bezel of the electronic device (e.g., a swipe right gesture originating at a left bezel) at the list of electronic mail message objects 618A-B, as illustrated at user interface screen 626. In response to receiving user input representing the substantially horizontal swipe gesture from the bezel of the electronic device (e.g., a swipe right gesture originating at a left bezel) at the list of electronic mail message objects 618A-B, the device replaces display of the list of electronic mail message objects 618A-B with the list of electronic mail thread objects 614A-B, as illustrated in user interface 614.

In accordance with some embodiments, while displaying user interface screen 618, the device receives user input representing a touch associated with an electronic mail message object 618A of the list of electronic mail message objects 618A-B (e.g., the user taps on object 618A). In response to receiving user input representing the touch associated with an electronic mail message object 618A of the list of electronic mail message objects 618A-B, the device displays, on the display, an electronic mail message associated with the electronic mail message object, as illustrated in user interface screen 620. The electronic mail message 620A-C of user interface screen 620 may include the names of the sender and recipient(s) 620A, a subject 620B, and a body 620C. Thus, the electronic mail message object, when activated, causes display of an electronic mail message.

In accordance with some embodiments, while displaying user interface screen 620 the device receives user input representing a substantially horizontal swipe gesture from a bezel of the electronic device (e.g., a swipe right gesture originating at a left bezel) associated with the electronic mail message 620A-C, as illustrated at user interface screen 628. In response to receiving user input representing the substantially horizontal swipe gesture from the bezel of the electronic device (e.g., a swipe right gesture originating at a left bezel) associated with the electronic mail message 620A-C, the device replaces display of the electronic mail message 620A-C with the list of electronic mail message objects 618A-B, as illustrated in user interface screen 618.

In accordance with some embodiments, the touch-sensitive surface of the device is configured to detect intensity of touches (e.g., using 524). While displaying user interface screen 620, the device receives user input representing a touch on the electronic mail message 620A-C. The device determines whether a characteristic intensity of the touch on the electronic mail message 620A-C is above an intensity threshold (e.g., intensity may be measured based on pressure or determined based on the size of a touch). In response to receiving the user input representing the touch on the electronic mail message 620A-C and in accordance with a determination that the characteristic intensity of the touch is above the intensity threshold (e.g., a deep press; intensity may be measured based on pressure or determined based on the size of a touch), the device displays, on the display, a first set of one or more affordances 622A-D associated with the electronic mail message 620A-C, as illustrated in user interface screen 622. Thus, electronic mail message 620A-C, when activated with a touch above the intensity threshold, causes display of a contextual menu with affordances. A touch below the intensity threshold on electronic mail message 620A-C will not cause display of the contextual menu with affordances. Instead, for example, a touch below the intensity threshold on electronic mail message 620A-C may be used to scroll the electronic mail message 620A-C, such as by touching and swiping up or down.

In accordance with some embodiments, displaying the first set of one or more affordances 622A-D associated with the electronic mail message comprises replacing display of the electronic mail message 620A-C with display of the first set of one or more affordances 622A-D associated with the electronic mail message 620A-C.

In accordance with some embodiments, as illustrated in user interface screen 622, the first set of one or more affordances 622A-D associated with the electronic mail message 620A-C includes one or more of (1) an affordance associated with replying to the electronic mail message 622A, (2) an affordance associated with marking (e.g., marking as unread, junk, flagged) the electronic mail message 622B, (3) an affordance associated with opening the electronic mail message on a second device (e.g., a phone, tablet, or computer) 622C, and (4) a first affordance associated with a cancel action associated with the electronic mail message 622D.

In accordance with some embodiments, while displaying user interface screen 622, the device receives user input representing a touch associated with the first affordance associated with the cancel action 622D. In response to receiving user input representing the touch associated with the first affordance associated with the cancel action 622D, the device replaces display of the first set of one or more affordances 622A-D with display of the electronic mail message 620A-C, as illustrated in user interface screen 620. Thus, a user can cancel out of user interface screen 622 and return to user interface screen 620 by activating the first affordance associated with the cancel action 622D by, for example, tapping on the first affordance associated with the cancel action 622D.

In accordance with some embodiments, while displaying user interface screen 622, the device receives user input representing a touch associated with the affordance associated with replying to the electronic mail message 622A. In response to receiving user input representing the touch associated with the affordance associated with replying to the electronic mail message 622A, the device replaces display of the first set of one or more affordances 622A-D with a second set of one or more affordances associated with the electronic mail message 624A-D, as illustrated in user interface screen 624. Thus, affordance 622A, when activated, causes display of the second set of one or more affordances 624A-D.

In accordance with some embodiments, as illustrated in user interface screen 624, the second set of affordances associated with the electronic mail message 624A-D includes one or more of (1) an affordance associated with replying to the sender of the electronic mail message 624A, (2) an affordance associated with replying to all recipients (e.g., sender and any recipients) of the electronic mail message 624B, (3) an affordance associated with forwarding the electronic mail message 624C, and (4) a second affordance associated with a cancel action associated with the electronic mail message 624D.

In accordance with some embodiments, while displaying user interface screen 624, the device receives user input representing a touch associated with the second affordance associated with the cancel action 624D. In response to receiving user input representing the touch associated with the second affordance associated with the cancel action 624D, the device replaces display of the second set of one or more affordances 624A-D with display of the first set of one or more affordances 622A-D (e.g. for replying, marking, opening, and canceling), as illustrated in user interface screen 622. Thus, a user can cancel out of user interface screen 624 and return to user interface screen 622 by activating the second affordance associated with the cancel action 624D.

In accordance with some embodiments, while displaying user interface screen 624, the device receives user input representing a touch associated with the affordance associated with replying to the sender of the electronic mail message 624A. In response to receiving user input representing the touch associated with the affordance associated with replying to the sender of the electronic mail message 624A, the device replaces display of the second set of one or more affordances 624A-D with display of an interface for replying to the electronic mail message. The interface for replying to the electronic mail message auto-populates the recipient of a new electronic mail message based on the sender of the electronic mail message being replied to. Thus, affordance 624A, when activated, causes display of the interface for replying to the electronic mail message.

In accordance with some embodiments, while displaying user interface screen 624, the device receives user input representing a touch associated with the affordance associated with replying to all recipients of the electronic mail message 624B. In response to receiving user input representing the touch associated with the affordance associated with replying to all recipients (e.g., sender and any recipients) of the electronic mail message 624B, the device replaces display of the second set of one or more affordances 624A-D with display of an interface for replying to all recipients of the electronic mail message 630A-D, as illustrated in user interface screen 630. The interface for replying to all recipients of the electronic mail message auto-populates the recipient of a new electronic mail message based on the sender of the electronic mail message being replied to and all recipients of the electronic mail message being replied to, other than the user. Thus, affordance 624B, when activated, causes display of the interface for replying to all recipients of the electronic mail message 630.

In accordance with some embodiments, at user interface 630, the user can modify the recipients, modify the subject, or modify the body of the reply electronic mail message. When the device receives user input associated with affordance 630A, the device displays a user interface screen for adding and/or removing recipients. When the device receives user input associated with affordance 630B, the device displays a user interface screen for changing the subject. For example, the device enables a microphone and enters into a dictation mode for changing the subject. When the device receives user input associated with affordance 630C, the device displays a user interface screen for adding text to the body, as illustrated in user interface screen 632. For example, the device enables a microphone and enters into a dictation mode for adding text to the body. Cancel affordance 632A, when activated, causes the device to return to the display of user interface screen 630.

Figure 6C:
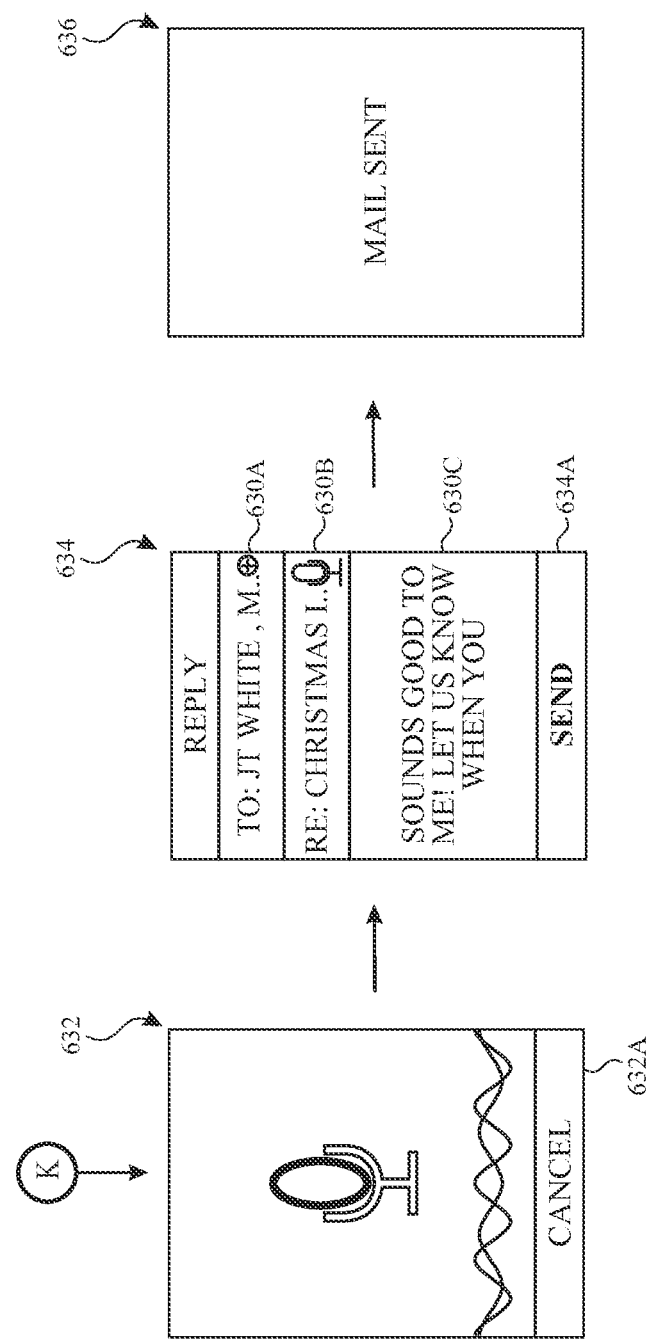

At FIG. 6C, in accordance with some embodiments, in response to a change in the recipient, subject, or body of the reply electronic mail message, the device determines whether the reply electronic mail message includes recipient information, subject information, and body information (e.g., whether all the fields are populated). In response to determining that the reply electronic mail message includes recipient information, subject information, and body information, the device displays an affordance associated with sending the new electronic mail message 634A (e.g., once the recipient, subject, and body have content, a send affordance becomes enabled and is no longer grayed out), as illustrated in user interface 634. In response to detecting activation of the affordance associated with sending the new electronic mail message 634A, the device transmits the reply electronic mail message and displays a confirmation user interface screen 636.

At FIG. 6B, in accordance with some embodiments, while displaying user interface screen 624, the device receives user input representing a touch associated with the affordance associated with forwarding the electronic mail message 624C. In response to receiving user input representing the touch associated with the affordance associated with forwarding the electronic mail message 624C, the device replaces display of the second set of one or more affordances 624A-D with display of an interface for forwarding the electronic mail message. The interface for forwarding the electronic mail message does not auto-populate the recipient of a new electronic mail message. However, the subject is auto-populated and is based the subject of the electronic mail message being forwarded. Thus, affordance 624C, when activated, causes display of an interface for forwarding the electronic mail message.

At FIG. 6B, in accordance with some embodiments, while displaying user interface screen 622, the device receives user input representing a touch associated with the affordance associated with marking the electronic mail message 622B. In response to receiving user input representing the touch associated with the affordance associated with marking the electronic mail message 622B, the device replaces display of the first set of one or more affordances 622A-D with a third set of one or more affordances associated with the electronic mail message 640A-D (e.g., flag, mark unread, archive, and cancel affordances), as illustrated in user interface screen 640. Thus, affordance 622B, when activated, causes display of affordances for marking the electronic mail message.

Figure 6D:
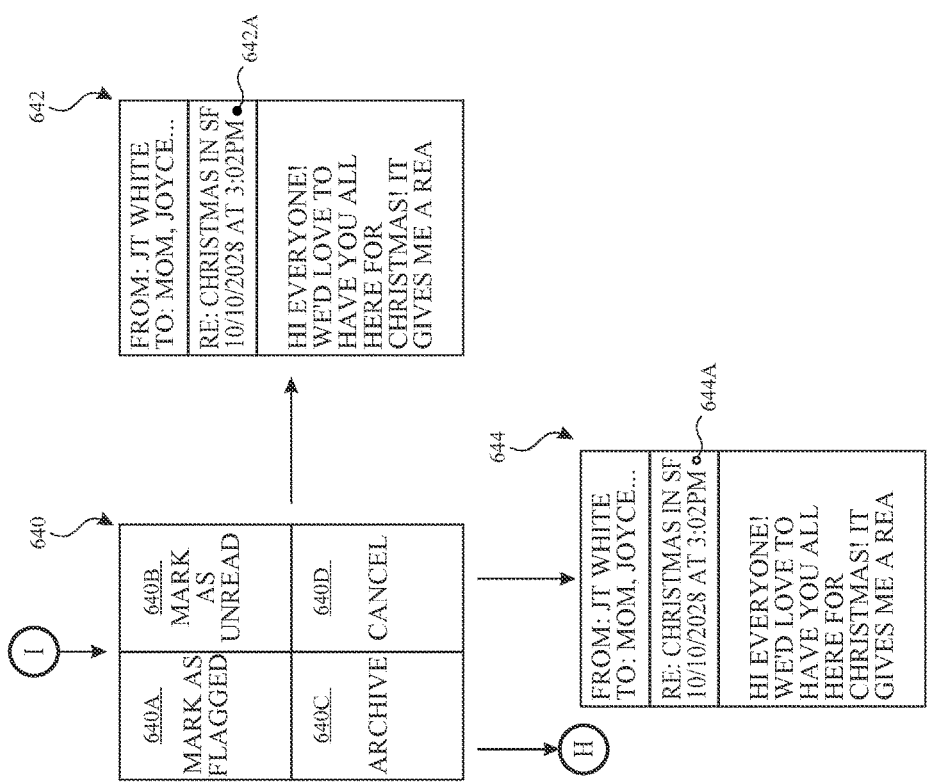

At FIG. 6D, in accordance with some embodiments, as illustrated in user interface screen 640, the third set of affordances associated with the electronic mail message 640A-D includes one or more of (1) an affordance associated with flagging the electronic mail message 640A, (2) an affordance associated with marking as unread the electronic mail message 640B, (3) an affordance associated with archiving the electronic mail message 640C, and (4) a third affordance associated with a cancel action associated with the electronic mail message 640D.

At FIG. 6D, in accordance with some embodiments, while displaying user interface screen 640, the device receives user input representing a touch associated with the third affordance associated with the cancel action 640D. In response to receiving user input representing the touch associated with the third affordance associated with the cancel action 640D, the device replaces display of the third set of one or more affordances 640A-D with display of the first set of one or more affordances 622A-D (e.g. for replying, marking, opening, and canceling), as illustrated in user interface screen 622. Thus, a user can cancel out of user interface screen 640 and return to user interface screen 622 by activating the third affordance associated with the cancel action 640D.

At FIG. 6D, in accordance with some embodiments, while displaying user interface screen 640, the device receives user input representing a touch associated with the affordance associated with flagging the electronic mail message 640A. In response to receiving user input representing the touch associated with the affordance associated with flagging the electronic mail message 640A, the device replaces display of the third set of one or more affordances 640A-D with display of the electronic mail message, including a flag indicator 642A (e.g., display the email with a dot that appears next to the subject line to indicate the email is flagged), as illustrated in user interface screen 642. Thus, a user can flag an electronic mail message for special attention. As an alternative to the flag indicator 642A (e.g., a dot), the flag indicator may also be a graphical image of a flag. In some embodiments, if the email was previously flagged, activating affordance 640A causes the flag indicator to be removed from the previously flagged email. Thus, affordance 640A, when activated, causes the electronic mail message to be flagged for later review.

At FIG. 6D, in accordance with some embodiments, while displaying user interface screen 640, the device receives user input representing a touch associated with the affordance associated with marking as unread the electronic mail message 640B. In response to receiving user input representing the touch associated with the affordance associated with marking as unread the electronic mail message 640B, the device replaces display of the third set of one or more affordances 640A-D with display of the electronic mail message 644, including an unread indicator 644A (e.g., display the email with a circle that appears next to the subject line to indicate the email is unread). Thus, affordance 640B, when activated, causes the previously read email to be marked as unread.

In accordance with some embodiments, while displaying user interface screen 640, the device receives user input representing a touch associated with the affordance associated with archiving the electronic mail message 640C. In response to receiving user input representing the touch associated with the affordance associated with archiving the electronic mail message 640C, the device moves the electronic mail message into an archive folder. Thus, affordance 640C, when activated, causes the electronic mail message to be archived.

In accordance with some embodiments, the device may be linked with a companion device, such as through short-range wireless communication. The companion device may be, for example, a cellular telephone, a laptop, or a tablet. While displaying user interface screen 622, the device receives user input representing a touch associated with the affordance associated with opening the electronic mail message 622C. In response to receiving user input representing the touch associated with the affordance associated with opening the electronic mail message 622C, the device causes the electronic mail message to be displayed on a linked companion device (e.g., displaying the email message on a phone, tablet, or laptop that has been linked to the electronic device). For example, the device may transmit a wireless instruction to the companion device that includes an indication of the electronic mail message that should be displayed. This allows the user to seamlessly transition from viewing the electronic mail message on the screen of the device to viewing the electronic mail message on the screen of the companion device. Thus, affordance 622C, when activated, causes the electronic mail message to be displayed on a linked companion device.

Returning to the interface for composing a new electronic mail message 616 (e.g., a user interface for entering email recipient, subject, and body) of FIG. 6A, in accordance with some embodiments, the interface for composing the new electronic mail message 616 comprises one or more of (1) an affordance associated with adding recipient information to the new electronic mail message 616A, (2) an affordance associated with adding subject information to the new electronic mail message 616B, and (3) an affordance associated with adding body information to the new electronic mail message 616C. Affordance 616A, when activated, enables the user to add recipient information. Affordance 616B, when activated, enables the user to add subject information. Affordance 616C, when activated, enables the user to add body information. In the interface for composing new electronic mail message 616, affordance 616D is visible but cannot be activated by the user until the device determines that the new electronic mail message includes at least one recipient, subject text, and body text. Affordance 616D, when activated, causes the new electronic mail message to be transmitted to the recipient(s).

In accordance with some embodiments, while displaying the interface for composing a new electronic mail message 616, the device receives user input representing a touch associated with the affordance associated with adding recipient information to the new electronic mail message 616A. In response to receiving user input representing the touch associated with the affordance associated with adding recipient information to the new electronic mail message 616A, the device replaces display of the interface for composing the new electronic mail message with display of a fourth set of one or more affordances associated with the new electronic mail message 646A-C (e.g. for selecting recipient using a recent, dictation, or keyboard affordance), as illustrated in user interface screen 646 of FIG. 6E. Thus, affordance 616A, when activated, enables a user to enter recipient information.

Figure 6E:
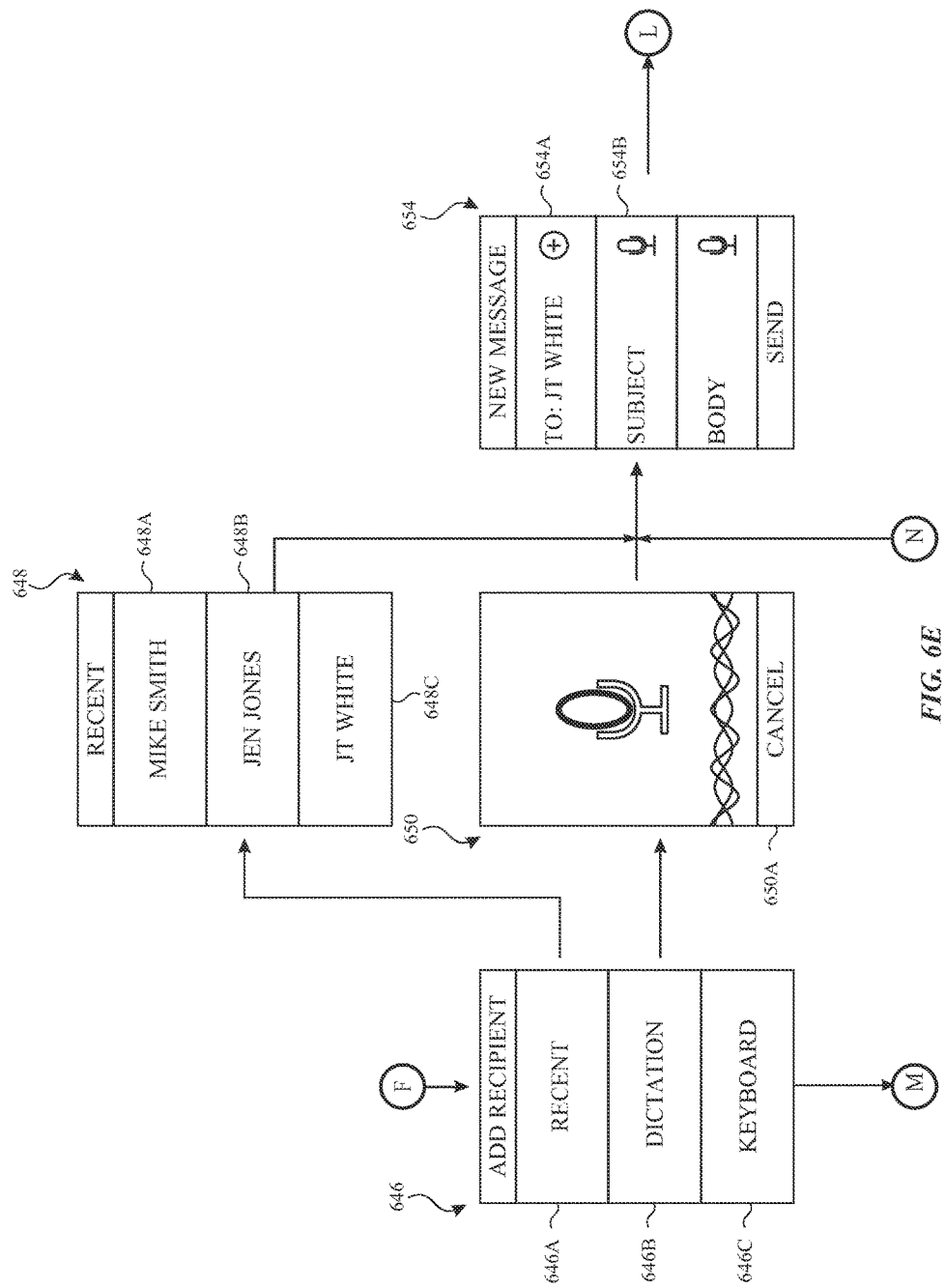

At FIG. 6E, in accordance with some embodiments, as illustrated in user interface screen 646, the fourth set of one or more affordances associated with the new electronic mail message 646A-C includes one or more of (1) an affordance associated with recent contacts 646A, (2) an affordance associated with dictation 646B, and (3) an affordance associated with a keyboard 646C. For example, this allows the user to select from among three methods to select one or more recipients for the new electronic mail message.

In accordance with some embodiments, while displaying user interface screen 646, the device receives user input representing a touch associated with the affordance associated with recent contacts 646A. In response to receiving user input representing the touch associated with the affordance associated with recent contacts 646A, the device replaces display of the fourth set of one or more affordances 646A-C with display of one or more recent contact affordances 648A-C (e.g. display a list of contacts recently contacted (incoming and/or outgoing)), as illustrated in user interface screen 648. Thus, affordance 646A, when activated, enables a user to select a recipient from among contacts with which the user has recently interacted. In one example, the recent contacts may be limited to a predetermined number of contacts. In one example, the list of contacts may include the last six contacts that have either (1) initiated a communication (e.g., an email, a phone call, a text message) with the user and/or (2) have had a communication (e.g., an email, a phone call, a text message) initiated with by the user. Affordance 648A is associated with the contact "Mike Smith." Affordance 648B is associated with the contact "Jen Jones." Affordance 648C is associated with the contact "JT White."

At FIG. 6E, in accordance with some embodiments, while displaying user interface screen 648, the device receives a user input representing a touch associated with a recent contact affordance 648C of the one or more recent contact affordances 648A-C. The recent contact affordance 648C is associated with an email address. For example, the associated email address is the email address of the person or entity identified by the recent contact affordance 648C. For example, the information associating the contact with the email address may be stored in an electronic address book on the device or accessed remotely from a server over the Internet. In response to receiving user input representing the touch associated with the recent contact affordance, the device adds the email address as recipient information to the new electronic mail message. At the interface for composing a new electronic mail message 654, the new electronic mail message has been updated to reflect the addition of "JT White" in the field 654A. Thus, affordance 648C, when selected, adds a recent contact as a recipient to the new electronic mail message.

In accordance with some embodiments, while displaying user interface screen 646, the device receives user input representing a touch associated with the affordance associated with dictation 646B. In response to receiving user input representing the touch associated with the affordance associated with dictation 646B, the device replaces display of the fourth set of one or more affordances 646A-C with display of a dictation interface 650 (e.g. enable a microphone of the electronic device and display a graphic waveform based on audio input received at the microphone). For example, the device enables a microphone and enters into a dictation mode for adding a recipient to the new electronic mail message. Cancel affordance 650A, when activated, causes the device to return to the display of user interface screen 646.

In accordance with some embodiments, the device receives user input representing recipient speech (e.g., the device records audio input of the name of an intended recipient). In response to receiving user input representing recipient speech, the device transcribes the user input representing recipient speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed recipient speech as recipient information to the new electronic mail message. For example, the transcription can be performed using speech-to-text and/or automatic speech recognition using a virtual assistant. At the interface for composing a new electronic mail message 654, the new electronic mail message has been updated to reflect the addition of "JT White" in the field 654A. Thus, the user can provide audio input to select or enter a recipient for the new electronic mail message.

An example of a virtual assistant is described in Applicants' U.S. Utility application Ser. No. 12/987,982 for "Intelligent Automated Assistant," filed Jan. 10, 2011, the entire disclosure of which is incorporated herein by reference.

In accordance with some embodiments, while displaying user interface screen 646, the device receives user input representing a touch associated with the affordance associated with the keyboard 646C. In response to receiving user input representing the touch associated with the affordance associated with the keyboard 646C, the device replaces display of the fourth set of one or more affordances 646A-C with display of one or more keys of a keyboard (e.g. display a keyboard that allows user input to enter recipient information), as illustrated in user interface screen 652. Thus, affordance 646C, when activated, enables a user to enter recipient information using a displayed virtual keyboard.

In accordance with some embodiments, while displaying user interface screen 652, the device receives user input representing keyboard input using the one or more keys of the keyboard, as illustrated in user interface screen 652. The user input representing keyboard input is associated with an email address (e.g., the user enters an email address or a name linked to an email address using the keyboard). In response to receiving user input representing the keyboard input, the device adds the email address as recipient information to the new electronic mail message. At the interface for composing a new electronic mail message 654, the new electronic mail message has been updated to reflect the addition of "JT White" in the field 654A. Thus, the user can provide keyboard input to select or enter a recipient for the new electronic mail message.

In accordance with some embodiments, while displaying the interface for composing a new electronic mail message 654 (e.g., a user interface for entering email recipient, subject, and body), the device receives user input representing a touch associated with the affordance associated with adding subject information to the new electronic mail message 654B. In response to receiving user input representing the touch associated with the affordance associated with adding subject information to the new electronic mail message 654B, the device replaces display of the interface for composing the new electronic mail message 654 with display of a dictation interface 656 (e.g. enable a microphone of the electronic device and display a graphic waveform based on audio input received at the microphone). Thus, affordance 654B, when activated, enables the user to provide audio input to enter a subject. At user interface screen 656, cancel affordance 656A, when activated, causes the device to return to the display of user interface screen 654.

In accordance with some embodiments, the device receives user input representing subject speech. In response to receiving user input representing subject speech, the device transcribes the user input representing subject speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed subject speech as subject information to the new electronic mail message. At the interface for composing a new electronic mail message 658, the new electronic mail message has been updated to reflect the addition of "Dinner" in the field 658A. Thus, the user can enter a subject for the new electronic mail message by speaking the subject. Note that send affordance 658C is not enabled (and therefore cannot be activated by the user) because the body does not yet include text, as shown by affordance 658B.

Figure 6F:
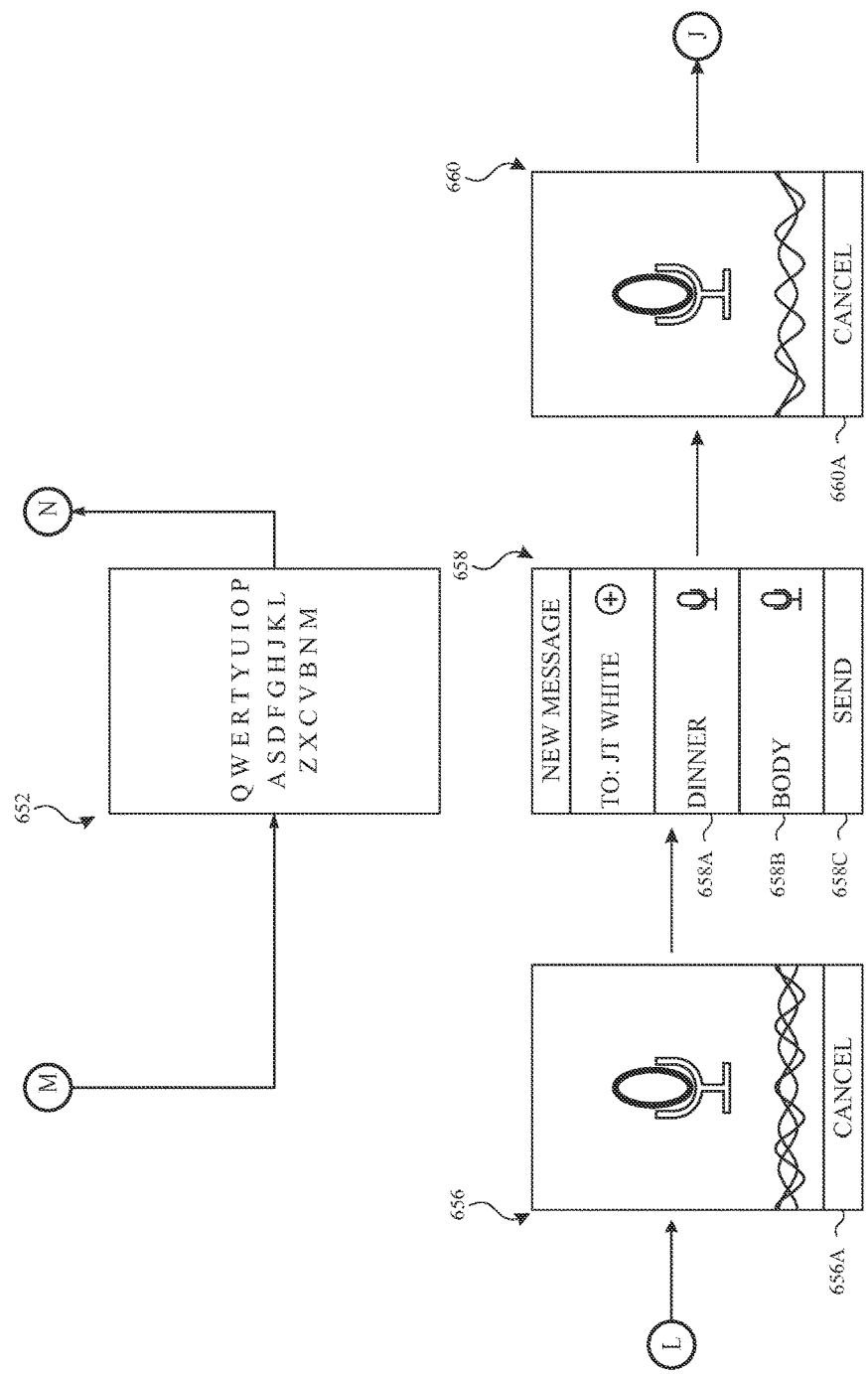

At FIG. 6F, in accordance with some embodiments, the device receives user input representing a touch associated with the affordance associated with adding body information to the new electronic mail message 658B. In response to receiving user input representing the touch associated with the affordance associated with adding body information to the new electronic mail message 658B, the device replaces display of the interface for composing the new electronic mail message 658 with display of a dictation interface 660 (e.g. enable a microphone of the electronic device and display a graphic waveform based on audio input received at the microphone; automatic speech recognition can happen at the device, at a remote device, or at a remote server). Thus, affordance 658B, when activated, enables the user to provide audio input to enter body information. At user interface screen 660, cancel affordance 660A, when activated, causes the device to return to the display of user interface screen 658.

In accordance with some embodiments, the device receives user input representing body speech. In response to receiving user input representing body speech, the device transcribes the user input representing body speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed body speech as body information to the new electronic mail message.

Figure 6G:
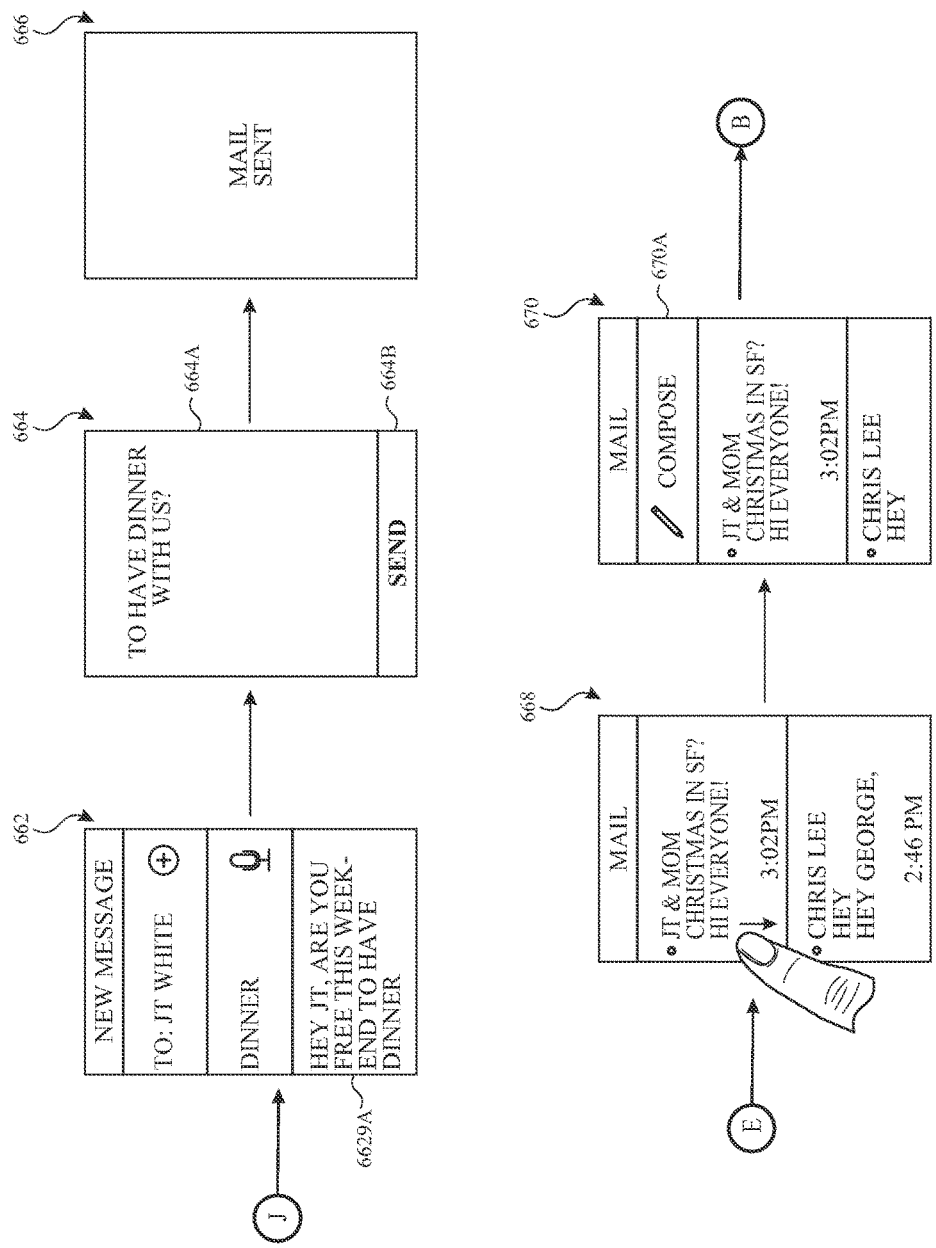

At FIG. 6G, at the interface for composing a new electronic mail message 662, the new electronic mail message has been updated to reflect the addition of "Hey JT, are you free this weekend to have dinner with us?" in the field 662A. By scrolling down, the user can see the remainder of the body 664A, as illustrated in user interface screen 664. Thus, the user can enter a body for the new electronic mail message by speaking the body text.

Note that send affordance 664B is now enabled (and therefore can be activated by the user) because the new electronic mail message includes recipient information ("JT White"), subject information ("Dinner"), and body information "Hey JT, are you free this weekend to have dinner with us?". In some embodiments, the device determines whether the new electronic mail message 662 includes recipient information, subject information, and body information. In response to determining that the new electronic mail message 662 includes recipient information, subject information, and body information, displaying an affordance associated with sending the new electronic mail message 664B (e.g., once the recipient, subject, and body have content, the send affordance becomes enabled and is no longer grayed out). In this example, the "send" text of affordance 664B is bolded to indicate that it can be activated by the user.

In accordance with some embodiments, the device receives user input representing a touch associated with the affordance associated with sending the new electronic mail message 664B (e.g., the send affordance). In response to receiving user input representing the touch associated with the affordance associated with sending the new electronic mail message 664B, the device transmits the new electronic mail message (e.g., send the email to the recipient using the subject and body entered by the user when the user presses the send button). The new electronic mail message is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the new electronic mail message to the recipients. In some embodiments, the companion device also includes a user-accessible electronic mail message application and may be configured to access the electronic mail of the user of the electronic device. Thus, in response to detecting activation of the affordance associated with sending the new electronic mail message 664A, the device transmits the new electronic mail message and, in some embodiments, displays a confirmation user interface screen 666.

Returning to user interface screen 614 of FIG. 6A, in accordance with some embodiments, the device receives user input representing a substantially downward swipe gesture (e.g., a swipe down gesture) associated with the list of electronic mail thread objects 614A-B (e.g., the inbox). For example, the device detects that the user swipes down on the list of electronic mail thread objects 614A-B to view content that is beyond the top of the list, as illustrated at user interface screen 668 of FIG. 6G. In response to receiving user input representing the substantially downward swipe gesture (e.g., a swipe down gesture) associated with the list of electronic mail thread objects 614A-B (e.g., the inbox), the device displays an affordance for composing a new electronic mail message 670A, as illustrated in user interface screen 670. Thus, when the device detects a swipe down gesture at the list of electronic mail threads, an affordance for composing new emails is displayed. In response to receiving activation of affordance 670A, the device displays, on the display, an interface for composing a new electronic mail message 616 (e.g., a user interface for entering email recipient, subject, and body).

Figure 6H:
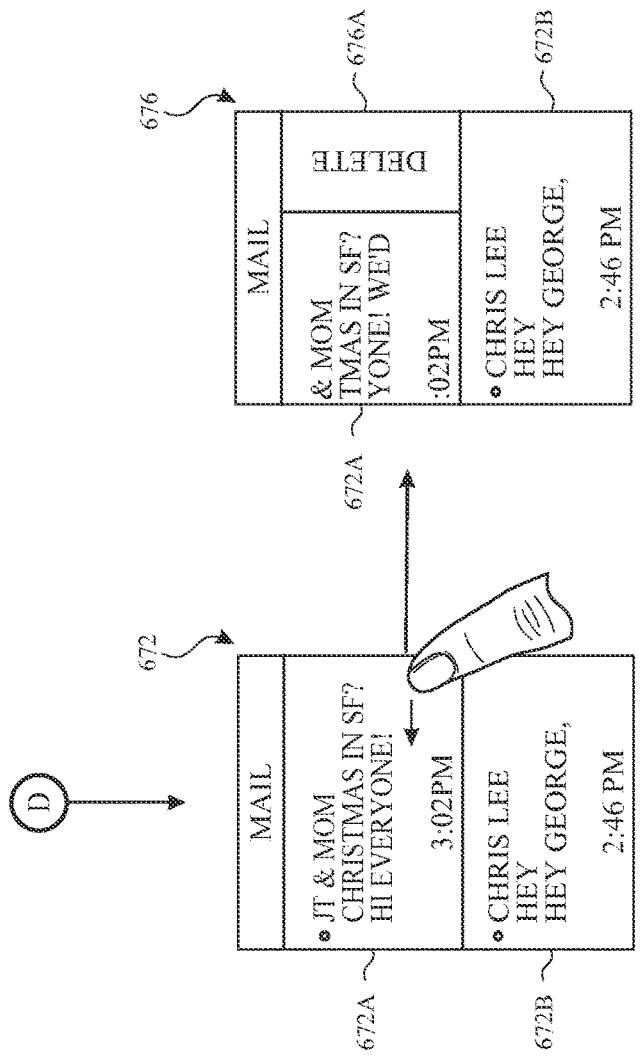

At FIG. 6H, in accordance with some embodiments, the device receives user input representing a substantially horizontal swipe gesture (e.g., a swipe left gesture) associated with an electronic mail thread object 672A of the list of electronic mail thread objects 672A-B (e.g., at a thread of the inbox), as illustrated in user interface screen 672. In some embodiments, the swipe gesture originates at a bezel of the device. In response to receiving user input representing the substantially horizontal swipe gesture (e.g., a swipe left gesture) associated with the electronic mail thread object 672A of the list of electronic mail thread objects 672A-B (e.g., at a thread of the inbox), the device displays an affordance for deleting an electronic mail thread associated with the electronic mail thread object 676A (e.g., deleting the mail thread also removes the mail thread object), as illustrated in user interface screen 676. For example, electronic mail thread object 672A slides to the left and partially out of the display to make room for the affordance 676B, as illustrated in user interface screen 676. When the user taps on affordance 676A, the entire email thread associated with affordance 676A is deleted.

In accordance with some embodiments, at FIG. 6H, the device receives user input representing a substantially horizontal swipe gesture (e.g., a swipe left gesture) associated with the electronic mail thread object 672A of the list of electronic mail thread objects 672A-B (e.g., at a thread of the inbox), as illustrated in user interface screen 672. In some embodiments, the swipe gesture originates at a bezel of the device. In response to receiving user input representing the substantially horizontal swipe gesture (e.g., a swipe left gesture) associated with the electronic mail thread object 672A of the list of electronic mail thread objects 672A-B (e.g., at a thread of the inbox), the device determines whether the user input representing the substantially horizontal swipe gesture (e.g., a swipe left gesture) associated with the electronic mail message object 672A indicates the swipe gesture exceeds a first threshold (e.g., a partial swipe across the electronic mail message object) or exceeds a second threshold (e.g., a full or 75% swipe across the electronic mail message object).

In response to receiving user input representing the substantially horizontal swipe gesture (e.g., a swipe left gesture) associated with the electronic mail message object 672A (e.g., at an email of a thread) and in accordance with a determination that the user input indicates the substantially horizontal swipe gesture (e.g., a swipe left gesture) associated with the electronic mail message object exceeds the first threshold and does not exceed the second threshold, the device displays an affordance for deleting an electronic mail message associated with the electronic mail message object 672A (e.g., the device displays an affordance for deleting the electronic mail message when the user performs a swipe left gesture across a small portion of the screen). In response to the user tapping on the affordance for deleting the electronic mail message, the electronic mail message is deleted.

In response to receiving user input representing the substantially horizontal swipe gesture (e.g., a swipe left gesture) associated with the electronic mail message object 672A (e.g., at an email of a thread) and in accordance with a determination that the user input indicates the substantially horizontal swipe gesture (e.g., a swipe left gesture) associated with the electronic mail message object exceeds the second threshold, the device deletes the electronic mail message associated with the electronic mail message object (e.g., the device deletes the mail message and removes the mail message object without requiring additional confirmation from the user when the user performs a swipe left gesture across a large portion of the screen).

Figure 6I:
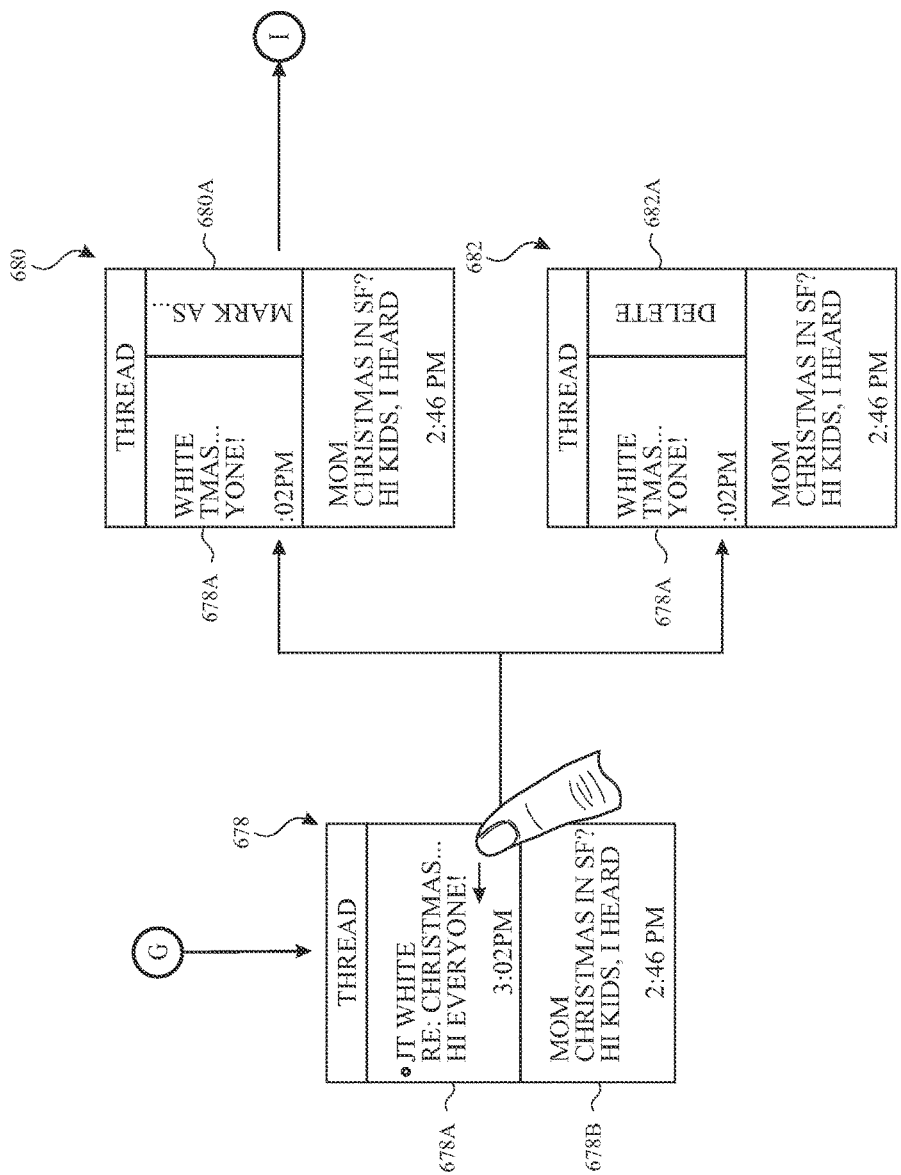

At FIG. 6I, in accordance with some embodiments, the device receives user input representing a substantially horizontal swipe gesture (e.g., a swipe left gesture) associated with an electronic mail message object 678A of the list of electronic mail message objects 678A-B (e.g., at an email of a thread), as illustrated in user interface screen 678. In response to receiving user input representing the substantially horizontal swipe gesture (e.g., a swipe left gesture) associated with the electronic mail message object 678A of the list of electronic mail message objects 678A-B (e.g., at an email of a thread), the device displays an affordance for deleting an electronic mail message associated with the electronic mail message object 682A (e.g., deleting the mail message also removes the mail message object), as illustrated in user interface screen 682. For example, electronic mail message object 678A slides to the left and partially off of the display to make room for the affordance 682A. When the user taps on affordance 682A, the email associated with affordance 682A is deleted.

In accordance with some embodiments, a partial swipe across an electronic mail object displays an affordance for marking the electronic mail and a full swipe across the electronic mail object displays an affordance for deleting the electronic mail. The device receives user input representing a substantially horizontal swipe gesture (e.g., a swipe left gesture) associated with an electronic mail message object 678A of the list of electronic mail message objects 678A-B (e.g., at an email of a thread), as illustrated in user interface screen 678. The device determines whether the user input representing the substantially horizontal swipe gesture (e.g., a swipe left gesture) associated with the electronic mail message object 678A indicates the swipe gesture exceeds a first threshold (e.g., a partial swipe across the electronic mail message object) or exceeds a second threshold (e.g., a full or 75% swipe across the electronic mail message object).

In response to receiving user input representing the substantially horizontal swipe gesture (e.g., a swipe left gesture) associated with the electronic mail message object 678A (e.g., at an email of a thread) and in accordance with a determination that the user input indicates the substantially horizontal swipe gesture (e.g., a swipe left gesture) associated with the electronic mail message object exceeds the first threshold and does not exceed the second threshold, the device displays an affordance for marking an electronic mail message associated with the electronic mail message object 680A (e.g., activating the marking affordance causes display of affordances for marking the mail message as unread, junk, and flagged), as illustrated in user interface screen 680. For example, electronic mail message object 678A slides to the left and partially off of the display to make room for the affordance 680A. In response to the user tapping on affordance 680A, user interface screen 640 is displayed, allowing the user to mark the email associated with affordance 680A.

In response to receiving user input representing the substantially horizontal swipe gesture (e.g., a swipe left gesture) associated with the electronic mail message object 678A (e.g., at an email of a thread) and in accordance with a determination that the user input indicates the substantially horizontal swipe gesture (e.g., a swipe left gesture) associated with the electronic mail message object 682B exceeds the second threshold, the device displays an affordance for deleting an electronic mail message associated with the electronic mail message object 682D (e.g., deleting the mail message also removes the mail message object). For example, electronic mail message object 682A slides to the left and partially off of the display to make room for the affordance 682B. In response to the user tapping on affordance 682B, the email associated with affordance 682B is deleted.

FIG. 7 is a flow diagram illustrating method 700 for accessing, composing, and manipulating electronic mail in accordance with some embodiments. In some embodiments, method 700 may be performed at an electronic device with a display (e.g., 112, 340, 504), a touch-sensitive surface (e.g., 112, 355, 504), and a rotatable input mechanism (e.g., 506). Some operations in method 700 may be combined, the order of some operations may be changed, and some operations may be omitted.

In some embodiments, the touch-sensitive surface is capable of detecting intensity of touch contacts. Exemplary devices that may perform method 700 include devices 100, 300, and 500 (FIGS. 1A, 3, and 5A).

Method 700 provides an intuitive way to access, compose, and manipulate electronic mail. The method reduces the cognitive burden on a user when using a device to read, send, or otherwise access or manipulate electronic mail, thereby creating a more efficient human-machine interface. For battery-operated computing devices, enabling a user to access electronic mail faster and more efficiently conserves power and increases the time between battery charges.

At block 702, an affordance representing an electronic mail application (e.g., an icon among a plurality of icons; 604) is displayed on a display, wherein the affordance representing the electronic mail application includes an indication of a number of unread electronic mail messages (e.g., the icon includes the number of unread emails) of the electronic mail application.

At block 704, user input representing movement of the rotatable input mechanism (e.g., user selects the mail app) is received.

At block 706, in response to receiving the user input representing the movement of the rotatable input mechanism, a landing screen (e.g., the screen displayed when the application starts or the screen the application reaches after initialization; 608) of the electronic mail application is displayed, wherein the landing screen includes display of an inbox affordance (e.g., 610) and a compose affordance (e.g., 612). In some examples, the inbox affordance and the compose affordance are displayed concurrently.

At block 708, user input associated with the landing screen is received (e.g., the user activates the inbox affordance or the compose affordance; generally, displayed items are associated with user inputs in a contextual manner, such as the user input being received at a location on the touch-sensitive surface that corresponds to the location of the displayed item on the display to activate the displayed item).

At block 710, it is determined whether the user input associated with the landing screen (e.g., 608) represents a touch associated with the displayed inbox affordance (e.g., 610) or a touch associated with the displayed compose affordance (e.g., 612).

At block 712, in response to receiving the user input associated with the landing screen and in accordance with a determination that the user input associated with the landing screen represents a touch associated with the displayed inbox affordance, a list of electronic mail thread objects is displayed on the display (e.g., an email inbox that displays different email threads; 614A-B).

At block 714, in response to receiving the user input associated with the landing screen and in accordance with a determination that the user input associated with the landing screen represents a touch associated the displayed compose affordance, an interface for composing a new electronic mail message is displayed on the display (e.g., a user interface for entering email recipient, subject, and body; 616).

In accordance with some embodiments, user input representing a touch associated with an electronic mail thread object of the list of electronic mail thread objects is received. In response to receiving user input representing the touch associated with an electronic mail thread object (e.g., 614A) of the list of electronic mail thread objects (e.g., 614A-B), a list of electronic mail message objects (e.g., 618A-B) associated with the electronic mail thread object is displayed on the display.

In accordance with some embodiments, user input representing a substantially horizontal swipe gesture from a bezel of the electronic device (e.g., a swipe right gesture originating at a left bezel) at the list of electronic mail message objects is received. In response to receiving user input representing the substantially horizontal swipe gesture from the bezel of the electronic device (e.g., a swipe right gesture originating at a left bezel) at the list of electronic mail message objects, replacing display of the list of electronic mail message objects (e.g., 618A-B) with the list of electronic mail thread objects (e.g., 614A-B).

In accordance with some embodiments, user input representing a touch associated with an electronic mail message object of the list of electronic mail message objects is received. In response to receiving user input representing the touch associated with an electronic mail message object of the list of electronic mail message objects, an electronic mail message (e.g., 620A-C) associated with the electronic mail message object (e.g., 618A) is displayed on the display.

In accordance with some embodiments, user input representing a substantially horizontal swipe gesture from a bezel of the electronic device (e.g., a swipe right gesture originating at a left bezel) associated with the electronic mail message is received. In response to receiving user input representing the substantially horizontal swipe gesture from the bezel of the electronic device (e.g., a swipe right gesture originating at a left bezel) associated with the electronic mail message, display of the electronic mail message (e.g., 620A-

C) is replaced with display of the list of electronic mail message objects (e.g., 618A-B).

In accordance with some embodiments, the touch-sensitive surface is configured to detect intensity of touches. User input representing a touch on the electronic mail message is received. It is determined whether a characteristic intensity of the touch on the electronic mail message is above an intensity threshold (e.g., intensity may be measured based on pressure or determined based on the size of a touch). In response to receiving the user input representing the touch on the electronic mail message and in accordance with a determination that the characteristic intensity of the touch is above the intensity threshold (e.g., a deep press; intensity may be measured based on pressure or determined based on the size of a touch), a first set of one or more affordances (e.g., 622A-D) associated with the electronic mail message (e.g., 620A-C) is displayed on the display. A touch below the intensity threshold on electronic mail message will not cause display of the contextual menu with affordances. Instead, for example, a touch below the intensity threshold on electronic mail message may be used to scroll the electronic mail message, such as by touching and swiping up or down.

In accordance with some embodiments, displaying the first set of one or more affordances associated with the electronic mail message comprises replacing display of the electronic mail message (e.g., 620A-C) with display of the first set of one or more affordances (e.g., 622A-D) associated with the electronic mail message.

In accordance with some embodiments, the first set of one or more affordances associated with the electronic mail message includes one or more of: an affordance associated with replying to the electronic mail message (e.g., 622A), an affordance associated with marking (e.g., marking as unread, junk, flagged; 622B) the electronic mail message, an affordance associated with opening the electronic mail message on a second device (e.g., a phone, tablet, or computer; 622C), and a first affordance associated with a cancel action (e.g., 622D) associated with the electronic mail message.

In accordance with some embodiments, user input representing a touch associated with the first affordance associated with the cancel action is received. In response to receiving user input representing the touch associated with the first affordance associated with the cancel action, display of the first set of one or more affordances (e.g., 622A-D) is replaced with display of the electronic mail message (e.g., 620A-C).

In accordance with some embodiments, user input representing a touch associated with the affordance associated with replying to the electronic mail message is received. In response to receiving user input representing the touch associated with the affordance associated with replying to the electronic mail message, display of the first set of one or more affordances (e.g., 622A-D) is replaced with a second set of one or more affordances (e.g., 624A-D) associated with the electronic mail message.

In accordance with some embodiments, the second set of affordances associated with the electronic mail message includes one or more of: an affordance (e.g., 624A) associated with replying to the sender of the electronic mail message, an affordance (e.g., 624B) associated with replying to all recipients (e.g., sender and any recipients) of the electronic mail message, an affordance (e.g., 624C) associated with forwarding the electronic mail message, and a second affordance (e.g., 624D) associated with a cancel action associated with the electronic mail message.

In accordance with some embodiments, user input representing a touch associated with the second affordance associated with the cancel action is received. In response to receiving user input representing the touch associated with the second affordance associated with the cancel action, display of the second set of one or more affordances (e.g., 624A-D) is replaced with display of the first set of one or more affordances (e.g. for replying, marking, opening, and canceling; 622A-D).

In accordance with some embodiments, user input representing a touch associated with the affordance associated with replying to the sender of the electronic mail message is received. In response to receiving user input representing the touch associated with the affordance (e.g., 624A) associated with replying to the sender of the electronic mail message, display of the second set of one or more affordances (e.g., 624A-D) is replaced with display of an interface for replying to the electronic mail message.

In accordance with some embodiments, user input representing a touch associated with the affordance associated with replying to all recipients of the electronic mail message is received. In response to receiving user input representing the touch associated with the affordance (e.g., 624B) associated with replying to all recipients (e.g., sender and any recipients) of the electronic mail message, display of the second set of one or more affordances (e.g., 624A-D) is replaced with display of an interface for replying to all recipients of the electronic mail message (e.g., 630A-D).

In accordance with some embodiments, user input representing a touch associated with the affordance associated with forwarding the electronic mail message is received. In response to receiving user input representing the touch associated with the affordance associated with forwarding the electronic mail message, display of the second set of one or more affordances (e.g., 624A-D) is replaced with display of an interface for forwarding the electronic mail message.

In accordance with some embodiments, user input representing a touch associated with the affordance associated with marking the electronic mail message is received. In response to receiving user input representing the touch associated with the affordance associated with marking the electronic mail message, display of the first set of one or more affordances (e.g., 622A-D) is replaced with a third set of one or more affordances (e.g., 640A-D) associated with the electronic mail message (e.g., flag, mark unread, archive, and cancel affordances).

In accordance with some embodiments, the third set of affordances (e.g., 640A-D) associated with the electronic mail message includes one or more of: an affordance (e.g., 640A) associated with flagging the electronic mail message, an affordance (e.g., 640B) associated with marking as unread the electronic mail message, an affordance (e.g., 640C) associated with archiving the electronic mail message, and a third affordance (e.g., 640D) associated with a cancel action associated with the electronic mail message.

In accordance with some embodiments, user input representing a touch associated with the third affordance associated with the cancel action is received. In response to receiving user input representing the touch associated with the third affordance associated with the cancel action, display of the third set of one or more affordances (e.g., 640A-D) is replaced with display of the first set of one or more affordances (e.g. for replying, marking, opening, and canceling; 622A-D).

In accordance with some embodiments, user input representing a touch associated with the affordance associated with flagging the electronic mail message is received. In response to receiving user input representing the touch associated with the affordance associated with flagging the electronic mail message, display of the third set of one or more affordances (e.g., 640A-D) is replaced with display of the electronic mail message, including a flag indicator (e.g., display the email with a dot that appears next to the subject line to indicate the email is flagged; 642A).

In accordance with some embodiments, user input representing a touch associated with the affordance associated with marking as unread the electronic mail message is received. In response to receiving user input representing the touch associated with the affordance associated with marking as unread the electronic mail message, display of the third set of one or more affordances (e.g., 640A-D) is replaced with display of the electronic mail message, including an unread indicator (e.g., display the email with a circle that appears next to the subject line to indicate the email is unread; 644A).

In accordance with some embodiments, user input representing a touch associated with the affordance associated with archiving the electronic mail message is received. In response to receiving user input representing the touch associated with the affordance associated with archiving the electronic mail message, the electronic mail message is moved into an archive folder.

In accordance with some embodiments, user input representing a touch associated with the affordance associated with opening the electronic mail message is received. In response to receiving user input representing the touch associated with the affordance associated with opening the electronic mail message, causing the electronic mail message to be displayed on a linked companion device (e.g., displaying the email message on a phone, tablet, or laptop that has been linked to the electronic device).

In accordance with some embodiments, the interface for composing the new electronic mail message (e.g., 616) comprises one or more of: an affordance (e.g., 616A) associated with adding recipient information to the new electronic mail message, an affordance (e.g., 616B) associated with adding subject information to the new electronic mail message, and an affordance (e.g., 616C) associated with adding body information to the new electronic mail message.

In accordance with some embodiments, user input representing a touch associated with the affordance associated with adding recipient information to the new electronic mail message is received. In response to receiving user input representing the touch associated with the affordance associated with adding recipient information to the new electronic mail message, display of the interface for composing the new electronic mail message (e.g., 616) is replaced with display of a fourth set of one or more affordances (e.g., 646A-C) associated with the new electronic mail message (e.g. for selecting recipient using a recent affordance, dictation affordance, or keyboard affordance).

In accordance with some embodiments, the fourth set of one or more affordances (e.g., 646A-C) associated with the new electronic mail message includes one or more of: an affordance (e.g., 646A) associated with recent contacts, an affordance (e.g., 646B) associated with dictation, and an affordance (e.g., 646C) associated with a keyboard.

In accordance with some embodiments, user input representing a touch associated with the affordance associated with recent contacts is received. In response to receiving user input representing the touch associated with the affordance associated with recent contacts, display of the fourth set of one or more affordances (e.g., 646A-C) is replaced with display of one or more recent contact affordances (e.g. display a list of contacts recently contacted (incoming or outgoing) and receive a selection of a contact to use as a recipient of the new mail message; 648A-C).

In accordance with some embodiments, user input representing a touch associated with a recent contact affordance of the one or more recent contact affordances is received. The recent contact affordance is associated with an email address. In response to receiving user input representing the touch associated with the recent contact affordance, email address is added as recipient information to the new electronic mail message.

In accordance with some embodiments, user input representing a touch associated with the affordance associated with dictation is received. In response to receiving user input representing the touch associated with the affordance associated with dictation, display of the fourth set of one or more affordances (e.g., 646A-C) is replaced with display of a dictation interface (e.g. enable a microphone of the electronic device and display a graphic waveform based on audio input received at the microphone; 650).

In accordance with some embodiments, user input representing recipient speech is received. In response to receiving user input representing recipient speech, the user input representing recipient speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing recipient speech, the transcribed recipient speech is added as recipient information to the new electronic mail message.

In accordance with some embodiments, user input representing a touch associated with the affordance associated with the keyboard is received. In response to receiving user input representing the touch associated with the affordance associated with the keyboard, display of the fourth set of one or more affordances (e.g., 646A-C) is replaced with display of one or more keys of a keyboard (e.g. display a keyboard that allows user input to enter recipient information; 652).

In accordance with some embodiments, user input representing keyboard input using the one or more keys of the keyboard is received. The user input representing keyboard input is associated with an email address (e.g., the user enters an email address or enters a name linked to an email address using the keyboard). In response to receiving user input representing the keyboard input, the email address is added as recipient information to the new electronic mail message.

In accordance with some embodiments, user input representing a touch associated with the affordance associated with adding subject information to the new electronic mail message is received. In response to receiving user input representing the touch associated with the affordance associated with adding subject information to the new electronic mail message, display of the interface for composing the new electronic mail message (e.g., 654) is replaced with display of a dictation interface (e.g. enable a microphone of the electronic device and display a graphic waveform based on audio input received at the microphone; automatic speech recognition can happen at the device, at a remote device, or at a remote server; 656).

In accordance with some embodiments, user input representing subject speech is received. In response to receiving user input representing subject speech, the user input representing subject speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing subject speech, the transcribed subject speech is added as subject information to the new electronic mail message.

In accordance with some embodiments, user input representing a touch associated with the affordance associated with adding body information to the new electronic mail message is received. In response to receiving user input representing the touch associated with the affordance associated with adding body information to the new electronic mail message, display of the interface for composing the new electronic mail message (e.g., 658) is replaced with display of a dictation interface (e.g. enable a microphone of the electronic device and display a graphic waveform based on audio input received at the microphone; automatic speech recognition can happen at the device, at a remote device, or at a remote server; 660).

In accordance with some embodiments, user input representing body speech is received. In response to receiving user input representing body speech, the user input representing body speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing body speech, the transcribed body speech is added as body information to the new electronic mail message.

In accordance with some embodiments, it is determined whether the new electronic mail message includes recipient information, subject information, and body information. In response to determining that the new electronic mail message includes recipient information, subject information, and body information, an affordance (e.g., 664B) associated with sending the new electronic mail message is displayed. In other examples, in response, the affordance (e.g., 664B) associated with sending the new electronic mail message is visually updated and/or becomes activatable. (e.g., once the recipient, subject, and body have content, the send button becomes enabled and is no longer grayed out).

In accordance with some embodiments, user input representing a touch associated with the affordance associated with sending the new electronic mail message is received. In response to receiving user input representing the touch associated with the affordance associated with sending the new electronic mail message, the new electronic mail message is transmitted (e.g., send the email to the recipient using the subject and body entered by the user when the user presses the send button; the new electronic mail message is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the new electronic mail message. The companion device also includes a user-accessible electronic mail message application and may be configured for accessing the electronic mail of the user of the electronic device).

In accordance with some embodiments, user input representing a substantially downward swipe gesture (e.g., a swipe down gesture) associated with the list of electronic mail thread objects (e.g., the inbox; 614A-B) is received. In response to receiving user input representing the substantially downward swipe gesture (e.g., a swipe down gesture) associated with the list of electronic mail thread objects (e.g., the inbox), an affordance (e.g., 670A) for composing a new electronic mail message is displayed. Thus, when the device detects a swipe down gesture at the list of electronic mail threads, an affordance (e.g., 670A) for composing new emails is displayed.

In accordance with some embodiments, user input representing a substantially horizontal swipe gesture (e.g., a swipe left gesture) associated with an electronic mail thread object of the list of electronic mail thread objects (e.g., at a thread of the inbox) is received. In response to receiving user input representing the substantially horizontal swipe gesture (e.g., a swipe left gesture) associated with the electronic mail thread object of the list of electronic mail thread objects (e.g., at a thread of the inbox), an affordance (e.g., 676A) for deleting an electronic mail thread associated with the electronic mail thread object is displayed (e.g., deleting the mail thread also removes the mail thread object).

In accordance with some embodiments, user input representing a substantially horizontal swipe gesture (e.g., a swipe left gesture) associated with an electronic mail message object of the list of electronic mail message objects (e.g., at an email of a thread) is received. In response to receiving user input representing the substantially horizontal swipe gesture (e.g., a swipe left gesture) associated with the electronic mail message object of the list of electronic mail message objects (e.g., at an email of a thread), an affordance (e.g., 682A) for deleting an electronic mail message associated with the electronic mail message object is displayed (e.g., deleting the mail message also removes the mail message object).

In accordance with some embodiments, user input representing a substantially horizontal swipe gesture (e.g., a swipe left gesture) associated with an electronic mail message object of the list of electronic mail message objects (e.g., at an email of a thread) is received. It is determined whether the user input representing the substantially horizontal swipe gesture (e.g., a swipe left gesture) associated with the electronic mail message object indicates the swipe gesture exceeds a first threshold (e.g., a partial swipe across the electronic mail message object) or exceeds a second threshold (e.g., a full or 75% swipe across the electronic mail message object). In response to receiving user input representing the substantially horizontal swipe gesture (e.g., a swipe left gesture) associated with the electronic mail message object (e.g., at an email of a thread) and in accordance with a determination that the user input indicates the substantially horizontal swipe gesture (e.g., a swipe left gesture) associated with the electronic mail message object exceeds the first threshold and does not exceed the second threshold, an affordance (e.g., 680A) for marking an electronic mail message associated with the electronic mail message object (e.g., activating the marking affordance causes display of affordances for marking the mail message as unread, junk, and flagged) is displayed. In response to receiving user input representing the substantially horizontal swipe gesture (e.g., a swipe left gesture) associated with the electronic mail message object (e.g., at an email of a thread) and in accordance with a determination that the user input indicates the substantially horizontal swipe gesture (e.g., a swipe left gesture) associated with the electronic mail message object exceeds the second threshold, an affordance (e.g., 682A) for deleting an electronic mail message associated with the electronic mail message object is displayed (e.g., deleting the mail message also removes the mail message object).

Note that details of the processes described above with respect to method 700 (FIG. 7) are also applicable in an analogous manner to the methods described below. For example, method 1000 (FIG. 10) may include one or more of the characteristics of the various methods described above with reference to method 700. For brevity, these details are not repeated below.

It should be understood that the particular order in which the operations in FIG. 7 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 800 (FIG. 8), and method 1000 (FIG. 10) may be incorporated with one another. Thus, the techniques described with respect to method 700 may be relevant to method 800 and 1000.

Figure 8:
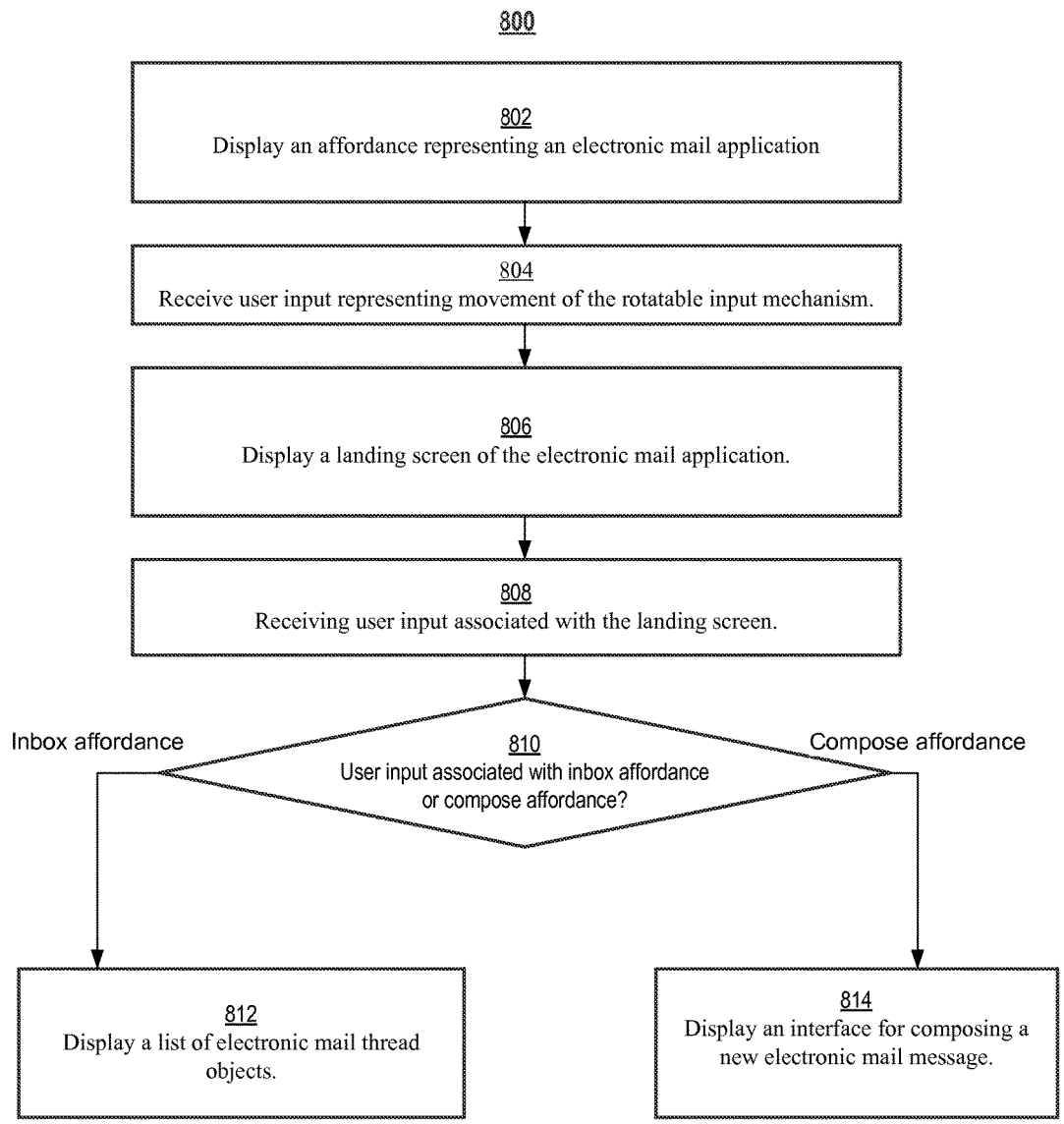
FIG. 8 is a flow diagram illustrating an exemplary process for accessing, composing, and manipulating electronic mail.

FIG. 8 is a flow diagram illustrating process 800 for accessing, composing, and manipulating electronic mail in accordance with some embodiments. In some embodiments, method 800 may be performed at an electronic device with a display (e.g., 112, 340, 504), a touch-sensitive surface (e.g., 112, 355, 504), and a rotatable input mechanism (e.g., 506). Some operations in method 800 may be combined, the order of some operations may be changed, and some operations may be omitted.

In some embodiments, the touch-sensitive surface is capable of detecting intensity of touch contacts. Exemplary devices that may perform process 800 include devices 100, 300, and 500 (FIGS. 1, 3, and 5).

At block 802, an affordance representing an electronic mail application (e.g., an icon among a plurality of icons) is displayed on a display, wherein the affordance representing the electronic mail application includes an indication of a number of unread electronic mail messages (e.g., the icon includes the number of unread emails) of the electronic mail application.

At block 804, user input representing movement of the rotatable input mechanism (e.g., user selects the mail app) is received.

At block 806, in response to receiving the user input representing the movement of the rotatable input mechanism, a landing screen (e.g., the screen displayed when the application starts or the screen the application reaches after initialization) of the electronic mail application is displayed, wherein the landing screen includes display of an inbox affordance and a compose affordance (e.g., the inbox affordance and the compose affordance are displayed concurrently).

At block 808, user input associated with the landing screen is received (e.g., the user activates the inbox affordance or the compose affordance; generally, displayed items are associated with user inputs in a contextual manner, such as the user input being received at a location on the touch-sensitive surface that corresponds to the location of the displayed item on the display to activate the displayed item).

At block 810, it is determined whether the user input associated with the landing screen represents a touch associated with the displayed inbox affordance or a touch associated with the displayed compose affordance.

At block 812, in response to receiving the user input associated with the landing screen and in accordance with a determination that the user input associated with the landing screen represents a touch associated with the displayed inbox affordance, a list of electronic mail thread objects is displayed on the display (e.g., an email inbox that displays different email threads).

At block 814, in response to receiving the user input associated with the landing screen and in accordance with a determination that the user input associated with the landing screen represents a touch associated the displayed compose affordance, an interface for composing a new electronic mail message is displayed on the display (e.g., a user interface for entering email recipient, subject, and body).

Figure 9A:
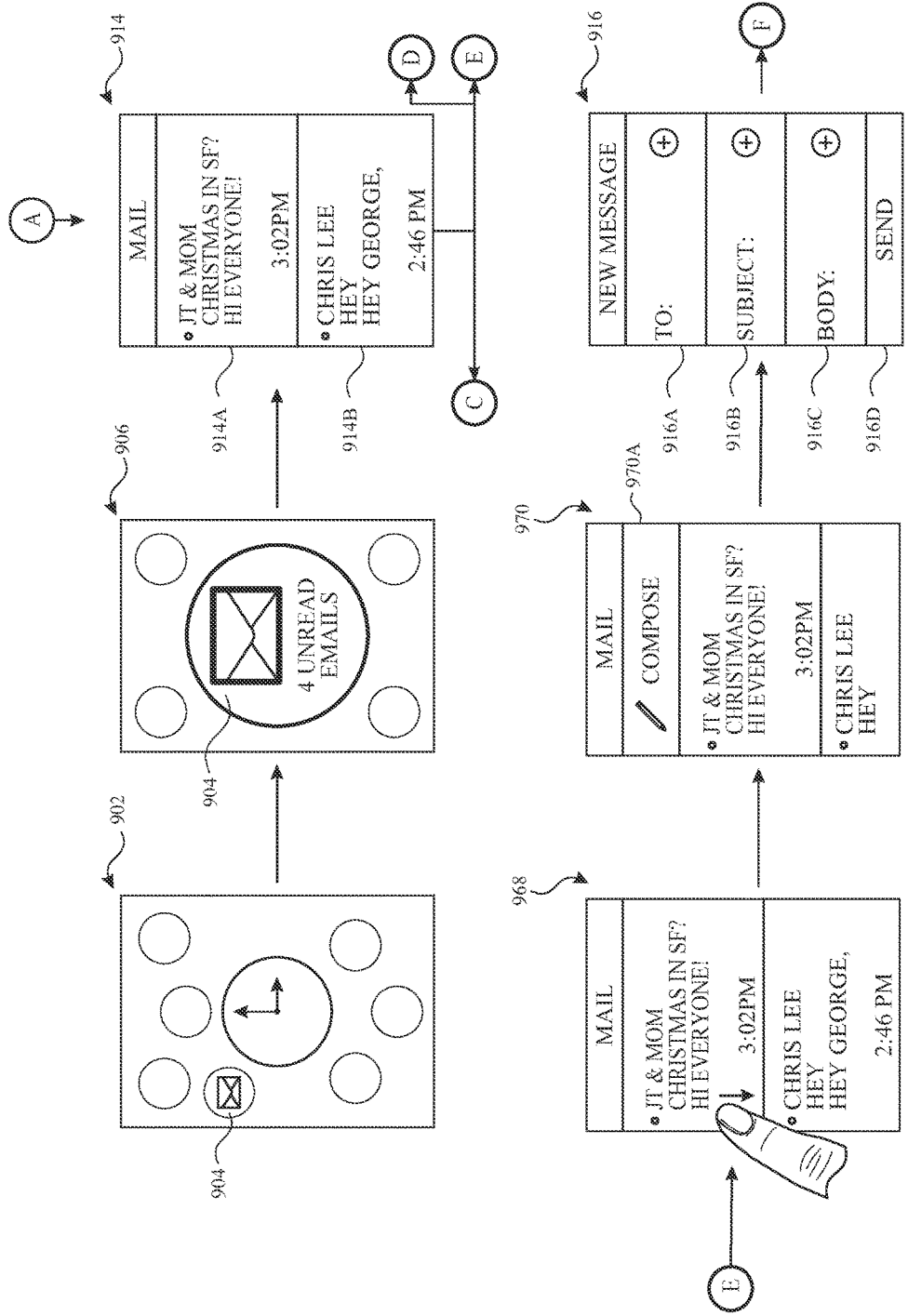
FIGS. 9A-9I illustrate exemplary user interfaces for accessing, composing, and manipulating electronic mail.

FIGS. 9A-9I illustrate exemplary user interfaces for accessing, composing, and manipulating electronic mail using an electronic device. In some embodiments, the electronic device is device 500. The electronic device has a display (e.g., 112, 340, 504), a touch-sensitive surface (e.g., 112, 355, 504), and a rotatable input mechanism (e.g., 506). In FIG. 9A, user interface screen 902 displays multiple affordances (e.g., a plurality of icons). Each affordance is associated with a software application such that when an affordance is activated by a user, the application associated with the activated affordance is displayed on the display of the electronic device. User interface screen 902 includes an affordance representing an electronic mail application 904 (e.g., an icon among the plurality of icons). The device receives user input representing movement of the rotatable input mechanism (e.g., the user rotates the rotatable input mechanism in a first direction). In response to receiving the user input representing movement of the rotatable input mechanism, the device displays user interface screen 906, which includes an enlarged view of the affordance representing the electronic mail application 904.

In FIG. 9A, the affordance representing the electronic mail application 904 on user interface screen 906 includes an indication of a number of unread electronic mail messages (e.g., the icon includes the number of unread emails) of the electronic mail application. In this example, the affordance representing the electronic mail application 904 indicates that the electronic mail application includes four unread electronic mail messages (e.g., "4 unread emails"). The device receives user input representing movement of the rotatable input mechanism (e.g., rotation of the rotatable input mechanism in the first direction while the affordance representing the electronic mail application 904 is substantially in the center of the display; the user activates the electronic mail application). In response to receiving the user input representing the movement of the rotatable input mechanism, the device displays a list of electronic mail thread objects 914A-B, including electronic mail thread objects 914A and 914B (e.g., the device displays an email inbox that includes different email threads). In some examples, if the user rotates the rotatable input mechanism in a second direction (e.g., opposite to the first direction) while at user interface screen 906, the device does not display the list of electronic mail thread objects (e.g., the inbox; 914A-B) in response to the rotation in the second direction.

Alternatively, rather than receiving user input representing movement of the rotatable input mechanism, the device receives user input associated with the affordance representing the electronic mail application 904 (e.g., the user activates the affordance 904 by touching the affordance 904). In response to receiving the user input associated with the affordance representing the electronic mail application 904, the device displays a list of electronic mail thread objects 914A-B, including electronic mail thread objects 914A and 914B (e.g., the device displays an email inbox that includes different email threads).

The device receives user input representing a substantially downward swipe gesture (e.g., a swipe down gesture) associated with the list of electronic mail thread objects 914A-B (e.g., the inbox). For example, the device detects that the user swipes down on the list of electronic mail thread objects 914A-B to view content that is beyond the top of the list, as illustrated at user interface screen 968 of FIG. 9A. In response to receiving user input representing the substantially downward swipe gesture (e.g., a swipe down gesture) associated with the list of electronic mail thread objects 914A-B (e.g., the inbox), the device displays an affordance for composing a new electronic mail message 970A, as illustrated in user interface screen 970. Thus, when the device detects a swipe down gesture at the list of electronic mail threads, an affordance for composing new emails is displayed.

At FIG. 9A, at user interface screen 914, the list of electronic mail thread objects 914A-B includes electronic mail thread objects 914A and 914B. An electronic mail thread object (e.g., 914A and 914B) may include one or more of: all or a portion of the name of the individual who sent an email associated with the electronic mail thread object (e.g., "JT" and "Mom" in object 914A), all or a portion of the subject of an email associated with the electronic mail thread object (e.g., "Christmas in SF" in object 914A), all or a portion of the body of the email associated with the electronic mail thread object (e.g., "Hi everyone!" in object 914A), and the day and/or time stamp of an email associated with the electronic mail thread object (e.g., "3:02 PM" in object 914A). In some embodiments, the user can swipe up or down on the list of electronic mail thread objects 914A-B to scroll through the list of electronic mail thread objects 914A-B. In some embodiments, the user can rotate the rotatable input mechanism to scroll through the list of electronic mail thread objects 914A-B. Rotating the rotatable input mechanism in a first direction causes the list to scroll up. Rotating the rotatable input mechanism in a second direction causes the list to scroll down. The first direction is different than the second direction.

In accordance with some embodiments, the device receives user input representing a touch associated with the affordance (e.g., the affordance displayed at the top of the list of electronic mail thread objects) for composing a new electronic mail message 970A. In response to receiving user input representing the touch associated with the affordance (e.g., the affordance displayed at the top of the list of electronic mail thread objects) for composing a new electronic mail message 970A, the device displays an interface for composing a new electronic mail message 916 (e.g., a user interface for entering email recipient, subject, and body). Generally, a user can activate an affordance or object by using a finger tap on the displayed affordance or object.

In accordance with some embodiments, displaying the interface for composing a new electronic mail message 916 comprises replacing display of the list of electronic mail thread objects 914A-B with display of the interface for composing a new electronic mail message 916.

Returning to user interface screen 914, the user can access multiple features of the electronic mail application. In accordance with some embodiments, the device receives user input representing a touch associated with an electronic mail thread object 914A of the list of electronic mail thread objects 914A-B. In response to receiving user input representing the touch associated with an electronic mail thread object 914A of the list of electronic mail thread objects 914A-B, the device displays, on the display, a list of electronic mail message objects 918A-B associated with the electronic mail thread object 914A. Thus, object 914A, when activated, causes display of a list of electronic mail message objects 918A-B.

Figure 9B:
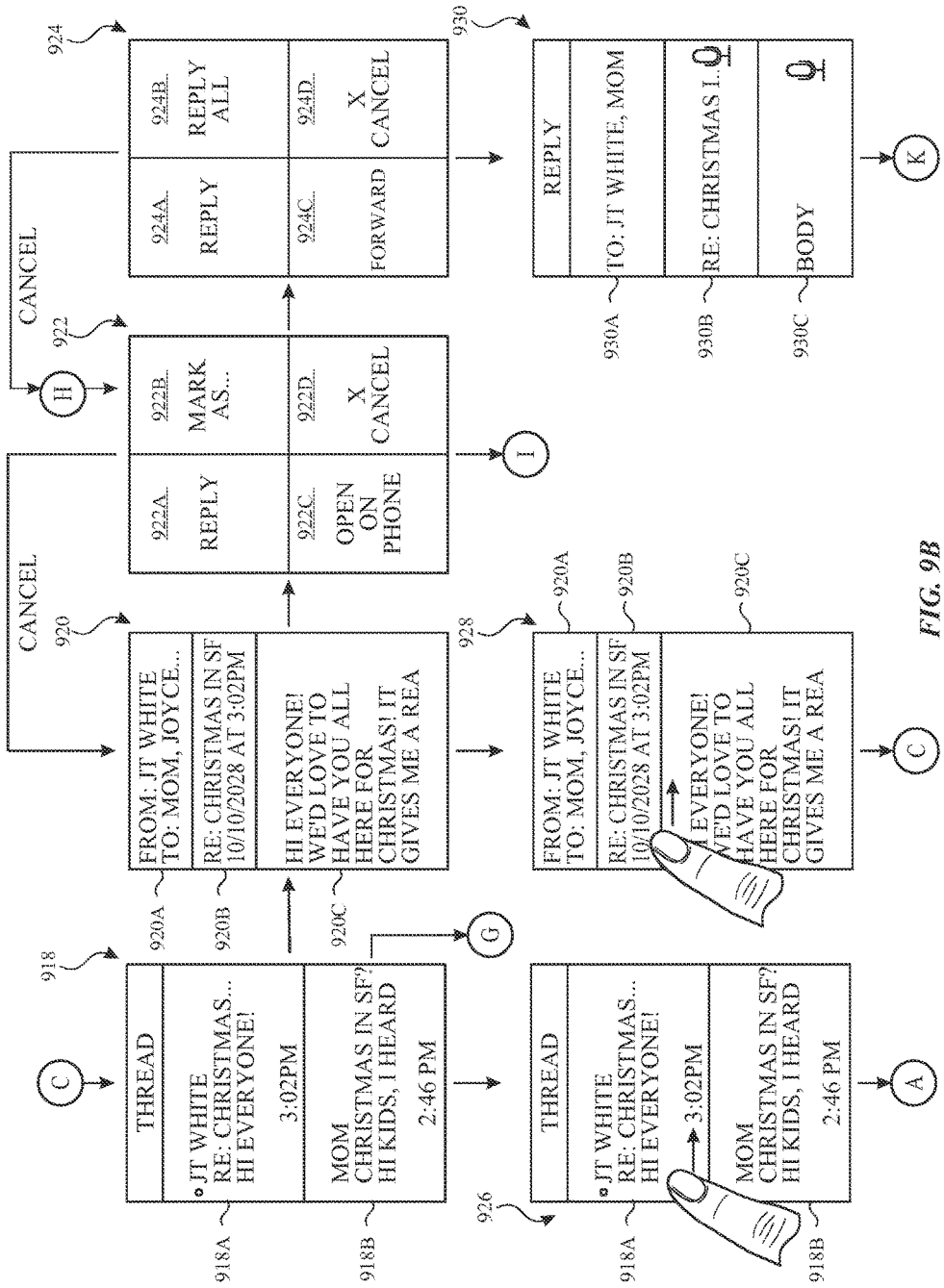

At FIG. 9B, the list of electronic mail message objects 918A-B includes electronic mail message objects 918A and 918B. An electronic mail message object (e.g., 918A and 918B) may include one or more of: all or a portion of the name of the individual who sent the email associated with the electronic mail message object (e.g., "JT White" in object 918A), all or a portion of the subject of the email associated with the electronic mail message object (e.g., "Re: Christmas . . . " in object 918A), all or a portion of the body of the email associated with the electronic mail message object (e.g., "Hi everyone!" in object 918A), and the day and/or time stamp of the email associated with the electronic mail message object (e.g., "3:02 PM" in object 918A). In some embodiments, the user can swipe up or down to scroll the list of electronic mail message objects 918A-B. In some embodiments, the user can rotate the rotatable input mechanism to scroll through the list of electronic mail thread objects 918A-B. Rotating the rotatable input mechanism in a first direction causes the list to scroll up. Rotating the rotatable input mechanism in a second direction causes the list to scroll down. The first direction is different than the second direction.

In accordance with some embodiments, while displaying user interface screen 918 the device receives user input representing a substantially horizontal swipe gesture from a bezel of the electronic device (e.g., a swipe right gesture originating at a left bezel) at the list of electronic mail message objects 918A-B, as illustrated at user interface screen 926. In response to receiving user input representing the substantially horizontal swipe gesture from the bezel of the electronic device (e.g., a swipe right gesture originating at a left bezel) at the list of electronic mail message objects 918A-B, the device replaces display of the list of electronic mail message objects 918A-B with the list of electronic mail thread objects 914A-B, as illustrated in user interface 914.

In accordance with some embodiments, while displaying user interface screen 918, the device receives user input representing a touch associated with an electronic mail message object 918A of the list of electronic mail message objects 918A-B (e.g., the user taps on object 918A). In response to receiving user input representing the touch associated with an electronic mail message object 918A of the list of electronic mail message objects 918A-B, the device displays, on the display, an electronic mail message associated with the electronic mail message object, as illustrated in user interface screen 920. The electronic mail message 920A-C of user interface screen 920 may include the names of the sender and recipient(s) 920A, a subject 920B, and a body 920C. Thus, the electronic mail message object, when activated, causes display of an electronic mail message.

In accordance with some embodiments, while displaying user interface screen 920 the device receives user input representing a substantially horizontal swipe gesture from a bezel of the electronic device (e.g., a swipe right gesture originating at a left bezel) associated with the electronic mail message 920A-C, as illustrated at user interface screen 928. In response to receiving user input representing the substantially horizontal swipe gesture from the bezel of the electronic device (e.g., a swipe right gesture originating at a left bezel) associated with the electronic mail message 920A-C, the device replaces display of the electronic mail message 920A-C with the list of electronic mail message objects 918A-B, as illustrated in user interface screen 918.

In accordance with some embodiments, the touch-sensitive surface of the device is configured to detect intensity of touches. While displaying user interface screen 920, the device receives user input representing a touch on the electronic mail message 920A-C. The device determines whether a characteristic intensity of the touch on the electronic mail message 920A-C is above an intensity threshold (e.g., intensity may be measured based on pressure or determined based on the size of a touch). In response to receiving the user input representing the touch on the electronic mail message 920A-C and in accordance with a determination that the characteristic intensity of the touch is above the intensity threshold (e.g., a deep press; intensity may be measured based on pressure or determined based on the size of a touch), the device displays, on the display, a first set of one or more affordances 922A-D associated with the electronic mail message 920A-C, as illustrated in user interface screen 922. Thus, electronic mail message 920A-C, when activated with a touch above the intensity threshold, causes display of a contextual menu with affordances. A touch below the intensity threshold on electronic mail message 920A-C will not cause display of the contextual menu with affordances. Instead, for example, a touch below the intensity threshold on electronic mail message 920A-C may be used to scroll the electronic mail message 920A-C, such as by touching and swiping up or down.

In accordance with some embodiments, displaying the first set of one or more affordances 922A-D associated with the electronic mail message comprises replacing display of the electronic mail message 920A-C with display of the first set of one or more affordances 922A-D associated with the electronic mail message 920A-C.

In accordance with some embodiments, as illustrated in user interface screen 922, the first set of one or more affordances 922A-D associated with the electronic mail message 920A-C includes one or more of (1) an affordance associated with replying to the electronic mail message 922A, (2) an affordance associated with marking (e.g., marking as unread, junk, flagged) the electronic mail message 922B, (3) an affordance associated with opening the electronic mail message on a second device (e.g., a phone, tablet, or computer) 922C, and (4) a first affordance associated with a cancel action associated with the electronic mail message 922D.

In accordance with some embodiments, while displaying user interface screen 922, the device receives user input representing a touch associated with the first affordance associated with the cancel action 922D. In response to receiving user input representing the touch associated with the first affordance associated with the cancel action 922D, the device replaces display of the first set of one or more affordances 922A-D with display of the electronic mail message 920A-C, as illustrated in user interface screen 920. Thus, a user can cancel out of user interface screen 922 and return to user interface screen 920 by activating the first affordance associated with the cancel action 922D by, for example, tapping on the first affordance associated with the cancel action 922D.

In accordance with some embodiments, while displaying user interface screen 922, the device receives user input representing a touch associated with the affordance associated with replying to the electronic mail message 922A. In response to receiving user input representing the touch associated with the affordance associated with replying to the electronic mail message 922A, the device replaces display of the first set of one or more affordances 922A-D with a second set of one or more affordances associated with the electronic mail message 924A-D, as illustrated in user interface screen 924. Thus, affordance 922A, when activated, causes display of the second set of one or more affordances 924A-D.

In accordance with some embodiments, as illustrated in user interface screen 924, the second set of affordances associated with the electronic mail message 924A-D includes one or more of (1) an affordance associated with replying to the sender of the electronic mail message 924A, (2) an affordance associated with replying to all recipients (e.g., sender and any recipients) of the electronic mail message 924B, (3) an affordance associated with forwarding the electronic mail message 924C, and (4) a second affordance associated with a cancel action associated with the electronic mail message 924D.

In accordance with some embodiments, while displaying user interface screen 924, the device receives user input representing a touch associated with the second affordance associated with the cancel action 924D. In response to receiving user input representing the touch associated with the second affordance associated with the cancel action 924D, the device replaces display of the second set of one or more affordances 924A-D with display of the first set of one or more affordances 922A-D (e.g. for replying, marking, opening, and canceling), as illustrated in user interface screen 922. Thus, a user can cancel out of user interface screen 924 and return to user interface screen 922 by activating the second affordance associated with the cancel action 924D.

In accordance with some embodiments, while displaying user interface screen 924, the device receives user input representing a touch associated with the affordance associated with replying to the sender of the electronic mail message 924A. In response to receiving user input representing the touch associated with the affordance associated with replying to the sender of the electronic mail message 924A, the device replaces display of the second set of one or more affordances 924A-D with display of an interface for replying to the electronic mail message. The interface for replying to the electronic mail message auto-populates the recipient of a new electronic mail message based on the sender of the electronic mail message being replied to. Thus, affordance 924A, when activated, causes display of the interface for replying to the electronic mail message.

In accordance with some embodiments, while displaying user interface screen 924, the device receives user input representing a touch associated with the affordance associated with replying to all recipients of the electronic mail message 924B. In response to receiving user input representing the touch associated with the affordance associated with replying to all recipients (e.g., sender and any recipients) of the electronic mail message 924B, the device replaces display of the second set of one or more affordances 924A-D with display of an interface for replying to all recipients of the electronic mail message 930A-D, as illustrated in user interface screen 930. The interface for replying to all recipients of the electronic mail message auto-populates the recipient of a new electronic mail message based on the sender of the electronic mail message being replied to and all recipients of the electronic mail message being replied to, other than the user. Thus, affordance 924B, when activated, causes display of the interface for replying to all recipients of the electronic mail message 930.

In accordance with some embodiments, at user interface 930, the user can modify the recipients, modify the subject, or modify the body of the reply electronic mail message. When the device receives user input associated with affordance 930A, the device displays a user interface screen for adding and/or removing recipients. When the device receives user input associated with affordance 930B, the device displays a user interface screen for changing the subject. For example, the device enables a microphone and enters into a dictation mode for changing the subject. When the device receives user input associated with affordance 930C, the device displays a user interface screen for adding text to the body, as illustrated in user interface screen 932. For example, the device enables a microphone and enters into a dictation mode for adding text to the body. Cancel affordance 932A, when activated, causes the device to return to the display of user interface screen 930.

Figure 9C:
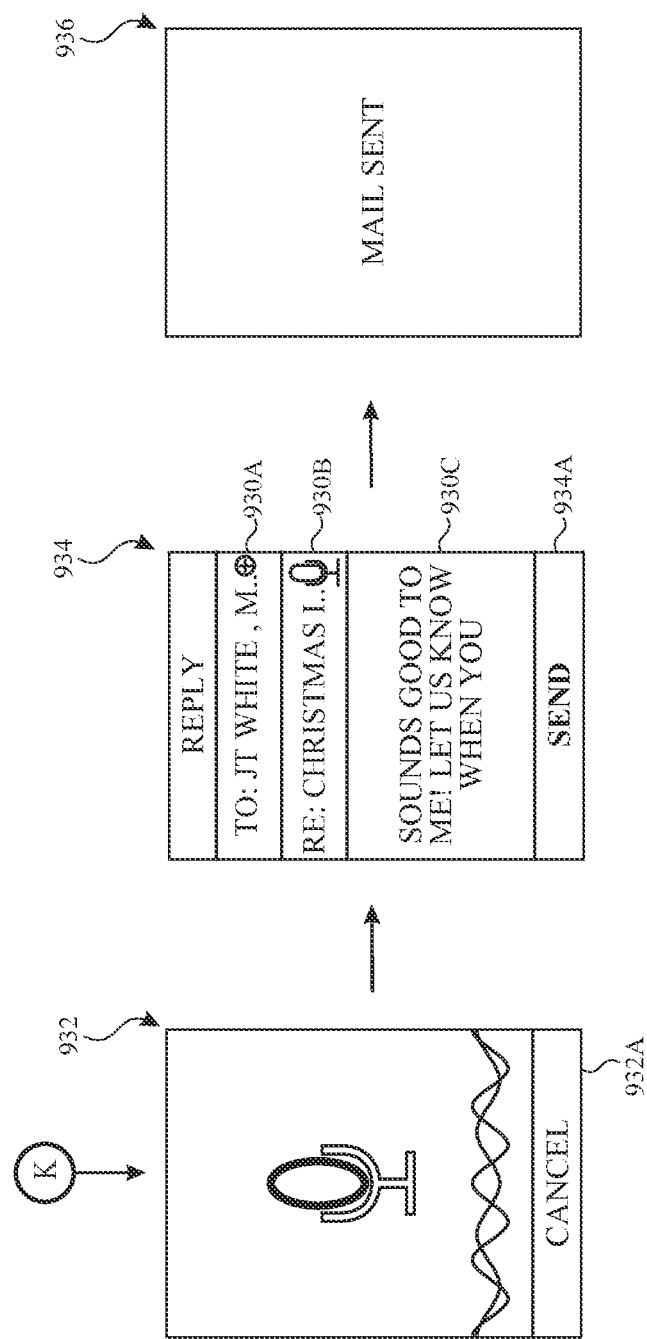

At FIG. 9C, in accordance with some embodiments, in response to a change in the recipient, subject, or body of the reply electronic mail message, the device determines whether the reply electronic mail message includes recipient information, subject information, and body information (e.g., whether all the fields are populated). In response to determining that the reply electronic mail message includes recipient information, subject information, and body information, the device displays an affordance associated with sending the new electronic mail message 934A (e.g., once the recipient, subject, and body have content, a send affordance becomes enabled and is no longer grayed out), as illustrated in user interface screen 934. In response to detecting activation of the affordance associated with sending the new electronic mail message 934A, the device transmits the reply electronic mail message and displays a confirmation user interface screen 936.

At FIG. 9B, in accordance with some embodiments, while displaying user interface screen 924, the device receives user input representing a touch associated with the affordance associated with forwarding the electronic mail message 924C. In response to receiving user input representing the touch associated with the affordance associated with forwarding the electronic mail message 924C, the device replaces display of the second set of one or more affordances 924A-D with display of an interface for forwarding the electronic mail message. The interface for forwarding the electronic mail message does not auto-populate the recipient of a new electronic mail message. However, the subject is auto-populated and is based the subject of the electronic mail message being forwarded. Thus, affordance 924C, when activated, causes display of an interface for forwarding the electronic mail message.

At FIG. 9B, in accordance with some embodiments, while displaying user interface screen 922, the device receives user input representing a touch associated with the affordance associated with marking the electronic mail message 922B. In response to receiving user input representing the touch associated with the affordance associated with marking the electronic mail message 922B, the device replaces display of the first set of one or more affordances 922A-D with a third set of one or more affordances associated with the electronic mail message 940A-D (e.g., flag, mark unread, archive, and cancel affordances), as illustrated in user interface screen 940. Thus, affordance 922B, when activated, causes display of affordances for marking the electronic mail message.

Figure 9D:
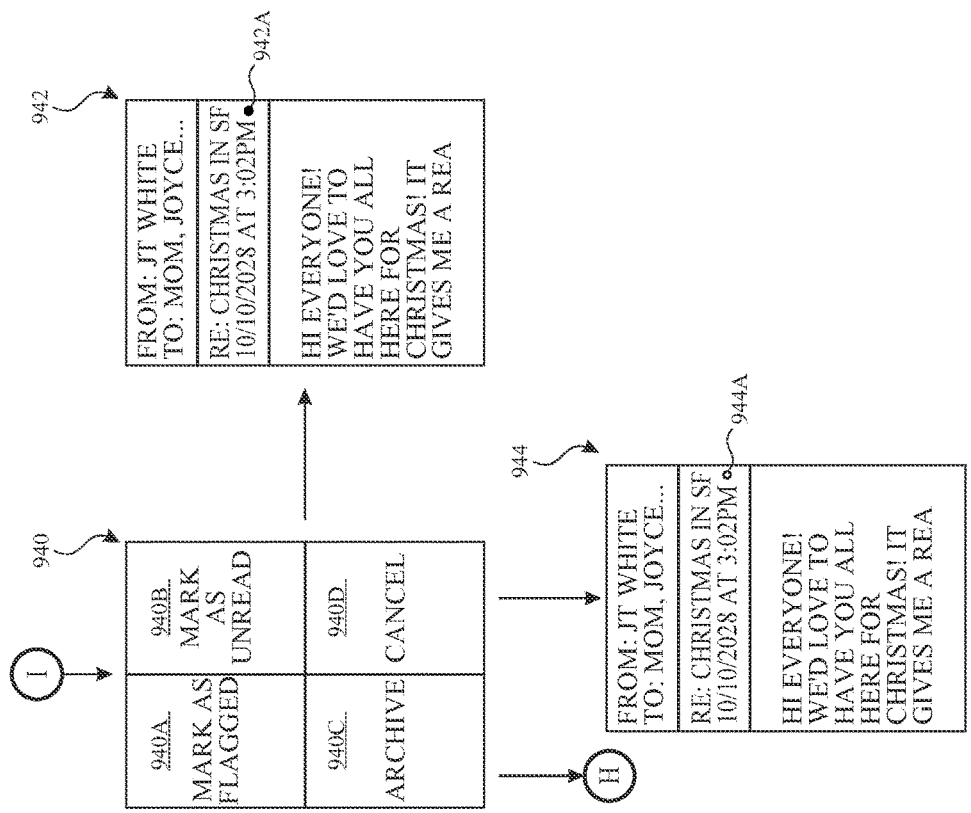

At FIG. 9D, in accordance with some embodiments, as illustrated in user interface screen 940, the third set of affordances associated with the electronic mail message 940A-D includes one or more of (1) an affordance associated with flagging the electronic mail message 940A, (2) an affordance associated with marking as unread the electronic mail message 940B, (3) an affordance associated with archiving the electronic mail message 940C, and (4) a third affordance associated with a cancel action associated with the electronic mail message 940D.

At FIG. 9D, in accordance with some embodiments, while displaying user interface screen 940, the device receives user input representing a touch associated with the third affordance associated with the cancel action 940D. In response to receiving user input representing the touch associated with the third affordance associated with the cancel action 940D, the device replaces display of the third set of one or more affordances 940A-D with display of the first set of one or more affordances 922A-D (e.g. for replying, marking, opening, and canceling), as illustrated in user interface screen 922. Thus, a user can cancel out of user interface screen 940 and return to user interface screen 922 by activating the third affordance associated with the cancel action 940D.

At FIG. 9D, in accordance with some embodiments, while displaying user interface screen 940, the device receives user input representing a touch associated with the affordance associated with flagging the electronic mail message 940A. In response to receiving user input representing the touch associated with the affordance associated with flagging the electronic mail message 940A, the device replaces display of the third set of one or more affordances 940A-D with display of the electronic mail message, including a flag indicator 942A (e.g., display the email with a dot that appears next to the subject line to indicate the email is flagged), as illustrated in user interface screen 942. Thus, a user can flag an electronic mail message for special attention. As an alternative to the flag indicator 942A (e.g., a dot), the flag indicator may also be a graphical image of a flag. In some embodiments, if the email was previously flagged, activating affordance 940A causes the flag indicator to be removed from the previously flagged email. Thus, affordance 940A, when activated, causes the electronic mail message to be flagged for later review.

At FIG. 9D, in accordance with some embodiments, while displaying user interface screen 940, the device receives user input representing a touch associated with the affordance associated with marking as unread the electronic mail message 940B. In response to receiving user input representing the touch associated with the affordance associated with marking as unread the electronic mail message 940B, the device replaces display of the third set of one or more affordances 940A-D with display of the electronic mail message 944, including an unread indicator 944A (e.g., display the email with a circle that appears next to the subject line to indicate the email is unread). Thus, affordance 940B, when activated, causes the previously read email to be marked as unread.

In accordance with some embodiments, while displaying user interface screen 940, the device receives user input representing a touch associated with the affordance associated with archiving the electronic mail message 940C. In response to receiving user input representing the touch associated with the affordance associated with archiving the electronic mail message 940C, the device moves the electronic mail message into an archive folder. Thus, affordance 940C, when activated, causes the electronic mail message to be archived.

In accordance with some embodiments, the device may be linked with a companion device, such as through short-range wireless communication. The companion device may be, for example, a cellular telephone, a laptop, or a tablet. While displaying user interface screen 922, the device receives user input representing a touch associated with the affordance associated with opening the electronic mail message 922C. In response to receiving user input representing the touch associated with the affordance associated with opening the electronic mail message 922C, the device causes the electronic mail message to be displayed on a linked companion device (e.g., displaying the email message on a phone, tablet, or laptop that has been linked to the electronic device). For example, the device may transmit a wireless instruction to the companion device that includes an indication of the electronic mail message that should be displayed. This allows the user to seamlessly transition from viewing the electronic mail message on the screen of the device to viewing the electronic mail message on the screen of the companion device. Thus, affordance 922C, when activated, causes the electronic mail message to be displayed on a linked companion device.

Returning to the interface for composing a new electronic mail message 916 (e.g., a user interface for entering email recipient, subject, and body) of FIG. 9A, in accordance with some embodiments, the interface for composing the new electronic mail message 916 comprises one or more of (1) an affordance associated with adding recipient information to the new electronic mail message 916A, (2) an affordance associated with adding subject information to the new electronic mail message 916B, and (3) an affordance associated with adding body information to the new electronic mail message 916C. Affordance 916A, when activated, enables the user to add recipient information. Affordance 916B, when activated, enables the user to add subject information. Affordance 916C, when activated, enables the user to add body information. In the interface for composing new electronic mail message 916, affordance 916D is visible but cannot be activated by the user until the device determines that the new electronic mail message includes at least one recipient, subject text, and body text. Affordance 916D, when activated, causes the new electronic mail message to be transmitted to the recipient(s).

In accordance with some embodiments, while displaying the interface for composing a new electronic mail message 916, the device receives user input representing a touch associated with the affordance associated with adding recipient information to the new electronic mail message 916A. In response to receiving user input representing the touch associated with the affordance associated with adding recipient information to the new electronic mail message 916A, the device replaces display of the interface for composing the new electronic mail message with display of a fourth set of one or more affordances associated with the new electronic mail message 946A-C (e.g. for selecting recipient using a recent, dictation, or keyboard affordance), as illustrated in user interface screen 946 of FIG. 9E. Thus, affordance 916A, when activated, enables a user to enter recipient information.

Figure 9E:
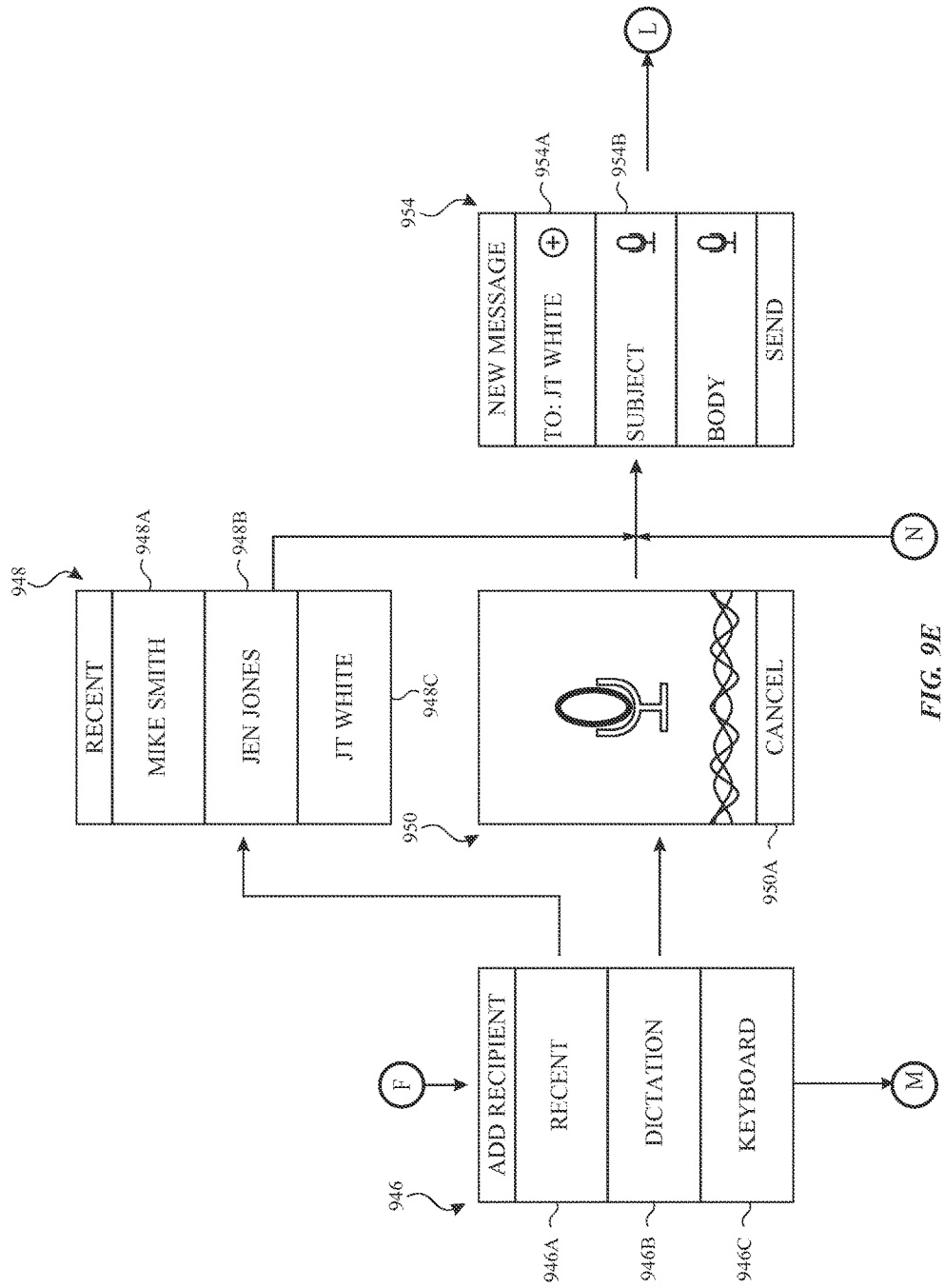

At FIG. 9E, in accordance with some embodiments, as illustrated in user interface screen 946, the fourth set of one or more affordances associated with the new electronic mail message 946A-C includes one or more of (1) an affordance associated with recent contacts 946A, (2) an affordance associated with dictation 946B, and (3) an affordance associated with a keyboard 946C. For example, this allows the user to select from among three methods to select one or more recipients for the new electronic mail message.

In accordance with some embodiments, while displaying user interface screen 946, the device receives user input representing a touch associated with the affordance associated with recent contacts 946A. In response to receiving user input representing the touch associated with the affordance associated with recent contacts 946A, the device replaces display of the fourth set of one or more affordances 946A-C with display of one or more recent contact affordances 948A-C (e.g. display a list of contacts recently contacted (incoming and/or outgoing)), as illustrated in user interface screen 948. Thus, affordance 946A, when activated, enables a user to select a recipient from among contacts with which the user has recently interacted. In one example, the recent contacts may be limited to a predetermined number of contacts. In one example, the list of contacts may include the last six contacts that have either (1) initiated a communication (e.g., an email, a phone call, a text message) with the user and/or (2) have had a communication (e.g., an email, a phone call, a text message) initiated with by the user.

Affordance 948A is associated with the contact "Mike Smith." Affordance 948B is associated with the contact "Jen Jones." Affordance 948C is associated with the contact "JT White."

At FIG. 9E, in accordance with some embodiments, while displaying user interface screen 948, the device receives a user input representing a touch associated with a recent contact affordance 948C of the one or more recent contact affordances 948A-C. The recent contact affordance 948C is associated with an email address. For example, the associated email address is the email address of the person or entity identified by the recent contact affordance 948C. For example, the information associating the contact with the email address may be stored in an electronic address book on the device or accessed remotely from a server over the Internet. In response to receiving user input representing the touch associated with the recent contact affordance, the device adds the email address as recipient information to the new electronic mail message. At the interface for composing a new electronic mail message 954, the new electronic mail message has been updated to reflect the addition of "JT White" in the field 954A. Thus, affordance 948C, when selected, adds a recent contact as a recipient to the new electronic mail message.

In accordance with some embodiments, while displaying user interface screen 946, the device receives user input representing a touch associated with the affordance associated with dictation 946B. In response to receiving user input representing the touch associated with the affordance associated with dictation 946B, the device replaces display of the fourth set of one or more affordances 946A-C with display of a dictation interface 950 (e.g. enable a microphone of the electronic device and display a graphic waveform based on audio input received at the microphone). For example, the device enables a microphone and enters into a dictation mode for adding a recipient to the new electronic mail message. Cancel affordance 950A, when activated, causes the device to return to the display of user interface screen 946.

In accordance with some embodiments, the device receives user input representing recipient speech (e.g., the device records audio input of the name of an intended recipient). In response to receiving user input representing recipient speech, the device transcribes the user input representing recipient speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed recipient speech as recipient information to the new electronic mail message. For example, the transcription can be performed using speech-to-text and/or automatic speech recognition using a virtual assistant. At the interface for composing a new electronic mail message 954, the new electronic mail message has been updated to reflect the addition of "JT White" in the field 954A. Thus, the user can provide audio input to select or enter a recipient for the new electronic mail message.

In accordance with some embodiments, while displaying user interface screen 946, the device receives user input representing a touch associated with the affordance associated with the keyboard 946C. In response to receiving user input representing the touch associated with the affordance associated with the keyboard 946C, the device replaces display of the fourth set of one or more affordances 946A-C with display of one or more keys of a keyboard (e.g. display a keyboard that allows user input to enter recipient information), as illustrated in user interface screen 952. Thus, affordance 946C, when activated, enables a user to enter recipient information using a displayed virtual keyboard.

In accordance with some embodiments, while displaying user interface screen 952, the device receives user input representing keyboard input using the one or more keys of the keyboard, as illustrated in user interface screen 952. The user input representing keyboard input is associated with an email address (e.g., the user enters an email address or a name linked to an email address using the keyboard). In response to receiving user input representing the keyboard input, the device adds the email address as recipient information to the new electronic mail message. At the interface for composing a new electronic mail message 954, the new electronic mail message has been updated to reflect the addition of "JT White" in the field 954A. Thus, the user can provide keyboard input to select or enter a recipient for the new electronic mail message.

In accordance with some embodiments, while displaying the interface for composing a new electronic mail message 954 (e.g., a user interface for entering email recipient, subject, and body), the device receives user input representing a touch associated with the affordance associated with adding subject information to the new electronic mail message 954B. In response to receiving user input representing the touch associated with the affordance associated with adding subject information to the new electronic mail message 954B, the device replaces display of the interface for composing the new electronic mail message 954 with display of a dictation interface 956 (e.g. enable a microphone of the electronic device and display a graphic waveform based on audio input received at the microphone). Thus, affordance 954B, when activated, enables the user to provide audio input to enter a subject. At user interface screen 956, cancel affordance 956A, when activated, causes the device to return to the display of user interface screen 954.

In accordance with some embodiments, the device receives user input representing subject speech. In response to receiving user input representing subject speech, the device transcribes the user input representing subject speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed subject speech as subject information to the new electronic mail message. At the interface for composing a new electronic mail message 958, the new electronic mail message has been updated to reflect the addition of "Dinner" in the field 958A. Thus, the user can enter a subject for the new electronic mail message by speaking the subject. Note that send affordance 958C is not enabled (and therefore cannot be activated by the user) because the body does not yet include text, as shown by affordance 958B.

Figure 9F:
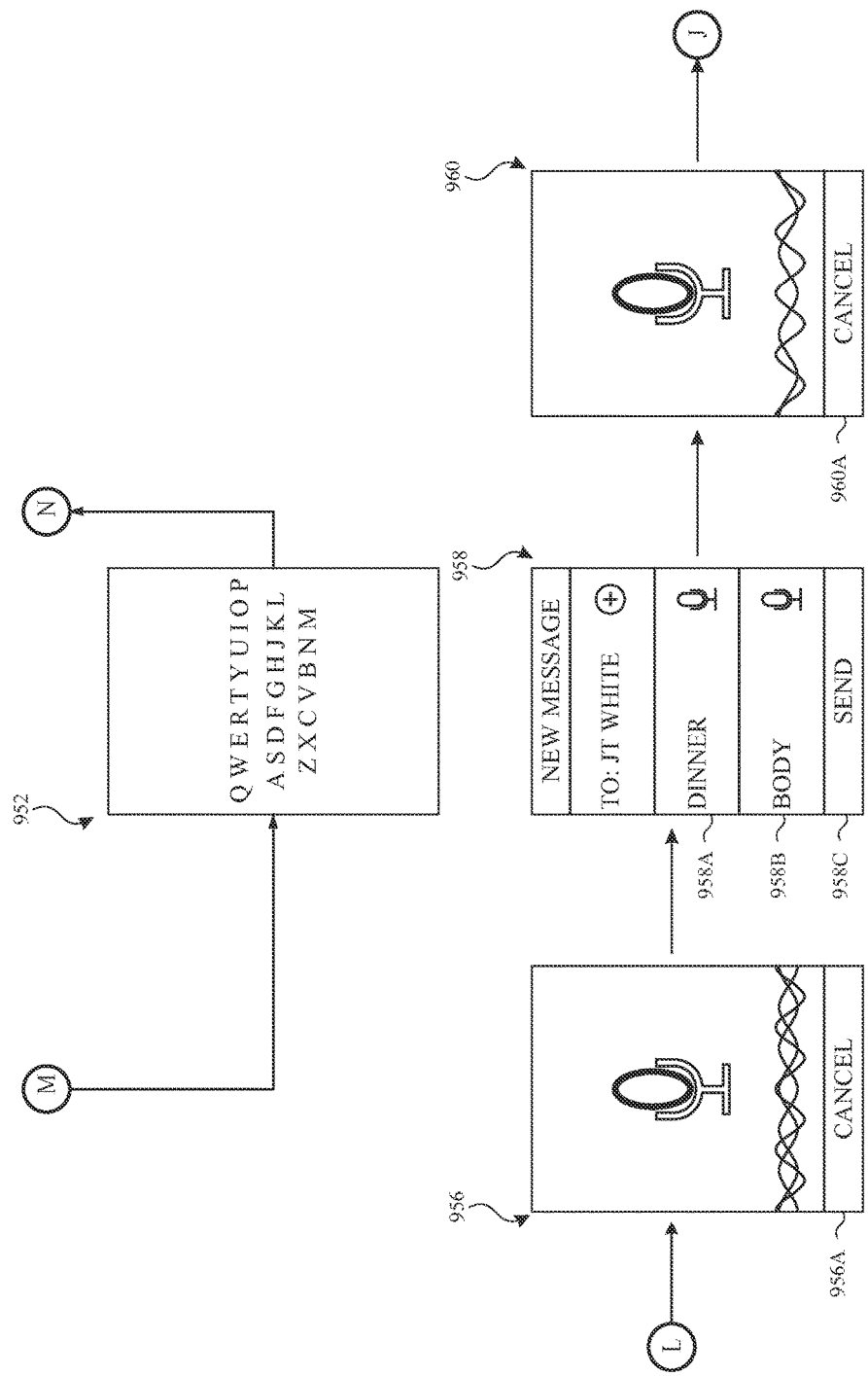

At FIG. 9F, in accordance with some embodiments, the device receives user input representing a touch associated with the affordance associated with adding body information to the new electronic mail message 958B. In response to receiving user input representing the touch associated with the affordance associated with adding body information to the new electronic mail message 958B, the device replaces display of the interface for composing the new electronic mail message 958 with display of a dictation interface 960 (e.g. enable a microphone of the electronic device and display a graphic waveform based on audio input received at the microphone; automatic speech recognition can happen at the device, at a remote device, or at a remote server). Thus, affordance 958B, when activated, enables the user to provide audio input to enter body information. At user interface screen 960, cancel affordance 960A, when activated, causes the device to return to the display of user interface screen 958.

In accordance with some embodiments, the device receives user input representing body speech. In response to receiving user input representing body speech, the device transcribes the user input representing body speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed body speech as body information to the new electronic mail message.

Figure 9G:
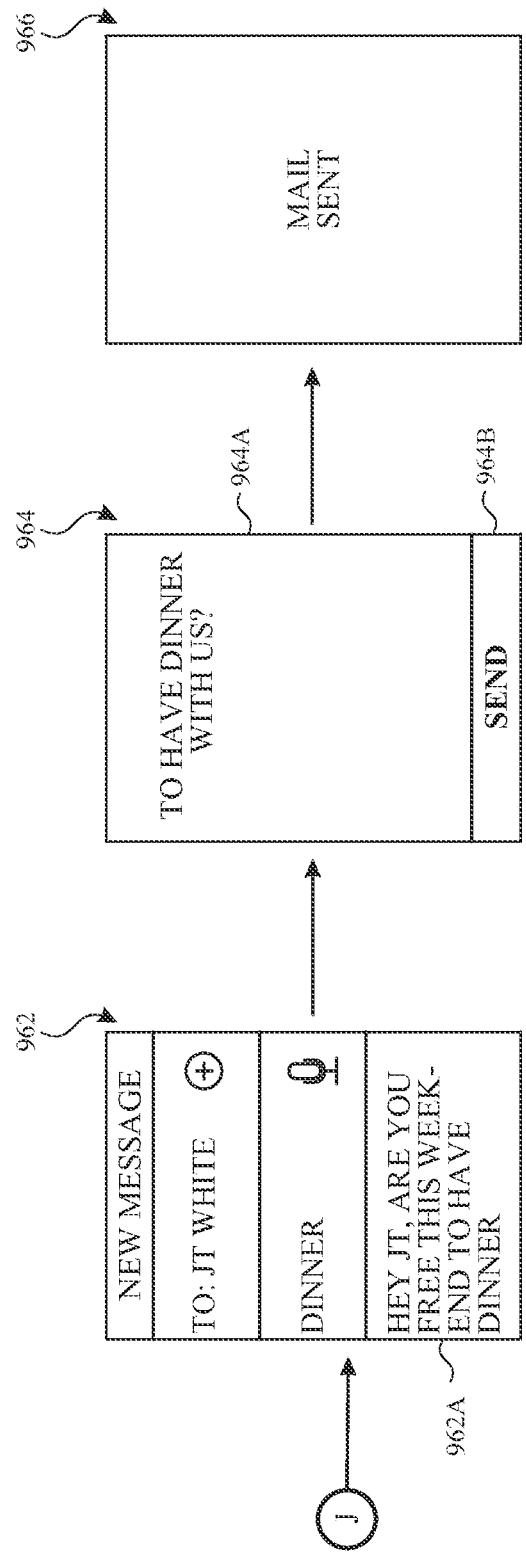

At FIG. 9G, at the interface for composing a new electronic mail message 962, the new electronic mail message has been updated to reflect the addition of "Hey JT, are you free this weekend to have dinner with us?" in the field 962A. By scrolling down (e.g., using a swipe gesture), the user can see the remainder of the body 964A, as illustrated in user interface screen 964. Thus, the user can enter a body for the new electronic mail message by speaking the body text.

Note that send affordance 964B is now enabled (and therefore can be activated by the user) because the new electronic mail message includes recipient information ("JT White"), subject information ("Dinner"), and body information "Hey JT, are you free this weekend to have dinner with us?". In some embodiments, the device determines whether the new electronic mail message 962 includes recipient information, subject information, and body information. In response to determining that the new electronic mail message 962 includes recipient information, subject information, and body information, displaying an affordance associated with sending the new electronic mail message 964B (e.g., once the recipient, subject, and body have content, the send affordance becomes enabled and is no longer grayed out). In this example, the "send" text of affordance 964B is bolded to indicate that it can be activated by the user.

In accordance with some embodiments, the device receives user input representing a touch associated with the affordance associated with sending the new electronic mail message 964B (e.g., the send affordance). In response to receiving user input representing the touch associated with the affordance associated with sending the new electronic mail message 964B, the device transmits the new electronic mail message (e.g., send the email to the recipient using the subject and body entered by the user when the user presses the send button). The new electronic mail message is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the new electronic mail message to the recipients. In some embodiments, the companion device also includes a user-accessible electronic mail message application and may be configured to access the electronic mail of the user of the electronic device. Thus, in response to detecting activation of the affordance associated with sending the new electronic mail message 964A, the device transmits the new electronic mail message and, in some embodiments, displays a confirmation user interface screen 966.

Figure 9H:
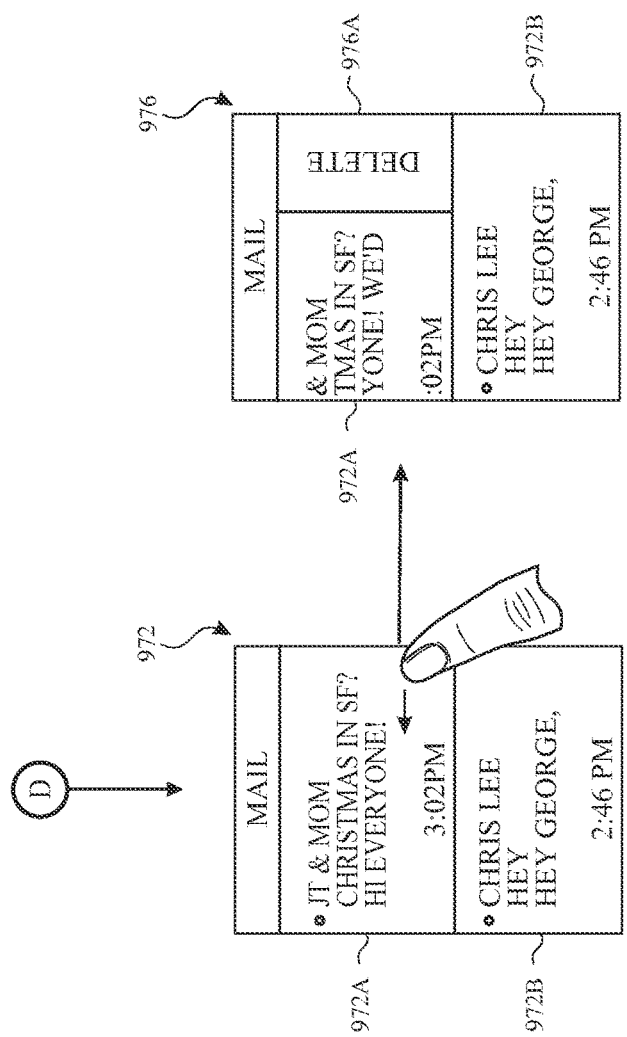

At FIG. 9H, in accordance with some embodiments, the device receives user input representing a substantially horizontal swipe gesture (e.g., a swipe left gesture) associated with an electronic mail thread object 972A of the list of electronic mail thread objects 972A-B (e.g., at a thread of the inbox), as illustrated in user interface screen 972. In some embodiments, the swipe gesture originates at a bezel of the device. In response to receiving user input representing the substantially horizontal swipe gesture (e.g., a swipe left gesture) associated with the electronic mail thread object 972A of the list of electronic mail thread objects 972A-B (e.g., at a thread of the inbox), the device displays an affordance for deleting an electronic mail thread associated with the electronic mail thread object 976A (e.g., deleting the mail thread also removes the mail thread object), as illustrated in user interface screen 976. For example, electronic mail thread object 972A slides to the left and partially out of the display to make room for the affordance 976B, as illustrated in user interface screen 976. When the user taps on affordance 976A, the entire email thread associated with affordance 976A is deleted.

In accordance with some embodiments, at FIG. 9H, the device receives user input representing a substantially horizontal swipe gesture (e.g., a swipe left gesture) associated with the electronic mail thread object 972A of the list of electronic mail thread objects 972A-B (e.g., at a thread of the inbox), as illustrated in user interface screen 972. In some embodiments, the swipe gesture originates at a bezel of the device. In response to receiving user input representing the substantially horizontal swipe gesture (e.g., a swipe left gesture) associated with the electronic mail thread object 972A of the list of electronic mail thread objects 972A-B (e.g., at a thread of the inbox), the device determines whether the user input representing the substantially horizontal swipe gesture (e.g., a swipe left gesture) associated with the electronic mail message object 972A indicates the swipe gesture exceeds a first threshold (e.g., a partial swipe across the electronic mail message object) or exceeds a second threshold (e.g., a full or 75% swipe across the electronic mail message object).

In response to receiving user input representing the substantially horizontal swipe gesture (e.g., a swipe left gesture) associated with the electronic mail message object 972A (e.g., at an email of a thread) and in accordance with a determination that the user input indicates the substantially horizontal swipe gesture (e.g., a swipe left gesture) associated with the electronic mail message object exceeds the first threshold and does not exceed the second threshold, the device displays an affordance for deleting an electronic mail message associated with the electronic mail message object 972A (e.g., the device displays an affordance for deleting the electronic mail message when the user performs a swipe left gesture across a small portion of the screen). In response to the user tapping on the affordance for deleting the electronic mail message, the electronic mail message is deleted.

In response to receiving user input representing the substantially horizontal swipe gesture (e.g., a swipe left gesture) associated with the electronic mail message object 972A (e.g., at an email of a thread) and in accordance with a determination that the user input indicates the substantially horizontal swipe gesture (e.g., a swipe left gesture) associated with the electronic mail message object exceeds the second threshold, the device deletes the electronic mail message associated with the electronic mail message object (e.g., the device deletes the mail message and removes the mail message object without requiring additional confirmation from the user when the user performs a swipe left gesture across a large portion of the screen).

Figure 9I:
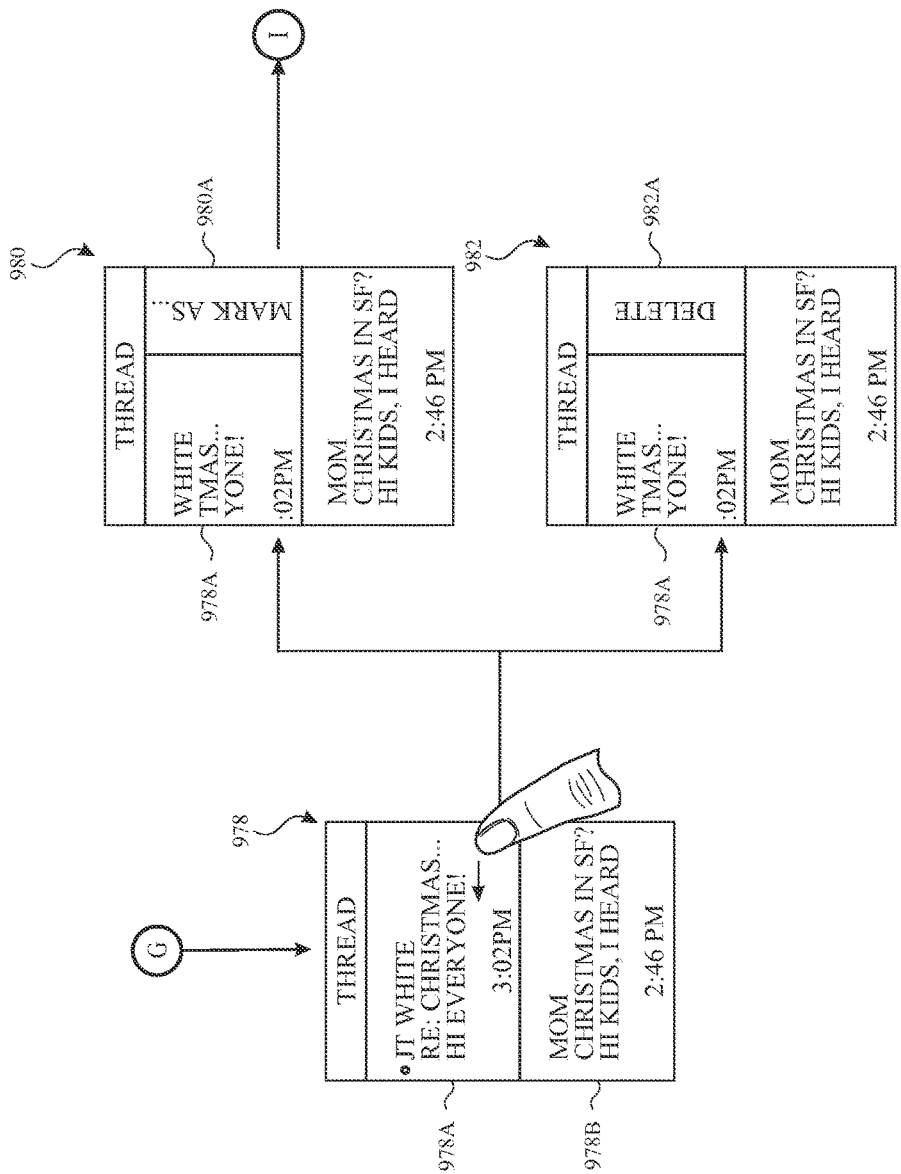

At FIG. 9I, in accordance with some embodiments, the device receives user input representing a substantially horizontal swipe gesture (e.g., a swipe left gesture) associated with an electronic mail message object 978A of the list of electronic mail message objects 978A-B (e.g., at an email of a thread), as illustrated in user interface screen 978. In response to receiving user input representing the substantially horizontal swipe gesture (e.g., a swipe left gesture) associated with the electronic mail message object 978A of the list of electronic mail message objects 978A-B (e.g., at an email of a thread), the device displays an affordance for deleting an electronic mail message associated with the electronic mail message object 982A (e.g., deleting the mail message also removes the mail message object), as illustrated in user interface screen 982. For example, electronic mail message object 978A slides to the left and partially off of the display to make room for the affordance 982A. When the user taps on affordance 982A, the email associated with affordance 982A is deleted.

In accordance with some embodiments, a partial swipe across an electronic mail object displays an affordance for marking the electronic mail and a full swipe across the electronic mail object displays an affordance for deleting the electronic mail. The device receives user input representing a substantially horizontal swipe gesture (e.g., a swipe left gesture) associated with an electronic mail message object 978A of the list of electronic mail message objects 978A-B (e.g., at an email of a thread), as illustrated in user interface screen 978. The device determines whether the user input representing the substantially horizontal swipe gesture (e.g., a swipe left gesture) associated with the electronic mail message object 978A indicates the swipe gesture exceeds a first threshold (e.g., a partial swipe across the electronic mail message object) or exceeds a second threshold (e.g., a full or 75% swipe across the electronic mail message object).

In response to receiving user input representing the substantially horizontal swipe gesture (e.g., a swipe left gesture) associated with the electronic mail message object 978A (e.g., at an email of a thread) and in accordance with a determination that the user input indicates the substantially horizontal swipe gesture (e.g., a swipe left gesture) associated with the electronic mail message object exceeds the first threshold and does not exceed the second threshold, the device displays an affordance for marking an electronic mail message associated with the electronic mail message object 980A (e.g., activating the marking affordance causes display of affordances for marking the mail message as unread, junk, and flagged), as illustrated in user interface screen 980. For example, electronic mail message object 978A slides to the left and partially off of the display to make room for the affordance 980A. In response to the user tapping on affordance 980A, user interface screen 940 is displayed, allowing the user to mark the email associated with affordance 980A.

In response to receiving user input representing the substantially horizontal swipe gesture (e.g., a swipe left gesture) associated with the electronic mail message object 978A (e.g., at an email of a thread) and in accordance with a determination that the user input indicates the substantially horizontal swipe gesture (e.g., a swipe left gesture) associated with the electronic mail message object 982B exceeds the second threshold, the device displays an affordance for deleting an electronic mail message associated with the electronic mail message object 982D (e.g., deleting the mail message also removes the mail message object). For example, electronic mail message object 982A slides to the left and partially off of the display to make room for the affordance 982B. In response to the user tapping on affordance 982B, the email associated with affordance 982B is deleted.

FIG. 10 is a flow diagram illustrating method 1000 for accessing, composing, and manipulating electronic mail in accordance with some embodiments. In some embodiments, method 1000 may be performed at an electronic device with a display (e.g., 112, 340, 504), a touch-sensitive surface (e.g., 112, 355, 504), and a rotatable input mechanism (e.g., 506). Some operations in method 1000 may be combined, the order of some operations may be changed, and some operations may be omitted.

In some embodiments, the touch-sensitive surface is capable of detecting intensity of touch contacts. Exemplary devices that may perform method 1000 include devices 100, 300, and 500 (FIGS. 1A, 3, and 5A).

Method 1000 provides an intuitive way to access, compose, and manipulate electronic mail. The method reduces the cognitive burden on a user when using a device to read, send, or otherwise access or manipulate electronic mail, thereby creating a more efficient human-machine interface. For battery-operated computing devices, enabling a user to access electronic mail faster and more efficiently conserves power and increases the time between battery charges.

At block 1002, an affordance representing an electronic mail application (e.g., an icon among a plurality of icons; 904) is displayed on a display, wherein the affordance representing the electronic mail application includes an indication of a number of unread electronic mail messages (e.g., the icon includes the number of unread emails) of the electronic mail application.

At block 1004, user input representing movement of the rotatable input mechanism (e.g., user selects the mail app) is received.

At block 1006, in response to receiving the user input representing the movement of the rotatable input mechanism, displaying a list of electronic mail thread objects (e.g., the inbox; 914A-B) is displayed.

At block 1008, user input representing a swipe down gesture associated with the list of electronic mail thread objects (e.g., the inbox; 914A-B) is received.

At block 1010, in response to receiving the user input representing the swipe down gesture (e.g., a swipe down gesture) associated with the list of electronic mail thread objects (e.g., the inbox; 914A-B), an affordance (e.g., at the top of the list of electronic mail thread objects; 970A) for composing a new electronic mail message is displayed.

At block 1010, in some embodiments, user input representing a touch associated with the affordance (e.g., the affordance displayed at the top of the list of electronic mail thread objects; 970A) for composing a new electronic mail message is received.

At block 1014, in some embodiments, in response to receiving user input representing the touch associated with the affordance (e.g., the affordance displayed at the top of the list of electronic mail thread objects; 970A) for composing a new electronic mail message, an interface for composing a new electronic mail message (e.g., a user interface for entering email recipient, subject, and body; 916) is displayed.

In some embodiments, displaying the interface for composing a new electronic mail message (e.g., 970A) comprises replacing display of the list of electronic mail thread objects (e.g., 914A-B) with display of the interface for composing a new electronic mail message (e.g., 970A).

In accordance with some embodiments, user input representing a touch associated with an electronic mail thread object of the list of electronic mail thread objects is received. In response to receiving user input representing the touch associated with an electronic mail thread object (e.g., 914A) of the list of electronic mail thread objects (e.g., 914A-B), a list of electronic mail message objects (e.g., 918A-B) associated with the electronic mail thread object is displayed on the display.

In accordance with some embodiments, user input representing a substantially horizontal swipe gesture from a bezel of the electronic device (e.g., a swipe right gesture originating at a left bezel) at the list of electronic mail message objects is received. In response to receiving user input representing the substantially horizontal swipe gesture from the bezel of the electronic device (e.g., a swipe right gesture originating at a left bezel) at the list of electronic mail message objects, replacing display of the list of electronic mail message objects (e.g., 918A-B) with the list of electronic mail thread objects (e.g., 914A-B).

In accordance with some embodiments, user input representing a touch associated with an electronic mail message object of the list of electronic mail message objects is received. In response to receiving user input representing the touch associated with an electronic mail message object of the list of electronic mail message objects, an electronic mail message (e.g., 920A-C) associated with the electronic mail message object (e.g., 918A) is displayed on the display.

In accordance with some embodiments, user input representing a substantially horizontal swipe gesture from a bezel of the electronic device (e.g., a swipe right gesture originating at a left bezel) associated with the electronic mail message is received. In response to receiving user input representing the substantially horizontal swipe gesture from the bezel of the electronic device (e.g., a swipe right gesture originating at a left bezel) associated with the electronic mail message, display of the electronic mail message (e.g., 920A-C) is replaced with display of the list of electronic mail message objects (e.g., 918A-B).

In accordance with some embodiments, the touch-sensitive surface is configured to detect intensity of touches. User input representing a touch on the electronic mail message is received. It is determined whether a characteristic intensity of the touch on the electronic mail message is above an intensity threshold (e.g., intensity may be measured based on pressure or determined based on the size of a touch). In response to receiving the user input representing the touch on the electronic mail message and in accordance with a determination that the characteristic intensity of the touch is above the intensity threshold (e.g., a deep press; intensity may be measured based on pressure or determined based on the size of a touch), a first set of one or more affordances (e.g., 922A-D) associated with the electronic mail message (e.g., 920A-C) is displayed on the display. A touch below the intensity threshold on electronic mail message will not cause display of the contextual menu with affordances. Instead, for example, a touch below the intensity threshold on electronic mail message may be used to scroll the electronic mail message, such as by touching and swiping up or down.

In accordance with some embodiments, displaying the first set of one or more affordances associated with the electronic mail message comprises replacing display of the electronic mail message (e.g., 920A-C) with display of the first set of one or more affordances (e.g., 922A-D) associated with the electronic mail message.

In accordance with some embodiments, the first set of one or more affordances associated with the electronic mail message includes one or more of: an affordance associated with replying to the electronic mail message (e.g., 922A), an affordance associated with marking (e.g., marking as unread, junk, flagged; 922B) the electronic mail message, an affordance associated with opening the electronic mail message on a second device (e.g., a phone, tablet, or computer; 922C), and a first affordance associated with a cancel action (e.g., 922D) associated with the electronic mail message.

In accordance with some embodiments, user input representing a touch associated with the first affordance associated with the cancel action is received. In response to receiving user input representing the touch associated with the first affordance associated with the cancel action, display of the first set of one or more affordances (e.g., 922A-D) is replaced with display of the electronic mail message (e.g., 920A-C).

In accordance with some embodiments, user input representing a touch associated with the affordance associated with replying to the electronic mail message is received. In response to receiving user input representing the touch associated with the affordance associated with replying to the electronic mail message, display of the first set of one or more affordances (e.g., 922A-D) is replaced with a second set of one or more affordances (e.g., 924A-D) associated with the electronic mail message.

In accordance with some embodiments, the second set of affordances associated with the electronic mail message includes one or more of: an affordance (e.g., 924A) associated with replying to the sender of the electronic mail message, an affordance (e.g., 924B) associated with replying to all recipients (e.g., sender and any recipients) of the electronic mail message, an affordance (e.g., 924C) associated with forwarding the electronic mail message, and a second affordance (e.g., 924D) associated with a cancel action associated with the electronic mail message.

In accordance with some embodiments, user input representing a touch associated with the second affordance associated with the cancel action is received. In response to receiving user input representing the touch associated with the second affordance associated with the cancel action, display of the second set of one or more affordances (e.g., 924A-D) is replaced with display of the first set of one or more affordances (e.g. for replying, marking, opening, and canceling; 922A-D).

In accordance with some embodiments, user input representing a touch associated with the affordance associated with replying to the sender of the electronic mail message is received. In response to receiving user input representing the touch associated with the affordance (e.g., 924A) associated with replying to the sender of the electronic mail message, display of the second set of one or more affordances (e.g., 924A-D) is replaced with display of an interface for replying to the electronic mail message.

In accordance with some embodiments, user input representing a touch associated with the affordance associated with replying to all recipients of the electronic mail message is received. In response to receiving user input representing the touch associated with the affordance (e.g., 924B) associated with replying to all recipients (e.g., sender and any recipients) of the electronic mail message, display of the second set of one or more affordances (e.g., 924A-D) is replaced with display of an interface for replying to all recipients of the electronic mail message (e.g., 930A-D).

In accordance with some embodiments, user input representing a touch associated with the affordance associated with forwarding the electronic mail message is received. In response to receiving user input representing the touch associated with the affordance associated with forwarding the electronic mail message, display of the second set of one or more affordances (e.g., 924A-D) is replaced with display of an interface for forwarding the electronic mail message.

In accordance with some embodiments, user input representing a touch associated with the affordance associated with marking the electronic mail message is received. In response to receiving user input representing the touch associated with the affordance associated with marking the electronic mail message, display of the first set of one or more affordances (e.g., 922A-D) is replaced with a third set of one or more affordances (e.g., 940A-D) associated with the electronic mail message (e.g., flag, mark unread, archive, and cancel affordances).

In accordance with some embodiments, the third set of affordances (e.g., 940A-D) associated with the electronic mail message includes one or more of: an affordance (e.g., 940A) associated with flagging the electronic mail message, an affordance (e.g., 940B) associated with marking as unread the electronic mail message, an affordance (e.g., 940C) associated with archiving the electronic mail message, and a third affordance (e.g., 940D) associated with a cancel action associated with the electronic mail message.

In accordance with some embodiments, user input representing a touch associated with the third affordance associated with the cancel action is received. In response to receiving user input representing the touch associated with the third affordance associated with the cancel action, display of the third set of one or more affordances (e.g., 940A-D) is replaced with display of the first set of one or more affordances (e.g. for replying, marking, opening, and canceling; 922A-D).

In accordance with some embodiments, user input representing a touch associated with the affordance associated with flagging the electronic mail message is received. In response to receiving user input representing the touch associated with the affordance associated with flagging the electronic mail message, display of the third set of one or more affordances (e.g., 940A-D) is replaced with display of the electronic mail message, including a flag indicator (e.g., display the email with a dot that appears next to the subject line to indicate the email is flagged; 942A).

In accordance with some embodiments, user input representing a touch associated with the affordance associated with marking as unread the electronic mail message is received. In response to receiving user input representing the touch associated with the affordance associated with marking as unread the electronic mail message, display of the third set of one or more affordances (e.g., 940A-D) is replaced with display of the electronic mail message, including an unread indicator (e.g., display the email with a circle that appears next to the subject line to indicate the email is unread; 944A).

In accordance with some embodiments, user input representing a touch associated with the affordance associated with archiving the electronic mail message is received. In response to receiving user input representing the touch associated with the affordance associated with archiving the electronic mail message, the electronic mail message is moved into an archive folder.

In accordance with some embodiments, user input representing a touch associated with the affordance associated with opening the electronic mail message is received. In response to receiving user input representing the touch associated with the affordance associated with opening the electronic mail message, causing the electronic mail message to be displayed on a linked companion device (e.g., displaying the email message on a phone, tablet, or laptop that has been linked to the electronic device).

In accordance with some embodiments, the interface for composing the new electronic mail message (e.g., 916) comprises one or more of: an affordance (e.g., 916A) associated with adding recipient information to the new electronic mail message, an affordance (e.g., 916B) associated with adding subject information to the new electronic mail message, and an affordance (e.g., 916C) associated with adding body information to the new electronic mail message.

In accordance with some embodiments, user input representing a touch associated with the affordance associated with adding recipient information to the new electronic mail message is received. In response to receiving user input representing the touch associated with the affordance associated with adding recipient information to the new electronic mail message, display of the interface for composing the new electronic mail message (e.g., 916) is replaced with display of a fourth set of one or more affordances (e.g., 946A-C) associated with the new electronic mail message (e.g. for selecting recipient using a recent affordance, dictation affordance, or keyboard affordance).

In accordance with some embodiments, the fourth set of one or more affordances (e.g., 946A-C) associated with the new electronic mail message includes one or more of: an affordance (e.g., 946A) associated with recent contacts, an affordance (e.g., 946B) associated with dictation, and an affordance (e.g., 946C) associated with a keyboard.

In accordance with some embodiments, user input representing a touch associated with the affordance associated with recent contacts is received. In response to receiving user input representing the touch associated with the affordance associated with recent contacts, display of the fourth set of one or more affordances (e.g., 946A-C) is replaced with display of one or more recent contact affordances (e.g. display a list of contacts recently contacted (incoming or outgoing) and receive a selection of a contact to use as a recipient of the new mail message; 948A-C).

In accordance with some embodiments, user input representing a touch associated with a recent contact affordance of the one or more recent contact affordances is received. The recent contact affordance is associated with an email address. In response to receiving user input representing the touch associated with the recent contact affordance, email address is added as recipient information to the new electronic mail message.

In accordance with some embodiments, user input representing a touch associated with the affordance associated with dictation is received. In response to receiving user input representing the touch associated with the affordance associated with dictation, display of the fourth set of one or more affordances (e.g., 946A-C) is replaced with display of a dictation interface (e.g. enable a microphone of the electronic device and display a graphic waveform based on audio input received at the microphone; 950).

In accordance with some embodiments, user input representing recipient speech is received. In response to receiving user input representing recipient speech, the user input representing recipient speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing recipient speech, the transcribed recipient speech is added as recipient information to the new electronic mail message.

In accordance with some embodiments, user input representing a touch associated with the affordance associated with the keyboard is received. In response to receiving user input representing the touch associated with the affordance associated with the keyboard, display of the fourth set of one or more affordances (e.g., 946A-C) is replaced with display of one or more keys of a keyboard (e.g. display a keyboard that allows user input to enter recipient information; 952).

In accordance with some embodiments, user input representing keyboard input using the one or more keys of the keyboard is received. The user input representing keyboard input is associated with an email address (e.g., the user enters an email address or enters a name linked to an email address using the keyboard). In response to receiving user input representing the keyboard input, the email address is added as recipient information to the new electronic mail message.

In accordance with some embodiments, user input representing a touch associated with the affordance associated with adding subject information to the new electronic mail message is received. In response to receiving user input representing the touch associated with the affordance associated with adding subject information to the new electronic mail message, display of the interface for composing the new electronic mail message (e.g., 954) is replaced with display of a dictation interface (e.g. enable a microphone of the electronic device and display a graphic waveform based on audio input received at the microphone; automatic speech recognition can happen at the device, at a remote device, or at a remote server; 956).

In accordance with some embodiments, user input representing subject speech is received. In response to receiving user input representing subject speech, the user input representing subject speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing subject speech, the transcribed subject speech is added as subject information to the new electronic mail message.

In accordance with some embodiments, user input representing a touch associated with the affordance associated with adding body information to the new electronic mail message is received. In response to receiving user input representing the touch associated with the affordance associated with adding body information to the new electronic mail message, display of the interface for composing the new electronic mail message (e.g., 958) is replaced with display of a dictation interface (e.g. enable a microphone of the electronic device and display a graphic waveform based on audio input received at the microphone; automatic speech recognition can happen at the device, at a remote device, or at a remote server; 960).

In accordance with some embodiments, user input representing body speech is received. In response to receiving user input representing body speech, the user input representing body speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing body speech, the transcribed body speech is added as body information to the new electronic mail message.

In accordance with some embodiments, it is determined whether the new electronic mail message includes recipient information, subject information, and body information. In response to determining that the new electronic mail message includes recipient information, subject information, and body information, an affordance (e.g., 964B) associated with sending the new electronic mail message is displayed. In other examples, in response, the affordance (e.g., 964B) associated with sending the new electronic mail message is visually updated and/or becomes activatable. (e.g., once the recipient, subject, and body have content, the send button becomes enabled and is no longer grayed out).

In accordance with some embodiments, user input representing a touch associated with the affordance associated with sending the new electronic mail message is received. In response to receiving user input representing the touch associated with the affordance associated with sending the new electronic mail message, the new electronic mail message is transmitted (e.g., send the email to the recipient using the subject and body entered by the user when the user presses the send button; the new electronic mail message is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the new electronic mail message. The companion device also includes a user-accessible electronic mail message application and may be configured for accessing the electronic mail of the user of the electronic device).

In accordance with some embodiments, user input representing a substantially horizontal swipe gesture (e.g., a swipe left gesture) associated with an electronic mail thread object of the list of electronic mail thread objects (e.g., at a thread of the inbox) is received. In response to receiving user input representing the substantially horizontal swipe gesture (e.g., a swipe left gesture) associated with the electronic mail thread object of the list of electronic mail thread objects (e.g., at a thread of the inbox), an affordance (e.g., 976A) for deleting an electronic mail thread associated with the electronic mail thread object is displayed (e.g., deleting the mail thread also removes the mail thread object).

In accordance with some embodiments, user input representing a substantially horizontal swipe gesture (e.g., a swipe left gesture) associated with an electronic mail message object of the list of electronic mail message objects (e.g., at an email of a thread) is received. In response to receiving user input representing the substantially horizontal swipe gesture (e.g., a swipe left gesture) associated with the electronic mail message object of the list of electronic mail message objects (e.g., at an email of a thread), an affordance (e.g., 982A) for deleting an electronic mail message associated with the electronic mail message object is displayed (e.g., deleting the mail message also removes the mail message object).

In accordance with some embodiments, user input representing a substantially horizontal swipe gesture (e.g., a swipe left gesture) associated with an electronic mail message object of the list of electronic mail message objects (e.g., at an email of a thread) is received. It is determined whether the user input representing the substantially horizontal swipe gesture (e.g., a swipe left gesture) associated with the electronic mail message object indicates the swipe gesture exceeds a first threshold (e.g., a partial swipe across the electronic mail message object) or exceeds a second threshold (e.g., a full or 75% swipe across the electronic mail message object). In response to receiving user input representing the substantially horizontal swipe gesture (e.g., a swipe left gesture) associated with the electronic mail message object (e.g., at an email of a thread) and in accordance with a determination that the user input indicates the substantially horizontal swipe gesture (e.g., a swipe left gesture) associated with the electronic mail message object exceeds the first threshold and does not exceed the second threshold, an affordance (e.g., 980A) for marking an electronic mail message associated with the electronic mail message object (e.g., activating the marking affordance causes display of affordances for marking the mail message as unread, junk, and flagged) is displayed. In response to receiving user input representing the substantially horizontal swipe gesture (e.g., a swipe left gesture) associated with the electronic mail message object (e.g., at an email of a thread) and in accordance with a determination that the user input indicates the substantially horizontal swipe gesture (e.g., a swipe left gesture) associated with the electronic mail message object exceeds the second threshold, an affordance (e.g., 982A) for deleting an electronic mail message associated with the electronic mail message object is displayed (e.g., deleting the mail message also removes the mail message object).

Note that details of the processes described above with respect to method 1000 (FIG. 10) are also applicable in an analogous manner to the methods described above. For example, method 700 (FIG. 10) may include one or more of the characteristics of the various methods described above with reference to method 1000. For brevity, these details are not repeated below.

It should be understood that the particular order in which the operations in FIG. 10 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 800 (FIG. 8), and method 1000 (FIG. 10) may be incorporated with one another. Thus, the techniques described with respect to method 1000 may be relevant to method 700 and 800.

The operations in the electronic mail access and manipulation methods described above may be implemented by running one or more functional modules in an information processing apparatus such as general purpose processors or application specific chips. These modules, combinations of these modules, and/or their combination with general hardware (e.g., as described above with respect to FIGS. 1A, 1B, 3, 5A, and 5B) are all included within the scope of protection.

Figure 11:
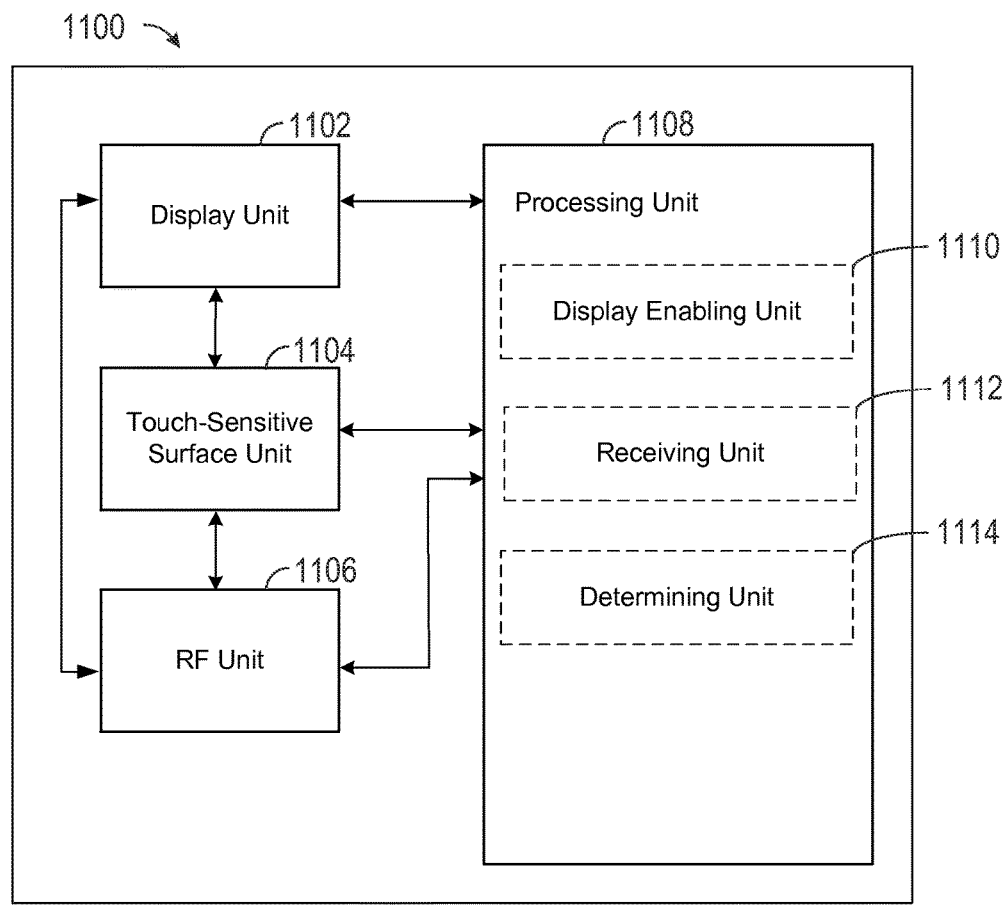
FIG. 11 illustrates a functional block diagram in accordance with some embodiments.

FIG. 11 shows exemplary functional blocks of an electronic device 1100 that, in some embodiments, perform the features described above. As shown in FIG. 11, an electronic device 1100 includes a display unit 1102 configured to display graphical objects; a touch-sensitive surface unit 1104 configured to receive user gestures (e.g., touches); one or more RF units 1106 configured to detect and communicate with external electronic devices; and a processing unit 1108 coupled to display unit 1102, touch-sensitive surface unit 1104, and RF units 1106. In some embodiments, the processing unit 1108 includes a display enabling unit 1110, a receiving unit 1112, and a determining unit 1114. The units of FIG. 11 may be used to implement the various techniques and methods described above with respect to FIGS. 6-10.

For example, the display enabling unit 1110 can be used for: displaying, on the display, an affordance representing an electronic mail application; in response to receiving the user input associated with the landing screen and in accordance with a determination that the user input associated with the landing screen represents a touch associated with the displayed inbox affordance, displaying, on the display, a list of electronic mail thread objects; in response to receiving the user input associated with the landing screen and in accordance with a determination that the user input associated with the landing screen represents a touch associated the displayed compose affordance, displaying, on the display, an interface for composing a new electronic mail message; in response to receiving the user input representing the movement of the rotatable input mechanism, displaying a list of electronic mail thread objects; and in response to receiving the user input representing the swipe down gesture associated with the list of electronic mail thread objects, displaying an affordance for composing a new electronic mail message.

For example, the receiving unit 1112 can be used for: receiving user input representing movement of the rotatable input mechanism; receiving user input associated with the landing screen; and receiving user input representing a swipe down gesture associated with the list of electronic mail thread objects.

For example, the determining unit 1114 can be used for determining whether the user input associated with the landing screen represents a touch associated with the displayed inbox affordance or a touch associated with the displayed compose affordance.

The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

Figure 12:
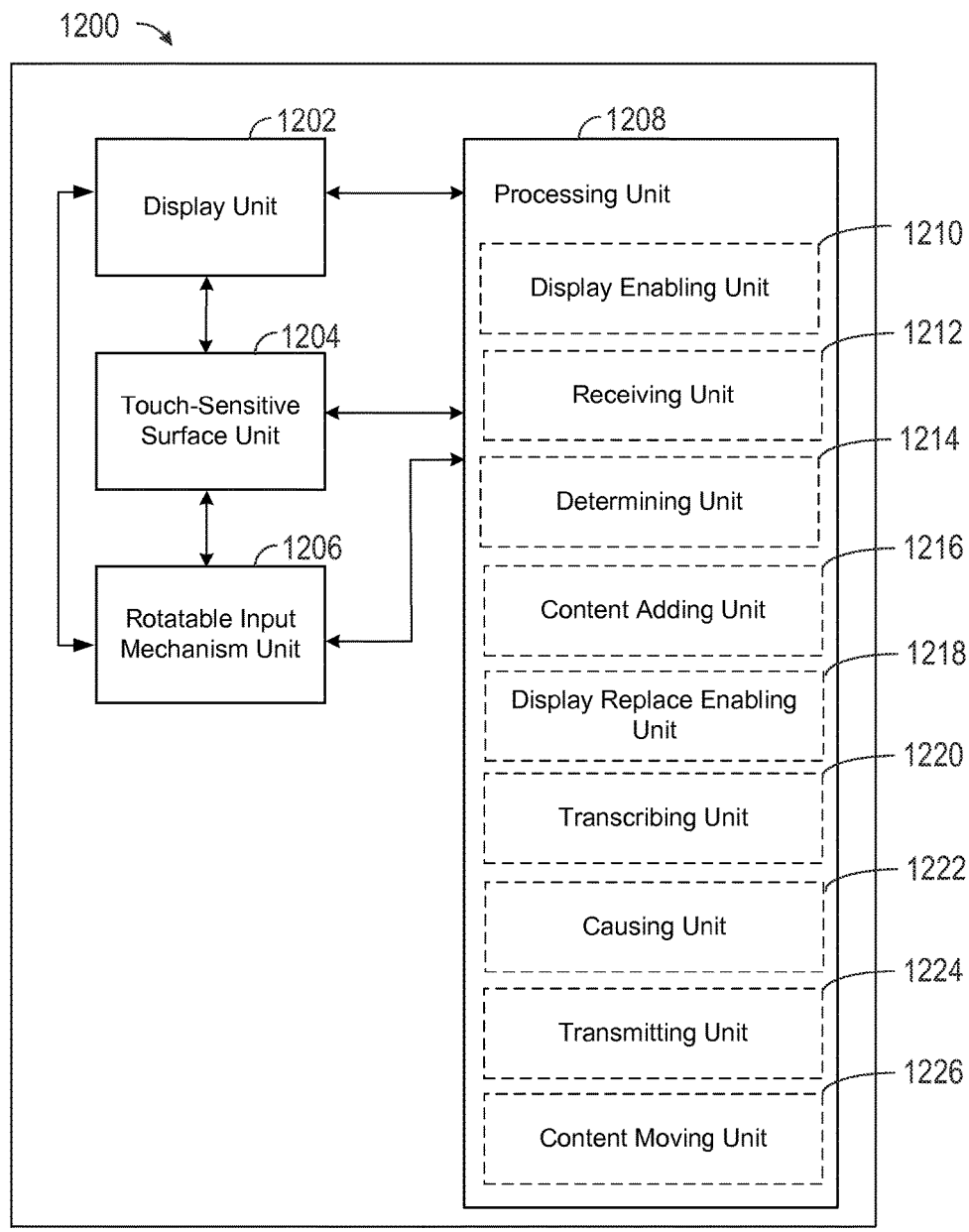
FIG. 12 illustrates a functional block diagram in accordance with some embodiments.

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a display unit 1202 configured to display a graphic user interface, a touch-sensitive surface unit 1204 configured to receive contacts, a rotatable input mechanism unit 1206 configured to receive user input, and a processing unit 1208 coupled to the display unit 1202, the touch-sensitive surface unit 1204, and the rotatable input mechanism unit 1206. In some embodiments, the processing unit 1208 includes a display enabling unit 1210, a receiving unit 1212, a determining unit 1214, a content adding unit 1216, a display replace enabling unit 1218, a transcribing unit 1220, a causing unit 1222, a transmitting unit 1224, and a content moving unit 1226.

The processing unit 1208 is configured to enable display (e.g., using a display enabling unit 1210) of an affordance representing an electronic mail application, wherein the affordance representing the electronic mail application includes an indication of a number of unread electronic mail messages of the electronic mail application. The processing unit 1208 is further configured to receive (e.g., using a receiving unit) user input representing movement of the rotatable input mechanism unit, and in response to receiving the user input representing the movement of the rotatable input mechanism unit, enable display of (e.g., using a display enabling unit) a landing screen of the electronic mail application, wherein the landing screen includes display of an inbox affordance and a compose affordance. The processing unit 1208 is further configured to receive (e.g., using a receiving unit 1212) user input associated with the landing screen. The processing unit 1208 is further configured to determine (e.g., using a determining unit 1214) whether the user input associated with the landing screen represents a touch associated with the displayed inbox affordance or a touch associated with the displayed compose affordance. The processing unit 1208 is further configured to, in response to receiving the user input associated with the landing screen and in accordance with a determination that the user input associated with the landing screen represents a touch associated with the displayed inbox affordance, enable display (e.g., using the display enabling unit 1210) on the display unit, a list of electronic mail thread objects. The processing unit 1208 is further configured to, in response to receiving the user input associated with the landing screen and in accordance with a determination that the user input associated with the landing screen represents a touch associated the displayed compose affordance, enable display (e.g., using the display enabling unit 1210) on the display unit, an interface for composing a new electronic mail message.

In some embodiments, the processing unit 1208 is further configured to receive (e.g., using the receiving unit 1212) user input representing a touch associated with an electronic mail thread object of the list of electronic mail thread objects. The processing unit 1208 is further configured to, in response to receiving user input representing the touch associated with an electronic mail thread object of the list of electronic mail thread objects, enable display (e.g., using the display enabling unit 1210) on the display unit 1202, a list of electronic mail message objects associated with the electronic mail thread object.

In some embodiments, the processing unit 1208 is further configured to receive (e.g., using the receiving unit 1212) user input representing a substantially horizontal swipe gesture from a bezel of the electronic device at the list of electronic mail message objects. The processing unit 1208 is further configured to, in response to receiving user input representing the substantially horizontal swipe gesture from the bezel of the electronic device at the list of electronic mail message objects, replace display (e.g., using the display replace enabling unit 1218) of the list of electronic mail message objects with the list of electronic mail thread objects.

In some embodiments, the processing unit 1208 is further configured to receive (e.g., using the receiving unit 1212) user input representing a touch associated with an electronic mail message object of the list of electronic mail message objects. The processing unit 1208 is further configured to, in response to receiving user input representing the touch associated with an electronic mail message object of the list of electronic mail message objects, enable display (e.g., using the display enabling unit 1210) on the display unit 1202, an electronic mail message associated with the electronic mail message object.

In some embodiments, the processing unit 1208 is further configured to receive (e.g., using the receiving unit 1212) user input representing a substantially horizontal swipe gesture from a bezel of the electronic device associated with the electronic mail message. The processing unit 1208 is further configured to, in response to receiving user input representing the substantially horizontal swipe gesture from the bezel of the electronic device associated with the electronic mail message, replace display (e.g., using the display replace enabling unit 1218) of the electronic mail message with the list of electronic mail message objects.

In some embodiments, the touch-sensitive surface unit 1204 is configured to detect intensity of touches. The processing unit 1208 is further configured to receive (e.g., using the receiving unit 1212) user input representing a touch on the electronic mail message. The processing unit 1208 is further configured to determine (e.g., using a determining unit 1214) whether a characteristic intensity of the touch on the electronic mail message is above an intensity threshold. The processing unit 1208 is further configured to, in response to receiving the user input representing the touch on the electronic mail message and in accordance with a determination that the characteristic intensity of the touch is above the intensity threshold, enable display (e.g., using the display enabling unit 1210) on the display unit 1202, a first set of one or more affordances associated with the electronic mail message.

In some embodiments, the processing unit 1208 is further configured to enable display (e.g., using the display enabling unit 1210) of the first set of one or more affordances associated with the electronic mail message. In some embodiments, the processing unit is further configured to: replace display (e.g., using the display replace enabling unit 1218) of the electronic mail message with display of the first set of one or more affordances associated with the electronic mail message.

In some embodiments, the first set of one or more affordances associated with the electronic mail message includes one or more of: an affordance associated with replying to the electronic mail message, an affordance associated with marking the electronic mail message, an affordance associated with opening the electronic mail message on a second device, and a first affordance associated with a cancel action associated with the electronic mail message.

In some embodiments, the processing unit 1208 is further configured to receive (e.g., using the receiving unit 1212) user input representing a touch associated with the first affordance associated with the cancel action. The processing unit 1208 is further configured to, in response to receiving user input representing the touch associated with the first affordance associated with the cancel action, replace display (e.g., using the display replace enabling unit 1218) of the first set of one or more affordances with display of the electronic mail message.

In some embodiments, the processing unit 1208 is further configured to receive (e.g., using the receiving unit 1212) user input representing a touch associated with the affordance associated with replying to the electronic mail message. The processing unit 1208 is further configured to, in response to receiving user input representing the touch associated with the affordance associated with replying to the electronic mail message, replace display (e.g., using the display replace enabling unit 1218) of the first set of one or more affordances with a second set of one or more affordances associated with the electronic mail message.

In some embodiments, the second set of affordances associated with the electronic mail message includes one or more of: an affordance associated with replying to the sender of the electronic mail message, an affordance associated with replying to all recipients of the electronic mail message, an affordance associated with forwarding the electronic mail message, and a second affordance associated with a cancel action associated with the electronic mail message.

In some embodiments, the processing unit 1208 is further configured to receive (e.g., using the receiving unit 1212) user input representing a touch associated with the second affordance associated with the cancel action. The processing unit 1208 is further configured to, in response to receiving user input representing the touch associated with the second affordance associated with the cancel action, replace display (e.g., using the display replace enabling unit 1218) of the second set of one or more affordances with display of the first set of one or more affordances.

In some embodiments, the processing unit 1208 is further configured to receive (e.g., using the receiving unit 1212) user input representing a touch associated with the affordance associated with replying to the sender of the electronic mail message. The processing unit 1208 is further configured to, in response to receiving user input representing the touch associated with the affordance associated with replying to the sender of the electronic mail message, replace display (e.g., using the display replace enabling unit 1218) of the second set of one or more affordances with display of an interface for replying to the electronic mail message.

In some embodiments, the processing unit 1208 is further configured to receive (e.g., using the receiving unit 1212) user input representing a touch associated with the affordance associated with replying to all recipients of the electronic mail message. The processing unit 1208 is further configured to, in response to receiving user input representing the touch associated with the affordance associated with replying to all recipients of the electronic mail message, replace display (e.g., using the display replace enabling unit 1218) of the second set of one or more affordances with display of an interface for replying to all recipients of the electronic mail message.

In some embodiments, the processing unit 1208 is further configured to receive (e.g., using the receiving unit 1212) user input representing a touch associated with the affordance associated with forwarding the electronic mail message. The processing unit 1208 is further configured to, in response to receiving user input representing the touch associated with the affordance associated with forwarding the electronic mail message, replace display (e.g., using the display replace enabling unit 1218) of the second set of one or more affordances with display of an interface for forwarding the electronic mail message.

In some embodiments, the processing unit 1208 is further configured to receive (e.g., using the receiving unit 1212) user input representing a touch associated with the affordance associated with marking the electronic mail message. The processing unit 1208 is further configured to, in response to receiving user input representing the touch associated with the affordance associated with marking the electronic mail message, replace display (e.g., using the display replace enabling unit 1218) of the first set of one or more affordances with a third set of one or more affordances associated with the electronic mail message.

In some embodiments, the third set of affordances associated with the electronic mail message includes one or more of: an affordance associated with flagging the electronic mail message, an affordance associated with marking as unread the electronic mail message, an affordance associated with archiving the electronic mail message, and a third affordance associated with a cancel action associated with the electronic mail message.

In some embodiments, the processing unit 1208 is further configured to receive (e.g., using the receiving unit 1212) user input representing a touch associated with the third affordance associated with the cancel action. The processing unit 1208 is further configured to, in response to receiving user input representing the touch associated with the third affordance associated with the cancel action, replace display (e.g., using the display replace enabling unit 1218) of the third set of one or more affordances with display of the first set of one or more affordances.

In some embodiments, the processing unit 1208 is further configured to receive (e.g., using the receiving unit 1212) user input representing a touch associated with the affordance associated with flagging the electronic mail message. The processing unit 1208 is further configured to, in response to receiving user input representing the touch associated with the affordance associated with flagging the electronic mail message, replace display (e.g., using the display replace enabling unit 1218) of the third set of one or more affordances with display of the electronic mail message, including a flag indicator.

In some embodiments, the processing unit 1208 is further configured to receive (e.g., using the receiving unit 1212) user input representing a touch associated with the affordance associated with marking as unread the electronic mail message. The processing unit 1208 is further configured to, in response to receiving user input representing the touch associated with the affordance associated with marking as unread the electronic mail message, replace display (e.g., using the display replace enabling unit 1218) of the third set of one or more affordances with display of the electronic mail message, including an unread indicator.

In some embodiments, the processing unit 1208 is further configured to receive (e.g., using the receiving unit 1212) user input representing a touch associated with the affordance associated with archiving the electronic mail message. The processing unit 1208 is further configured to, in response to receiving user input representing the touch associated with the affordance associated with archiving the electronic mail message, move (e.g., using the content moving unit 1226) the electronic mail message into an archive folder.

In some embodiments, the processing unit 1208 is further configured to receive (e.g., using the receiving unit 1212) user input representing a touch associated with the affordance associated with opening the electronic mail message. The processing unit 1208 is further configured to, in response to receiving user input representing the touch associated with the affordance associated with opening the electronic mail message, cause (e.g., using the causing unit 1222) the electronic mail message to be displayed on a linked companion device.

In some embodiments, the interface for composing the new electronic mail message comprises one or more of: an affordance associated with adding recipient information to the new electronic mail message, an affordance associated with adding subject information to the new electronic mail message, and an affordance associated with adding body information to the new electronic mail message.

In some embodiments, the processing unit 1208 is further configured to receive (e.g., using the receiving unit 1212) user input representing a touch associated with the affordance associated with adding recipient information to the new electronic mail message. The processing unit 1208 is further configured to, in response to receiving user input representing the touch associated with the affordance associated with adding recipient information to the new electronic mail message, replace display (e.g., using the display replace enabling unit 1218) of the interface for composing the new electronic mail message with display of a fourth set of one or more affordances associated with the new electronic mail message. In some embodiments, the fourth set of one or more affordances associated with the new electronic mail message includes one or more of: an affordance associated with recent contacts, an affordance associated with dictation, and an affordance associated with a keyboard.

In some embodiments, the processing unit 1208 is further configured to receive (e.g., using the receiving unit 1212) user input representing a touch associated with the affordance associated with recent contacts. The processing unit 1208 is further configured to, in response to receiving user input representing the touch associated with the affordance associated with recent contacts, replace display (e.g., using the display replace enabling unit 1218) of the fourth set of one or more affordances with display of one or more recent contact affordances.

In some embodiments, the processing unit 1208 is further configured to receive (e.g., using the receiving unit 1212) user input representing a touch associated with a recent contact affordance of the one or more recent contact affordances, the recent contact affordance associated with an email address. The processing unit 1208 is further configured to, in response to receiving user input representing the touch associated with the recent contact affordance, add (e.g., using the content adding unit 1216) the email address as recipient information to the new electronic mail message.

In some embodiments, the processing unit 1208 is further configured to receive (e.g., using the receiving unit 1212) user input representing a touch associated with the affordance associated with dictation. The processing unit 1208 is further configured to, in response to receiving user input representing the touch associated with the affordance associated with dictation, replace display (e.g., using the display replace enabling unit 1218) of the fourth set of one or more affordances with display of a dictation interface.

In some embodiments, the processing unit 1208 is further configured to receive (e.g., using the receiving unit 1212) user input representing recipient speech. The processing unit 1208 is further configured to, in response to receiving user input representing recipient speech: transcribe (e.g., using the transcribing unit 1220) the user input representing recipient speech, and add (e.g., using the content adding unit 1216) the transcribed recipient speech as recipient information to the new electronic mail message.

In some embodiments, the processing unit 1208 is further configured to receive (e.g., using the receiving unit 1212) user input representing a touch associated with the affordance associated with the keyboard. The processing unit 1208 is further configured to, in response to receiving user input representing the touch associated with the affordance associated with the keyboard, replace display (e.g., using the display replace enabling unit 1218) of the fourth set of one or more affordances with display of one or more keys of a keyboard.

In some embodiments, the processing unit 1208 is further configured to receive (e.g., using the receiving unit 1212) user input representing keyboard input using the one or more keys of the keyboard, the user input representing keyboard input associated with an email address. The processing unit 1208 is further configured to, in response to receiving user input representing the keyboard input, add (e.g., using the content adding unit 1216) the email address as recipient information to the new electronic mail message.

In some embodiments, the processing unit 1208 is further configured to receive (e.g., using the receiving unit 1212) user input representing a touch associated with the affordance associated with adding subject information to the new electronic mail message. The processing unit 1208 is further configured to, in response to receiving user input representing the touch associated with the affordance associated with adding subject information to the new electronic mail message, replace display (e.g., using the display replace enabling unit 1218) of the interface for composing the new electronic mail message with display of a dictation interface.

In some embodiments, the processing unit 1208 is further configured to receive (e.g., using the receiving unit 1212) user input representing subject speech. The processing unit 1208 is further configured to, in response to receiving user input representing subject speech: transcribe (e.g., using the transcribing unit 1220) the user input representing subject speech, and add (e.g., using the content adding unit 1216) the transcribed subject speech as subject information to the new electronic mail message.

In some embodiments, the processing unit 1208 is further configured to receive (e.g., using the receiving unit 1212) data representing a touch associated with the affordance associated with adding body information to the new electronic mail message. The processing unit 1208 is further configured to, in response to receiving data representing the touch associated with the affordance associated with adding body information to the new electronic mail message, replace display (e.g., using the display replace enabling unit 1218) of the interface for composing the new electronic mail message with display of a dictation interface.

In some embodiments, the processing unit 1208 is further configured to receive (e.g., using the receiving unit 1212) user input representing body speech. The processing unit 1208 is further configured to, in response to received user input representing body speech: transcribe (e.g., using the transcribing unit 1220) the user input representing body speech, and add (e.g., using the content adding unit 1216) the transcribed body speech as body information to the new electronic mail message.

In some embodiments, the processing unit 1208 is further configured to determine (e.g., using a determining unit 1214) whether the new electronic mail message includes recipient information, subject information, and body information. The processing unit 1208 is further configured to, in response to determining that the new electronic mail message includes recipient information, subject information, and body information, enable display (e.g., using the display enable unit 1210) of an affordance associated with sending the new electronic mail message.

In some embodiments, the processing unit 1208 is further configured to receive (e.g., using the receiving unit 1212) user input representing a touch associated with the affordance associated with sending the new electronic mail message. The processing unit 1208 is further configured to, in response to receiving user input representing the touch associated with the affordance associated with sending the new electronic mail message, transmit (e.g., using the transmitting unit 1224) the new electronic mail message.

In some embodiments, the processing unit 1208 is further configured to receive (e.g., using the receiving unit 1212) user input representing a substantially downward swipe gesture associated with the list of electronic mail thread objects. The processing unit 1208 is further configured to, in response to receiving user input representing the substantially downward swipe gesture associated with the list of electronic mail thread objects, enable display (e.g., using the display enable unit 1210) of an affordance for composing a new electronic mail message.

In some embodiments, the processing unit 1208 is further configured to receive (e.g., using the receiving unit 1212) user input representing a substantially horizontal swipe gesture associated with an electronic mail thread object of the list of electronic mail thread objects. The processing unit 1208 is further configured to, in response to receiving user input representing the substantially horizontal swipe gesture associated with the electronic mail thread object of the list of electronic mail thread objects, enable display (e.g., using the display enable unit 1210) of an affordance for deleting an electronic mail thread associated with the electronic mail thread object.

In some embodiments, the processing unit 1208 is further configured to receive (e.g., using the receiving unit 1212) user input representing a substantially horizontal swipe gesture associated with an electronic mail message object of the list of electronic mail message objects. The processing unit 1208 is further configured to, in response to receiving user input representing the substantially horizontal swipe gesture associated with the electronic mail message object of the list of electronic mail message objects, enable display (e.g., using the display enable unit 1210) of an affordance for deleting an electronic mail message associated with the electronic mail message object.

In some embodiments, the processing unit 1208 is further configured to receive (e.g., using the receiving unit 1212) user input representing a substantially horizontal swipe gesture associated with an electronic mail message object of the list of electronic mail message objects. The processing unit 1208 is further configured to determine (e.g., using a determining unit 1214) whether the user input representing the substantially horizontal swipe gesture associated with the electronic mail message object indicates the swipe gesture exceeds a first threshold or exceeds a second threshold. The processing unit 1208 is further configured to, in response to receiving user input representing the substantially horizontal swipe gesture associated with the electronic mail message object and in accordance with a determination that the user input indicates the substantially horizontal swipe gesture associated with the electronic mail message object exceeds the first threshold and does not exceed the second threshold, enable display (e.g., using the display enable unit 1210) of an affordance for marking an electronic mail message associated with the electronic mail message object. The processing unit 1208 is further configured to, in response to receiving user input representing the substantially horizontal swipe gesture associated with the electronic mail message object and in accordance with a determination that the user input indicates the substantially horizontal swipe gesture associated with the electronic mail message object exceeds the second threshold, enable display (e.g., using the display enable unit 1210) of an affordance for deleting an electronic mail message associated with the electronic mail message object.

The operations described above with reference to FIGS. 7 and 8 are, optionally, implemented by components depicted in FIGS. 1A-1B or FIG. 12. For example, displaying operation 702, receiving operation 704, and determining operation 710 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
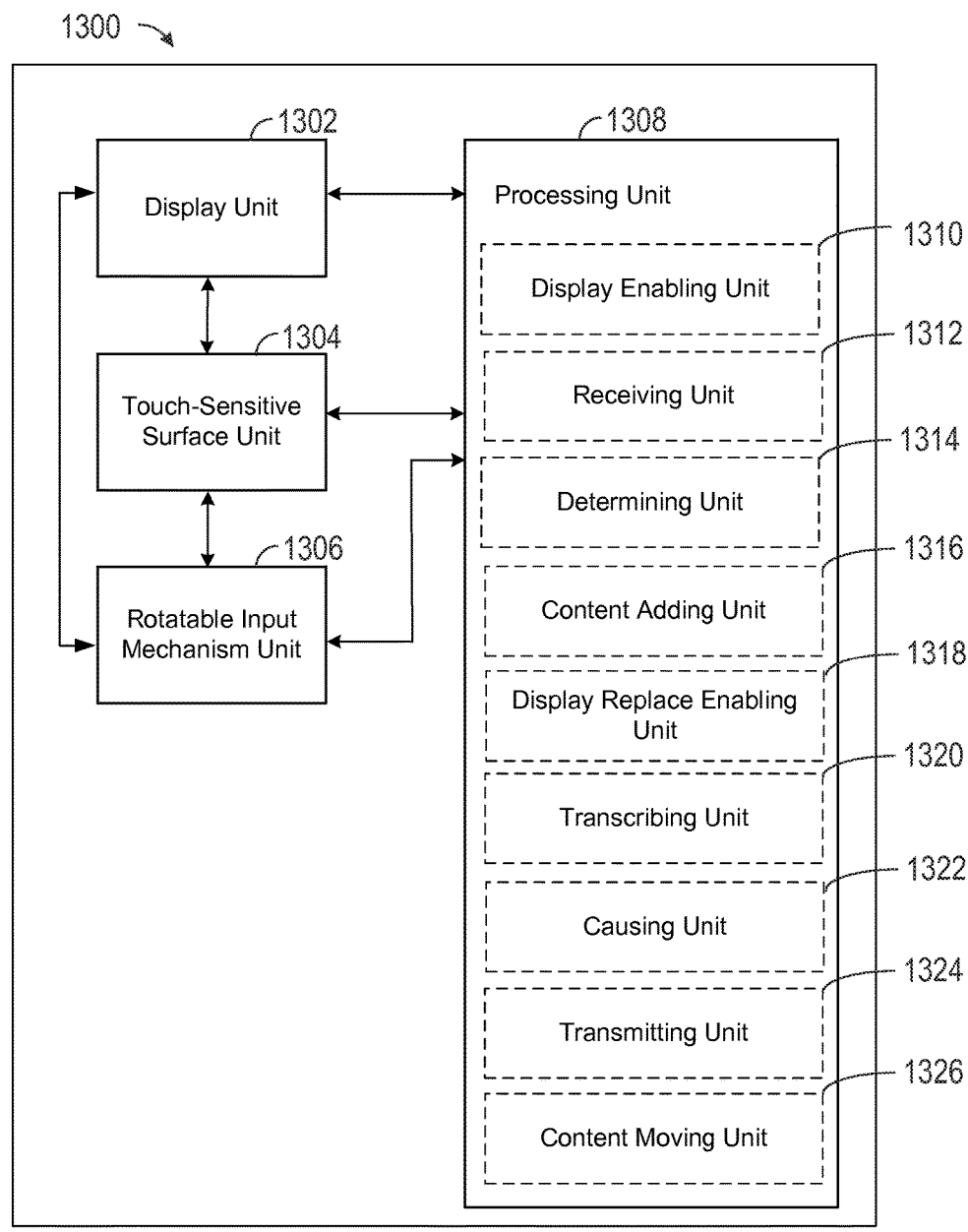
FIG. 13 illustrates a functional block diagram in accordance with some embodiments.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, an electronic device 1300 includes a display unit 1302 configured to display a graphic user interface, a touch-sensitive surface unit 1304 configured to receive contacts, a rotatable input mechanism unit 1306 configured to receive user input, and a processing unit 1308 coupled to the display unit 1302, the touch-sensitive surface unit 1304, and the rotatable input mechanism unit 1306. In some embodiments, the processing unit 1308 includes a display enabling unit 1310, a receiving unit 1312, a determining unit 1314, a content adding unit 1316, a display replace enabling unit 1318, a transcribing unit 1320, a causing unit 1322, a transmitting unit 1324, and a content moving unit 1326.

The processing unit 1308 is configured to enable display (e.g., using the display enable unit 1310) of, on the display unit 1302, an affordance representing an electronic mail application, wherein the affordance representing the electronic mail application includes an indication of a number of unread electronic mail messages of the electronic mail application. The processing unit 1308 is further configured to receive (e.g., using the receiving unit 1312) user input representing movement of the rotatable input mechanism 1306;

The processing unit 1308 is further configured to, in response to receiving the user input representing the movement of the rotatable input mechanism 1306, enable display (e.g., using the display enable unit 1310) of a list of electronic mail thread objects. The processing unit 1308 is further configured to receive (e.g., using the receiving unit 1312) user input representing a swipe down gesture associated with the list of electronic mail thread objects. The processing unit 1308 is further configured to, in response to receiving the user input representing the swipe down gesture associated with the list of electronic mail thread objects, enable display (e.g., using the display enable unit 1310) of an affordance for composing a new electronic mail message.

In some embodiments, the processing unit 1308 is further configured to receive (e.g., using the receiving unit 1312) user input representing a touch associated with the affordance for composing a new electronic mail message. The processing unit 1308 is further configured to, in response to receiving user input representing the touch associated with the affordance for composing a new electronic mail message, enable display (e.g., using the display enable unit 1310), on the display unit 1302, an interface for composing a new electronic mail message.

In some embodiments, the processing unit 1308 is further configured to enable display (e.g., using the display enable unit 1310) of the interface for composing a new electronic mail message. In some embodiments, the processing unit is further configured to replace display (e.g., using the display replace enabling unit 1318) of the list of electronic mail thread objects with display of the interface for composing a new electronic mail message.

In some embodiments, the processing unit 1308 is further configured to receive user input representing a touch associated with an electronic mail thread object of the list of electronic mail thread objects. The processing unit 1308 is further configured to, in response to receiving user input representing the touch associated with an electronic mail thread object of the list of electronic mail thread objects, enable display (e.g., using the display enable unit 1310), on the display unit 1302, a list of electronic mail message objects associated with the electronic mail thread object.

In some embodiments, the processing unit 1308 is further configured to receive (e.g., using the receiving unit 1312) user input representing a substantially horizontal swipe gesture from a bezel of the electronic device at the list of electronic mail message objects. The processing unit 1308 is further configured to, in response to receiving user input representing the substantially horizontal swipe gesture from the bezel of the electronic device at the list of electronic mail message objects, replace display (e.g., using the display replace enabling unit 1318) of the list of electronic mail message objects with the list of electronic mail thread objects.

In some embodiments, the processing unit 1308 is further configured to receive (e.g., using the receiving unit 1312) user input representing a touch associated with an electronic mail message object of the list of electronic mail message objects. The processing unit 1308 is further configured to, in response to receiving user input representing the touch associated with an electronic mail message object of the list of electronic mail message objects, enable display (e.g., using the display enable unit 1310), on the display unit 1302, an electronic mail message associated with the electronic mail message object.

In some embodiments, the processing unit 1308 is further configured to receive (e.g., using the receiving unit 1312) user input representing a substantially horizontal swipe gesture from a bezel of the electronic device associated with the electronic mail message. The processing unit 1308 is further configured to, in response to receiving user input representing the substantially horizontal swipe gesture from the bezel of the electronic device associated with the electronic mail message, replace display (e.g., using the display replace enabling unit 1318) of the electronic mail message with the list of electronic mail message objects.

In some embodiments, the touch-sensitive surface 1304 is configured to detect intensity of touches, and the electronic device the processing unit is further configured to: receive (e.g., using the receiving unit 1312) user input representing a touch on the electronic mail message; determine (e.g., using a determining unit 1314) whether a characteristic intensity of the touch on the electronic mail message is above an intensity threshold. The processing unit 1308 is further configured to, in response to receiving the user input representing the touch on the electronic mail message and in accordance with a determination that the characteristic intensity of the touch is above the intensity threshold: enable display (e.g., using the display enable unit 1310), on the display unit 1302, a first set of one or more affordances associated with the electronic mail message.

In some embodiments, the processing unit 1308 is further configured to enable display (e.g., using the display enable unit 1310) of the first set of one or more affordances associated with the electronic mail message to replace display (e.g., using the display replace enabling unit 1318) of the electronic mail message with display of the first set of one or more affordances associated with the electronic mail message.

In some embodiments, the first set of one or more affordances associated with the electronic mail message includes one or more of: an affordance associated with replying to the electronic mail message, an affordance associated with marking the electronic mail message, an affordance associated with opening the electronic mail message on a second device, and a first affordance associated with a cancel action associated with the electronic mail message.

In some embodiments, the processing unit 1308 is further configured to receive (e.g., using the receiving unit 1312) user input representing a touch associated with the first affordance associated with the cancel action. The processing unit 1308 is further configured to, in response to receiving user input representing the touch associated with the first affordance associated with the cancel action, replace display (e.g., using the display replace enabling unit 1318) of the first set of one or more affordances with display of the electronic mail message.

In some embodiments, the processing unit 1308 is further configured to receive (e.g., using the receiving unit 1312) user input representing a touch associated with the affordance associated with replying to the electronic mail message. The processing unit 1308 is further configured to, in response to receiving user input representing the touch associated with the affordance associated with replying to the electronic mail message, replace display (e.g., using the display replace enabling unit 1318) on the display unit 1302 of the first set of one or more affordances with a second set of one or more affordances associated with the electronic mail message.

In some embodiments, the second set of affordances associated with the electronic mail message includes one or more of: an affordance associated with replying to the sender of the electronic mail message, an affordance associated with replying to all recipients of the electronic mail message, an affordance associated with forwarding the electronic mail message, and a second affordance associated with a cancel action associated with the electronic mail message.

In some embodiments, the processing unit 1308 is further configured to receive (e.g., using the receiving unit 1312) user input representing a touch associated with the second affordance associated with the cancel action. The processing unit 1308 is further configured to, in response to receiving user input representing the touch associated with the second affordance associated with the cancel action, replace display (e.g., using the display replace enabling unit 1318) of the second set of one or more affordances with display of the first set of one or more affordances.

In some embodiments, the processing unit 1308 is further configured to receive (e.g., using the receiving unit 1312) user input representing a touch associated with the affordance associated with replying to the sender of the electronic mail message. The processing unit 1308 is further configured to, in response to receiving user input representing the touch associated with the affordance associated with replying to the sender of the electronic mail message, replace display (e.g., using the display replace enabling unit 1318) of the second set of one or more affordances with display of an interface for replying to the electronic mail message.

In some embodiments, the processing unit 1308 is further configured to receive (e.g., using the receiving unit 1312) user input representing a touch associated with the affordance associated with replying to all recipients of the electronic mail message. The processing unit 1308 is further configured to, in response to receiving user input representing the touch associated with the affordance associated with replying to all recipients of the electronic mail message, replace display (e.g., using the display replace enabling unit 1318) of the second set of one or more affordances with display of an interface for replying to all recipients of the electronic mail message.

In some embodiments, the processing unit 1308 is further configured to receive (e.g., using the receiving unit 1312) user input representing a touch associated with the affordance associated with forwarding the electronic mail message. The processing unit 1308 is further configured to, in response to receiving user input representing the touch associated with the affordance associated with forwarding the electronic mail message, replace display (e.g., using the display replace enabling unit 1318) of the second set of one or more affordances with display of an interface for forwarding the electronic mail message.

In some embodiments, the processing unit 1308 is further configured to receive (e.g., using the receiving unit 1312) user input representing a touch associated with the affordance associated with marking the electronic mail message. The processing unit 1308 is further configured to, in response to receiving user input representing the touch associated with the affordance associated with marking the electronic mail message, replace display (e.g., using the display replace enabling unit 1318) of the first set of one or more affordances with a third set of one or more affordances associated with the electronic mail message.

In some embodiments, the third set of affordances associated with the electronic mail message includes one or more of: an affordance associated with flagging the electronic mail message, an affordance associated with marking as unread the electronic mail message, an affordance associated with archiving the electronic mail message, and a third affordance associated with a cancel action associated with the electronic mail message.

In some embodiments, the processing unit 1308 is further configured to receive (e.g., using the receiving unit 1312) user input representing a touch associated with the third affordance associated with the cancel action. The processing unit 1308 is further configured to, in response to receiving user input representing the touch associated with the third affordance associated with the cancel action, replace display (e.g., using the display replace enabling unit 1318) of the third set of one or more affordances with display of the first set of one or more affordances.

In some embodiments, the processing unit 1308 is further configured to receive (e.g., using the receiving unit 1312) user input representing a touch associated with the affordance associated with flagging the electronic mail message. The processing unit 1308 is further configured to, in response to receiving user input representing the touch associated with the affordance associated with flagging the electronic mail message, replace display (e.g., using the display replace enabling unit 1318) of the third set of one or more affordances with display of the electronic mail message, including a flag indicator.

In some embodiments, the processing unit 1308 is further configured to receive (e.g., using the receiving unit 1312) user input representing a touch associated with the affordance associated with marking as unread the electronic mail message. The processing unit 1308 is further configured to, in response to receiving user input representing the touch associated with the affordance associated with marking as unread the electronic mail message, replace display (e.g., using the display replace enabling unit 1318) of the third set of one or more affordances with display of the electronic mail message, including an unread indicator.

In some embodiments, the processing unit 1308 is further configured to receive (e.g., using the receiving unit 1312) user input representing a touch associated with the affordance associated with archiving the electronic mail message. The processing unit 1308 is further configured to, in response to receiving user input representing the touch associated with the affordance associated with archiving the electronic mail message, move (e.g., using the content moving unit 1326) the electronic mail message into an archive folder.

In some embodiments, the processing unit 1308 is further configured to receive (e.g., using the receiving unit 1312) user input representing a touch associated with the affordance associated with opening the electronic mail message. The processing unit 1308 is further configured to, in response to receiving user input representing the touch associated with the affordance associated with opening the electronic mail message, cause (e.g., using the causing unit 1322) the electronic mail message to be displayed on a linked companion device.

In some embodiments, the interface for composing the new electronic mail message comprises one or more of: an affordance associated with adding recipient information to the new electronic mail message, an affordance associated with adding subject information to the new electronic mail message, and an affordance associated with adding body information to the new electronic mail message.

In some embodiments, the processing unit 1308 is further configured to receive (e.g., using the receiving unit 1312) user input representing a touch associated with the affordance associated with adding recipient information to the new electronic mail message. The processing unit 1308 is further configured to, in response to receiving user input representing the touch associated with the affordance associated with adding recipient information to the new electronic mail message, replace display (e.g., using the display replace enabling unit 1318) of the interface for composing the new electronic mail message with display of a fourth set of one or more affordances associated with the new electronic mail message.

In some embodiments, the fourth set of one or more affordances associated with the new electronic mail message includes one or more of: an affordance associated with recent contacts, an affordance associated with dictation, and an affordance associated with a keyboard.

In some embodiments, the processing unit 1308 is further configured to receive (e.g., using the receiving unit 1312) user input representing a touch associated with the affordance associated with recent contacts. The processing unit 1308 is further configured to, in response to receiving user input representing the touch associated with the affordance associated with recent contacts, replace display (e.g., using the display replace enabling unit 1318) of the fourth set of one or more affordances with display of one or more recent contact affordances.

In some embodiments, the processing unit 1308 is further configured to receive (e.g., using the receiving unit 1312) user input representing a touch associated with a recent contact affordance of the one or more recent contact affordances, the recent contact affordance associated with an email address. The processing unit 1308 is further configured to, in response to receiving user input representing the touch associated with the recent contact affordance, add (e.g., using the content adding unit 1316) the email address as recipient information to the new electronic mail message.

In some embodiments, the processing unit 1308 is further configured to receive (e.g., using the receiving unit 1312) user input representing a touch associated with the affordance associated with dictation. The processing unit 1308 is further configured to, in response to receiving user input representing the touch associated with the affordance associated with dictation, replace display (e.g., using the display replace enabling unit 1318) of the fourth set of one or more affordances with display of a dictation interface.

In some embodiments, the processing unit 1308 is further configured to receive (e.g., using the receiving unit 1312) user input representing recipient speech. The processing unit 1308 is further configured to, in response to receiving user input representing recipient speech: transcribe (e.g., using the transcribing unit 1320) the user input representing recipient speech, and add (e.g., using the content adding unit 1316) the transcribed recipient speech as recipient information to the new electronic mail message.

In some embodiments, the processing unit 1308 is further configured to receive (e.g., using the receiving unit 1312) user input representing a touch associated with the affordance associated with the keyboard. The processing unit 1308 is further configured to, in response to receiving user input representing the touch associated with the affordance associated with the keyboard, replace display (e.g., using the display replace enabling unit 1318) of the fourth set of one or more affordances with display of one or more keys of a keyboard.

In some embodiments, the processing unit 1308 is further configured to receive (e.g., using the receiving unit 1312) user input representing keyboard input using the one or more keys of the keyboard, the user input representing keyboard input associated with an email address. The processing unit 1308 is further configured to, in response to receiving user input representing the keyboard input, add (e.g., using the content adding unit 1316) the email address as recipient information to the new electronic mail message.

In some embodiments, the processing unit 1308 is further configured to receive (e.g., using the receiving unit 1312) user input representing a touch associated with the affordance associated with adding subject information to the new electronic mail message. The processing unit 1308 is further configured to, in response to receiving user input representing the touch associated with the affordance associated with adding subject information to the new electronic mail message, replace display (e.g., using the display replace enabling unit 1318) of the interface for composing the new electronic mail message with display of a dictation interface.

In some embodiments, the processing unit 1308 is further configured to receive (e.g., using the receiving unit 1312) user input representing subject speech. The processing unit 1308 is further configured to, in response to receiving user input representing subject speech: transcribe (e.g., using the transcribing unit 1320) the user input representing subject speech, and add (e.g., using the content adding unit 1316) the transcribed subject speech as subject information to the new electronic mail message.

In some embodiments, the processing unit 1308 is further configured to receive data representing a touch associated with the affordance associated with adding body information to the new electronic mail message. The processing unit 1308 is further configured to, in response to receiving data representing the touch associated with the affordance associated with adding body information to the new electronic mail message, replace display (e.g., using the display replace enabling unit 1318) of the interface for composing the new electronic mail message with display of a dictation interface.

In some embodiments, the processing unit 1308 is further configured to receive (e.g., using the receiving unit 1312) user input representing body speech. The processing unit 1308 is further configured to, in response to receiving user input representing body speech: transcribe (e.g., using the transcribing unit 1320) the user input representing body speech, and add (e.g., using the content adding unit 1316) the transcribed body speech as body information to the new electronic mail message.

In some embodiments, the processing unit 1308 is further configured to determine whether the new electronic mail message includes recipient information, subject information, and body information. The processing unit 1308 is further configured to, in response to determining that the new electronic mail message includes recipient information, subject information, and body information, enable display (e.g., using the display enable unit 1310) of an affordance associated with sending the new electronic mail message.

In some embodiments, the processing unit 1308 is further configured to receive (e.g., using the receiving unit 1312) user input representing a touch associated with the affordance associated with sending the new electronic mail message. The processing unit 1308 is further configured to, in response to receiving user input representing the touch associated with the affordance associated with sending the new electronic mail message, transmit (e.g., using the transmitting unit 1324) the new electronic mail message.

In some embodiments, the processing unit 1308 is further configured to receive (e.g., using the receiving unit 1312) user input representing a substantially horizontal swipe gesture associated with an electronic mail thread object of the list of electronic mail thread objects. The processing unit 1308 is further configured to, in response to receiving user input representing the substantially horizontal swipe gesture associated with the electronic mail thread object of the list of electronic mail thread objects, enable display (e.g., using the display enable unit 1310) of an affordance for deleting an electronic mail thread associated with the electronic mail thread object.

In some embodiments, the processing unit 1308 is further configured to receive (e.g., using the receiving unit 1312) user input representing a substantially horizontal swipe gesture associated with an electronic mail message object of the list of electronic mail message objects. The processing unit 1308 is further configured to, in response to receiving user input representing the substantially horizontal swipe gesture associated with the electronic mail message object of the list of electronic mail message objects, enable display (e.g., using the display enable unit 1310) of an affordance for deleting an electronic mail message associated with the electronic mail message object.

In some embodiments, the processing unit 1308 is further configured to receive (e.g., using the receiving unit 1312) user input representing a substantially horizontal swipe gesture associated with an electronic mail message object of the list of electronic mail message objects. The processing unit 1308 is further configured to determine (e.g., using a determining unit 1314) whether the user input representing the substantially horizontal swipe gesture associated with the electronic mail message object indicates the swipe gesture exceeds a first threshold or exceeds a second threshold. The processing unit 1308 is further configured to, in response to receiving user input representing the substantially horizontal swipe gesture associated with the electronic mail message object and in accordance with a determination that the user input indicates the substantially horizontal swipe gesture associated with the electronic mail message object exceeds the first threshold and does not exceed the second threshold, enable display (e.g., using the display enable unit 1310) of an affordance for marking an electronic mail message associated with the electronic mail message object. The processing unit 1308 is further configured to, in response to receiving user input representing the substantially horizontal swipe gesture associated with the electronic mail message object and in accordance with a determination that the user input indicates the substantially horizontal swipe gesture associated with the electronic mail message object exceeds the second threshold, enable display (e.g., using the display enable unit 1310) of an affordance for deleting an electronic mail message associated with the electronic mail message object.

The operations described above with reference to FIG. 10 are, optionally, implemented by components depicted in FIGS. 1A-1B or FIG. 13. For example, displaying operation 1002 and receiving operation 1004 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer readable storage medium storing one or more programs, the one or more programs comprising instructions, which when executed by one or more processors of an electronic device with a display and a touch-sensitive surface configured to detect intensity of touches, cause the device to:
    display, on the display, an affordance representing an electronic message application;
    receive user input activating the affordance representing the electronic message application;
    display, on the display, a list of electronic message thread objects;
    receive user input activating an electronic message thread object of the list of electronic message thread objects;
    in response to receiving user input activating the electronic message thread object of the list of electronic message thread objects, display, on the display, a list of electronic message objects associated with the electronic message thread object;
    receive user input representing a touch associated with an electronic message object of the list of electronic message objects;
    in response to receiving user input representing the touch associated with an electronic message object of the list of electronic message objects, display, on the display, an electronic message associated with the electronic message object;
    while displaying the electronic message, receive user input representing a touch on the electronic message; and
    in response to receiving the user input representing the touch on the electronic message:
        in accordance with a determination that the characteristic intensity of the touch is above an intensity threshold, display, on the display, a first set of one or more affordances associated with the electronic message, wherein the first set of one or more affordances associated with the electronic message includes an affordance associated with replying to the electronic message; and
        in accordance with a determination that the characteristic intensity of the touch is not above the intensity threshold, forgo display, on the display, the first set of one or more affordances associated with the electronic message.

2. The non-transitory computer readable storage medium of claim 1, wherein the instructions which, when executed by the one or more processors of the electronic device, cause the device to display the first set of one or more affordances associated with the electronic message include instructions which, when executed by the one or more processors of the electronic device, cause the electronic device to:
    replace display of the electronic message with display of the first set of one or more affordances associated with the electronic message.

3. The non-transitory computer readable storage medium of claim 1, wherein the first set of one or more affordances associated with the electronic message includes one or more of:
    an affordance associated with marking the electronic message,
    an affordance associated with opening the electronic message on a second device, and
    a first affordance associated with a cancel action associated with the electronic message.

4. The non-transitory computer readable storage medium of claim 3, wherein the one or more programs further comprise instructions, which when executed by the one or more processors of the electronic device, cause the electronic device to:
    receive user input representing a touch associated with the first affordance associated with the cancel action; and
    in response to receiving user input representing the touch associated with the first affordance associated with the cancel action, replace display of the first set of one or more affordances with display of the electronic message.

5. The non-transitory computer readable storage medium of claim 3, wherein the one or more programs further comprise instructions, which when executed by the one or more processors of the electronic device, cause the electronic device to:
   receive user input representing a touch associated with the affordance associated with replying to the electronic message; and
   in response to receiving user input representing the touch associated with the affordance associated with replying to the electronic message, replace display of the first set of one or more affordances with a second set of one or more affordances associated with the electronic message.

6. The non-transitory computer readable storage medium of claim 5, wherein the second set of affordances associated with the electronic message includes one or more of:
   an affordance associated with replying to the sender of the electronic message,
   an affordance associated with replying to all recipients of the electronic message,
   an affordance associated with forwarding the electronic message, and
   a second affordance associated with a cancel action associated with the electronic message.

7. The non-transitory computer readable storage medium of claim 6, wherein the one or more programs further comprise instructions, which when executed by the one or more processors of the electronic device, cause the electronic device to:
   receive user input representing a touch associated with the affordance associated with replying to the sender of the electronic message; and
   in response to receiving user input representing the touch associated with the affordance associated with replying to the sender of the electronic message, replace display of the second set of one or more affordances with display of an interface for replying to the electronic message.

8. The non-transitory computer readable storage medium of claim 6, wherein the one or more programs further comprise instructions, which when executed by the one or more processors of the electronic device, cause the electronic device to:
   receive user input representing a touch associated with the affordance associated with replying to all recipients of the electronic message; and
   in response to receiving user input representing the touch associated with the affordance associated with replying to all recipients of the electronic message, replace display of the second set of one or more affordances with display of an interface for replying to all recipients of the electronic message.

9. The non-transitory computer readable storage medium of claim 6, wherein the one or more programs further comprise instructions, which when executed by the one or more processors of the electronic device, cause the electronic device to:
   receive user input representing a touch associated with the affordance associated with forwarding the electronic message; and
   in response to receiving user input representing the touch associated with the affordance associated with forwarding the electronic message, replace display of the second set of one or more affordances with display of an interface for forwarding the electronic message.

10. The non-transitory computer readable storage medium of claim 3, wherein the one or more programs further comprise instructions, which when executed by the one or more processors of the electronic device, cause the electronic device to:
    receive user input representing a touch associated with the affordance associated with marking the electronic message; and
    in response to receiving user input representing the touch associated with the affordance associated with marking the electronic message, replace display of the first set of one or more affordances with a third set of one or more affordances associated with the electronic message.

11. The non-transitory computer readable storage medium of claim 10, wherein the third set of affordances associated with the electronic message includes one or more of:
    an affordance associated with flagging the electronic message,
    an affordance associated with marking as unread the electronic message,
    an affordance associated with archiving the electronic message, and
    a third affordance associated with a cancel action associated with the electronic message.

12. The non-transitory computer readable storage medium of claim 11, wherein the one or more programs further comprise instructions, which when executed by the one or more processors of the electronic device, cause the electronic device to:
    receive user input representing a touch associated with the affordance associated with flagging the electronic message; and
    in response to receiving user input representing the touch associated with the affordance associated with flagging the electronic message, replace display of the third set of one or more affordances with display of the electronic message, including a flag indicator.

13. The non-transitory computer readable storage medium of claim 11, wherein the one or more programs further comprise instructions, which when executed by the one or more processors of the electronic device, cause the electronic device to:
    receive user input representing a touch associated with the affordance associated with marking as unread the electronic message; and
    in response to receiving user input representing the touch associated with the affordance associated with marking as unread the electronic message, replace display of the third set of one or more affordances with display of the electronic message, including an unread indicator.

14. The non-transitory computer readable storage medium of claim 11, wherein the one or more programs further comprise instructions, which when executed by the one or more processors of the electronic device, cause the electronic device to:
    receive user input representing a touch associated with the affordance associated with archiving the electronic message; and
    in response to receiving user input representing the touch associated with the affordance associated with archiving the electronic message, move the electronic message into an archive folder.

15. The non-transitory computer readable storage medium of claim 1, wherein the interface for composing the new electronic message comprises one or more of:

an affordance associated with adding recipient information to the new electronic message,
an affordance associated with adding subject information to the new electronic message, and
an affordance associated with adding body information to the new electronic message.

16. The non-transitory computer readable storage medium of claim 15, wherein the one or more programs further comprise instructions, which when executed by the one or more processors of the electronic device, cause the electronic device to:
receive user input representing a touch associated with the affordance associated with adding recipient information to the new electronic message; and
in response to receiving user input representing the touch associated with the affordance associated with adding recipient information to the new electronic message, replace display of the interface for composing the new electronic message with display of a fourth set of one or more affordances associated with the new electronic message.

17. The non-transitory computer readable storage medium of claim 16, wherein the fourth set of one or more affordances associated with the new electronic message includes one or more of:
an affordance associated with recent contacts,
an affordance associated with dictation, and
an affordance associated with a keyboard.

18. The non-transitory computer readable storage medium of claim 17, wherein the one or more programs further comprise instructions, which when executed by the one or more processors of the electronic device, cause the electronic device to:
receive user input representing a touch associated with the affordance associated with recent contacts; and
in response to receiving user input representing the touch associated with the affordance associated with recent contacts, replace display of the fourth set of one or more affordances with display of one or more recent contact affordances.

19. The non-transitory computer readable storage medium of claim 15, wherein the one or more programs further comprise instructions, which when executed by the one or more processors of the electronic device, cause the electronic device to:
receive user input representing a touch associated with the affordance associated with adding subject information to the new electronic message; and
in response to receiving user input representing the touch associated with the affordance associated with adding subject information to the new electronic message, replace display of the interface for composing the new electronic message with display of a dictation interface.

20. The non-transitory computer readable storage medium of claim 19, wherein the one or more programs further comprise instructions, which when executed by the one or more processors of the electronic device, cause the electronic device to:
receive user input representing subject speech; and
in response to receiving user input representing subject speech:
transcribe the user input representing subject speech, and
add the transcribed subject speech as subject information to the new electronic message.

21. The non-transitory computer readable storage medium of claim 15, wherein the one or more programs further comprise instructions, which when executed by the one or more processors of the electronic device, cause the electronic device to:
receive data representing a touch associated with the affordance associated with adding body information to the new electronic message; and
in response to receiving data representing the touch associated with the affordance associated with adding body information to the new electronic message, replace display of the interface for composing the new electronic message with display of a dictation interface.

22. The non-transitory computer readable storage medium of claim 1, wherein the one or more programs further comprise instructions, which when executed by the one or more processors of the electronic device, cause the electronic device to:
determine whether the new electronic message includes recipient information, subject information, and body information; and
in response to determining that the new electronic message includes recipient information, subject information, and body information, display an affordance associated with sending the new electronic message.

23. The non-transitory computer readable storage medium of claim 22, wherein the one or more programs further comprise instructions, which when executed by the one or more processors of the electronic device, cause the electronic device to:
receive user input representing a touch associated with the affordance associated with sending the new electronic message; and
in response to receiving user input representing the touch associated with the affordance associated with sending the new electronic message, transmit the new electronic message.

24. The non-transitory computer readable storage medium of claim 1, wherein the one or more programs further comprise instructions, which when executed by the one or more processors of the electronic device, cause the electronic device to:
receive user input representing a substantially horizontal swipe gesture associated with an electronic message thread object of the list of electronic message thread objects; and
in response to receiving user input representing the substantially horizontal swipe gesture associated with the electronic message thread object of the list of electronic message thread objects, display an affordance for deleting an electronic thread associated with the electronic message thread object.

25. The non-transitory computer readable storage medium of claim 1, wherein the one or more programs further comprise instructions, which when executed by the one or more processors of the electronic device, cause the electronic device to:
receive user input representing a substantially horizontal swipe gesture associated with an electronic message object of the list of electronic message objects; and
in response to receiving user input representing the substantially horizontal swipe gesture associated with the electronic message object of the list of electronic message objects, display an affordance for deleting an electronic message associated with the electronic message object.

26. An electronic device, comprising:
a display;
a touch-sensitive surface configured to detect intensity of touches;
one or more processors;
a memory; and
one or more programs, wherein the one or more programs are stored in the memory and configured to be executed by the one or more processors, the one or more programs including instructions for:
displaying, on the display, an affordance representing an electronic message application;
receiving user input activating the affordance representing the electronic message application;
displaying, on the display, a list of electronic message thread objects;
receiving user input activating an electronic message thread object of the list of electronic message thread objects;
in response to receiving user input activating the electronic message thread object of the list of electronic message thread objects, displaying, on the display, a list of electronic message objects associated with the electronic message thread object;
receiving user input representing a touch associated with an electronic message object of the list of electronic message objects;
in response to receiving user input representing the touch associated with an electronic message object of the list of electronic message objects, displaying, on the display, an electronic message associated with the electronic message object;
while displaying the electronic mail message, receiving user input representing a touch on the electronic message; and
in response to receiving the user input representing the touch on the electronic message:
in accordance with a determination that the characteristic intensity of the touch is above an intensity threshold, displaying, on the display, a first set of one or more affordances associated with the electronic message, wherein the first set of one or more affordances associated with the electronic message includes an affordance associated with replying to the electronic message; and
in accordance with a determination that the characteristic intensity of the touch is not above the intensity threshold, forgoing display, on the display, the first set of one or more affordances associated with the electronic message.

27. The electronic device of claim 26, wherein displaying the first set of one or more affordances associated with the electronic message includes replacing display of the electronic message with display of the first set of one or more affordances associated with the electronic message.

28. The electronic device of claim 26, wherein the first set of one or more affordances associated with the electronic message includes one or more of:
an affordance associated with marking the electronic message,
an affordance associated with opening the electronic message on a second device, and
a first affordance associated with a cancel action associated with the electronic message.

29. The electronic device of claim 28, further including instructions for:
receiving user input representing a touch associated with the first affordance associated with the cancel action; and
in response to receiving user input representing the touch associated with the first affordance associated with the cancel action, replacing display of the first set of one or more affordances with display of the electronic message.

30. The electronic device of claim of claim 28, further including instructions for:
receiving user input representing a touch associated with the affordance associated with replying to the electronic message; and
in response to receiving user input representing the touch associated with the affordance associated with replying to the electronic message, replacing display of the first set of one or more affordances with a second set of one or more affordances associated with the electronic message.

31. The electronic device of claim 30, wherein the second set of affordances associated with the electronic message includes one or more of:
an affordance associated with replying to the sender of the electronic message,
an affordance associated with replying to all recipients of the electronic message,
an affordance associated with forwarding the electronic message, and
a second affordance associated with a cancel action associated with the electronic message.

32. The electronic device of claim 31, further including instructions for:
receiving user input representing a touch associated with the affordance associated with replying to the sender of the electronic message; and
in response to receiving user input representing the touch associated with the affordance associated with replying to the sender of the electronic message, replacing display of the second set of one or more affordances with display of an interface for replying to the electronic message.

33. The electronic device of claim 31, further including instructions for:
receiving user input representing a touch associated with the affordance associated with replying to all recipients of the electronic message; and
in response to receiving user input representing the touch associated with the affordance associated with replying to all recipients of the electronic message, replacing display of the second set of one or more affordances with display of an interface for replying to all recipients of the electronic message.

34. The electronic device of claim 31, further including instructions for:
receiving user input representing a touch associated with the affordance associated with forwarding the electronic message; and
in response to receiving user input representing the touch associated with the affordance associated with forwarding the electronic message, replacing display of the second set of one or more affordances with display of an interface for forwarding the electronic message.

35. The electronic device of claim 28, further including instructions for:
receiving user input representing a touch associated with the affordance associated with marking the electronic message; and in response to receiving user input representing the touch associated with the affordance associated with marking the electronic message, replacing display of the first set of one or more affordances with a third set of one or more affordances associated with the electronic message.

36. The electronic device of claim 35, wherein the third set of affordances associated with the electronic message includes one or more of:
   an affordance associated with flagging the electronic message,
   an affordance associated with marking as unread the electronic message,
   an affordance associated with archiving the electronic message, and
   a third affordance associated with a cancel action associated with the electronic message.

37. The electronic device of claim 36, further including instructions for:
   receiving user input representing a touch associated with the affordance associated with flagging the electronic message; and
   in response to receiving user input representing the touch associated with the affordance associated with flagging the electronic message, replacing display of the third set of one or more affordances with display of the electronic message, including a flag indicator.

38. The electronic device of claim 36, further including instructions for:
   receiving user input representing a touch associated with the affordance associated with marking as unread the electronic message; and
   in response to receiving user input representing the touch associated with the affordance associated with marking as unread the electronic message, replacing display of the third set of one or more affordances with display of the electronic message, including an unread indicator.

39. The electronic device of claim 36, further including instructions for:
   receiving user input representing a touch associated with the affordance associated with archiving the electronic message; and
   in response to receiving user input representing the touch associated with the affordance associated with archiving the electronic message, moving the electronic message into an archive folder.

40. The electronic device of claim 26, wherein the interface for composing the new electronic message comprises one or more of:
   an affordance associated with adding recipient information to the new electronic message,
   an affordance associated with adding subject information to the new electronic message, and
   an affordance associated with adding body information to the new electronic message.

41. The electronic device of claim 40, further including instructions for:
   receiving user input representing a touch associated with the affordance associated with adding recipient information to the new electronic message; and
   in response to receiving user input representing the touch associated with the affordance associated with adding recipient information to the new electronic message, replacing display of the interface for composing the new electronic message with display of a fourth set of one or more affordances associated with the new electronic message.

42. The electronic device of claim 41, wherein the fourth set of one or more affordances associated with the new electronic message includes one or more of:
   an affordance associated with recent contacts,
   an affordance associated with dictation, and
   an affordance associated with a keyboard.

43. The electronic device of claim 42, further including instructions for:
   receiving user input representing a touch associated with the affordance associated with recent contacts; and
   in response to receiving user input representing the touch associated with the affordance associated with recent contacts, replacing display of the fourth set of one or more affordances with display of one or more recent contact affordances.

44. The electronic device of claim 40, further including instructions for:
   receiving user input representing a touch associated with the affordance associated with adding subject information to the new electronic message; and
   in response to receiving user input representing the touch associated with the affordance associated with adding subject information to the new electronic message, replacing display of the interface for composing the new electronic message with display of a dictation interface.

45. The electronic device of claim 44, further including instructions for:
   receiving user input representing subject speech; and
   in response to receiving user input representing subject speech:
      transcribing the user input representing subject speech, and
      adding the transcribed subject speech as subject information to the new electronic message.

46. The electronic device of claim 40, further including instructions for:
   receiving data representing a touch associated with the affordance associated with adding body information to the new electronic message; and
   in response to receiving data representing the touch associated with the affordance associated with adding body information to the new electronic message, replacing display of the interface for composing the new electronic message with display of a dictation interface.

47. The electronic device of claim 26, further including instructions for:
   determining whether the new electronic message includes recipient information, subject information, and body information; and
   in response to determining that the new electronic message includes recipient information, subject information, and body information, displaying an affordance associated with sending the new electronic message.

48. The electronic device of claim 47, further including instructions for:
   receiving user input representing a touch associated with the affordance associated with sending the new electronic message; and
   in response to receiving user input representing the touch associated with the affordance associated with sending the new electronic message, transmitting the new electronic message.

49. The electronic device of claim 26, further including instructions for:

receiving user input representing a substantially horizontal swipe gesture associated with an electronic message thread object of the list of electronic message thread objects; and in response to receiving user input representing the substantially horizontal swipe gesture associated with the electronic message thread object of the list of electronic message thread objects, displaying an affordance for deleting an electronic thread associated with the electronic message thread object.

50. The electronic device of claim 26, further including instructions for:

receiving user input representing a substantially horizontal swipe gesture associated with an electronic message object of the list of electronic message objects; and in response to receiving user input representing the substantially horizontal swipe gesture associated with the electronic message object of the list of electronic message objects, displaying an affordance for deleting an electronic message associated with the electronic message object.

51. A method, comprising:

at an electronic device with a display, a touch-sensitive surface, and a rotatable input mechanism:

displaying, on the display, an affordance representing an electronic message application;

receiving user input activating the affordance representing the electronic message application;

displaying, on the display, a list of electronic message thread objects;

receiving user input activating an electronic message thread object of the list of electronic message thread objects;

in response to receiving user input activating the electronic message thread object of the list of electronic message thread objects, displaying, on the display, a list of electronic message objects associated with the electronic message thread object;

receiving user input representing a touch associated with an electronic message object of the list of electronic message objects;

in response to receiving user input representing the touch associated with an electronic message object of the list of electronic message objects, displaying, on the display, an electronic message associated with the electronic message object;

while displaying the electronic mail message, receiving user input representing a touch on the electronic message; and in response to receiving the user input representing the touch on the electronic message:

in accordance with a determination that the characteristic intensity of the touch is above an intensity threshold, displaying, on the display, a first set of one or more affordances associated with the electronic message, wherein the first set of one or more affordances associated with the electronic message includes an affordance associated with replying to the electronic message; and in accordance with a determination that the characteristic intensity of the touch is not above the intensity threshold, forgoing display, on the display, the first set of one or more affordances associated with the electronic message.

52. The method of claim 51, wherein displaying the first set of one or more affordances associated with the electronic message includes replacing display of the electronic message with display of the first set of one or more affordances associated with the electronic message.

53. The method of claim 51, wherein the first set of one or more affordances associated with the electronic message includes one or more of:

an affordance associated with marking the electronic message, an affordance associated with opening the electronic message on a second device, and a first affordance associated with a cancel action associated with the electronic message.

54. The method of claim 53, further comprising:

receiving user input representing a touch associated with the first affordance associated with the cancel action; and in response to receiving user input representing the touch associated with the first affordance associated with the cancel action, replacing display of the first set of one or more affordances with display of the electronic message.

55. The method of claim of claim 53, further comprising:

receiving user input representing a touch associated with the affordance associated with replying to the electronic message; and in response to receiving user input representing the touch associated with the affordance associated with replying to the electronic message, replacing display of the first set of one or more affordances with a second set of one or more affordances associated with the electronic message.

56. The method of claim 55, wherein the second set of affordances associated with the electronic message includes one or more of:

an affordance associated with replying to the sender of the electronic message, an affordance associated with replying to all recipients of the electronic message, an affordance associated with forwarding the electronic message, and a second affordance associated with a cancel action associated with the electronic message.

57. The method of claim 56, further comprising:

receiving user input representing a touch associated with the affordance associated with replying to the sender of the electronic message; and in response to receiving user input representing the touch associated with the affordance associated with replying to the sender of the electronic message, replacing display of the second set of one or more affordances with display of an interface for replying to the electronic message.

58. The method of claim 56, further comprising:

receiving user input representing a touch associated with the affordance associated with replying to all recipients of the electronic message; and in response to receiving user input representing the touch associated with the affordance associated with replying to all recipients of the electronic message, replacing display of the second set of one or more affordances with display of an interface for replying to all recipients of the electronic message.

59. The method of claim 56, further comprising:

receiving user input representing a touch associated with the affordance associated with forwarding the electronic message; and in response to receiving user input representing the touch associated with the affordance associated with forwarding the electronic message, replacing display of the second set of one or more affordances with display of an interface for forwarding the electronic message.

60. The method of claim 53, further comprising:
receiving user input representing a touch associated with the affordance associated with marking the electronic message; and
in response to receiving user input representing the touch associated with the affordance associated with marking the electronic message, replacing display of the first set of one or more affordances with a third set of one or more affordances associated with the electronic message.

61. The method of claim 60, wherein the third set of affordances associated with the electronic message includes one or more of:
an affordance associated with flagging the electronic message,
an affordance associated with marking as unread the electronic message,
an affordance associated with archiving the electronic message, and
a third affordance associated with a cancel action associated with the electronic message.

62. The method of claim 61, further comprising:
receiving user input representing a touch associated with the affordance associated with flagging the electronic message; and
in response to receiving user input representing the touch associated with the affordance associated with flagging the electronic message, replacing display of the third set of one or more affordances with display of the electronic message, including a flag indicator.

63. The method of claim 61, further comprising:
receiving user input representing a touch associated with the affordance associated with marking as unread the electronic message; and
in response to receiving user input representing the touch associated with the affordance associated with marking as unread the electronic message, replacing display of the third set of one or more affordances with display of the electronic message, including an unread indicator.

64. The method of claim 61, further comprising:
receiving user input representing a touch associated with the affordance associated with archiving the electronic message; and
in response to receiving user input representing the touch associated with the affordance associated with archiving the electronic message, moving the electronic message into an archive folder.

65. The method of claim 51, wherein the interface for composing the new electronic message comprises one or more of:
an affordance associated with adding recipient information to the new electronic message,
an affordance associated with adding subject information to the new electronic message, and
an affordance associated with adding body information to the new electronic message.

66. The method of claim 65, further comprising:
receiving user input representing a touch associated with the affordance associated with adding recipient information to the new electronic message; and
in response to receiving user input representing the touch associated with the affordance associated with adding recipient information to the new electronic message, replacing display of the interface for composing the new electronic message with display of a fourth set of one or more affordances associated with the new electronic message.

67. The method of claim 66, wherein the fourth set of one or more affordances associated with the new electronic message includes one or more of:
an affordance associated with recent contacts,
an affordance associated with dictation, and
an affordance associated with a keyboard.

68. The method of claim 67, further comprising:
receiving user input representing a touch associated with the affordance associated with recent contacts; and
in response to receiving user input representing the touch associated with the affordance associated with recent contacts, replacing display of the fourth set of one or more affordances with display of one or more recent contact affordances.

69. The method of claim 65, further comprising:
receiving user input representing a touch associated with the affordance associated with adding subject information to the new electronic message; and
in response to receiving user input representing the touch associated with the affordance associated with adding subject information to the new electronic message, replacing display of the interface for composing the new electronic message with display of a dictation interface.

70. The method of claim 69, further comprising:
receiving user input representing subject speech; and
in response to receiving user input representing subject speech:
transcribing the user input representing subject speech, and
adding the transcribed subject speech as subject information to the new electronic message.

71. The method of claim 65, further comprising:
receiving data representing a touch associated with the affordance associated with adding body information to the new electronic message; and
in response to receiving data representing the touch associated with the affordance associated with adding body information to the new electronic message, replacing display of the interface for composing the new electronic message with display of a dictation interface.

72. The method of claim 51, further comprising:
determining whether the new electronic message includes recipient information, subject information, and body information; and
in response to determining that the new electronic message includes recipient information, subject information, and body information, displaying an affordance associated with sending the new electronic message.

73. The method of claim 72, further comprising:
receiving user input representing a touch associated with the affordance associated with sending the new electronic message; and
in response to receiving user input representing the touch associated with the affordance associated with sending the new electronic message, transmitting the new electronic message.

74. The method of claim 51, further comprising:
receiving user input representing a substantially horizontal swipe gesture associated with an electronic message thread object of the list of electronic message thread objects; and in response to receiving user input representing the substantially horizontal swipe gesture associated with the electronic message thread object of the list of electronic message thread objects, displaying an affordance for deleting an electronic thread associated with the electronic message thread object.

75. The method of claim 51, further comprising:

receiving user input representing a substantially horizontal swipe gesture associated with an electronic message object of the list of electronic message objects; and in response to receiving user input representing the substantially horizontal swipe gesture associated with the electronic message object of the list of electronic message objects, displaying an affordance for deleting an electronic message associated with the electronic message object.

* * * * *